United States Patent
Okada et al.

(10) Patent No.: US 9,519,950 B2
(45) Date of Patent: Dec. 13, 2016

(54) IMAGE GENERATING APPARATUS AND IMAGE GENERATING METHOD

(71) Applicant: FURYU CORPORATION, Tokyo (JP)

(72) Inventors: Tsuneo Okada, Hyogo (JP); Yuki Taji, Osaka (JP); Megumi Fuwa, Kyoto (JP); Sayaka Yoshimoto, Kyoto (JP); Aki Imahira, Kyoto (JP); Takashi Nakajima, Kyoto (JP); Hitoshi Hida, Shiga (JP); Masato Tsukada, Kyoto (JP); Ikuko Tachibana, Kyoto (JP); Reiko Hashio, Kyoto (JP); Moeko Hamade, Kyoto (JP); Michiyo Wakayoshi, Shiga (JP); Kazuto Katada, Osaka (JP); Masanori Suminaga, Osaka (JP)

(73) Assignee: FURYU CORPORATION, Tokyo (JP)

( * ) Notice: Subject to any disclaimer, the term of this patent is extended or adjusted under 35 U.S.C. 154(b) by 52 days.

(21) Appl. No.: 14/574,731

(22) Filed: Dec. 18, 2014

(65) Prior Publication Data
US 2015/0206310 A1 Jul. 23, 2015

(30) Foreign Application Priority Data

Dec. 20, 2013 (JP) ................................ 2013-264572
Jul. 10, 2014 (JP) ................................ 2014-142739
Jul. 28, 2014 (JP) ................................ 2014-152603

(51) Int. Cl.
*G06T 3/40* (2006.01)
*G06T 11/60* (2006.01)
(Continued)

(52) U.S. Cl.
CPC ............... *G06T 3/40* (2013.01); *G06T 11/00* (2013.01); *G06T 11/60* (2013.01); *H04N 5/265* (2013.01);
(Continued)

(58) Field of Classification Search
CPC .......... H04N 5/265; G06T 3/40; G06T 11/00; G06T 11/60; G06K 9/00362
(Continued)

(56) References Cited

U.S. PATENT DOCUMENTS

| | | | |
|---|---|---|---|
| 2004/0125423 A1* | 7/2004 | Nishi | G06T 11/60 382/100 |
| 2007/0200925 A1* | 8/2007 | Kim | G06T 11/00 348/14.08 |
| 2010/0195912 A1* | 8/2010 | Nakada | G06T 11/00 348/222.1 |

FOREIGN PATENT DOCUMENTS

| | | |
|---|---|---|
| JP | 2985879 B1 | 12/1999 |
| JP | 4621396 B | 5/2003 |

(Continued)

*Primary Examiner* — Nhan T Tran
(74) *Attorney, Agent, or Firm* — Capitol City TechLaw

(57) ABSTRACT

An image generating apparatus includes an imaging device that photographs a user to generate a photographed image, and a control device that performs a process of compositing an image for composition with the photographed image. The control device detects a plurality of parts of a body of the user from the photographed image, adjusts the image for composition in size, position, and direction depending on a size, a position, and a direction of each of the plurality of the detected parts, and composites the image for composition with the photographed image with the adjusted size, at the adjusted position, and in the adjusted direction.

6 Claims, 54 Drawing Sheets

(51) Int. Cl.
*H04N 5/262* (2006.01)
*H04N 5/265* (2006.01)
*G06T 11/00* (2006.01)
*G06K 9/00* (2006.01)

(52) U.S. Cl.
CPC ........ *H04N 5/2621* (2013.01); *G06K 9/00362* (2013.01)

(58) Field of Classification Search
USPC .............................................. 348/222.1, 239
See application file for complete search history.

(56) References Cited

FOREIGN PATENT DOCUMENTS

| | | | |
|---|---|---|---|
| JP | 2004178163 A | 6/2004 | |
| JP | 2005080284 A | 3/2005 | |
| JP | 2006311017 A | 11/2006 | |
| JP | 2008203960 A | 9/2008 | |
| JP | 2011114744 A | 6/2011 | |

\* cited by examiner

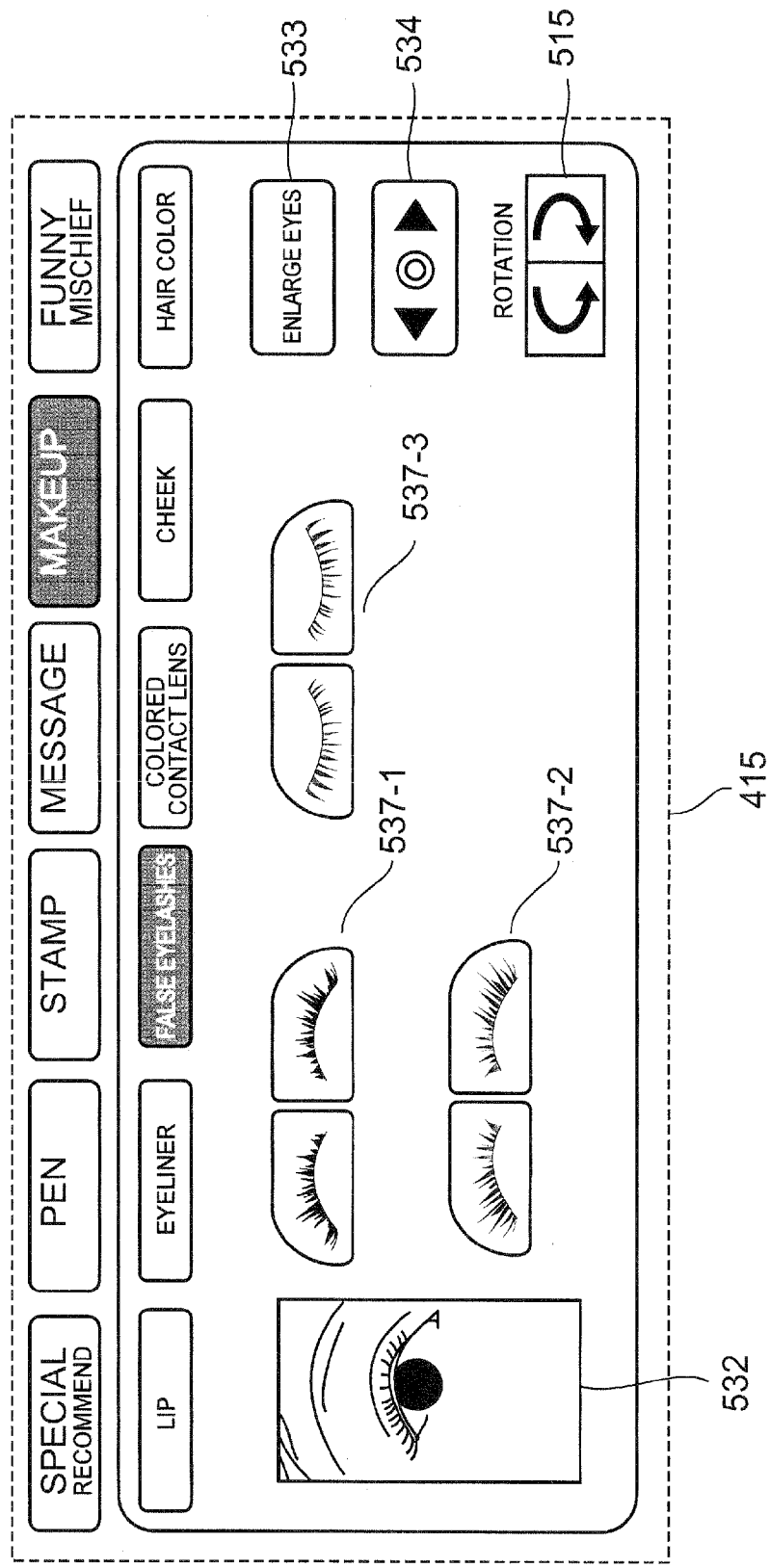

Fig. 55
| | | | | | | |
|---|---|---|---|---|---|---|
| CONTENT A1 |  | ○ | | | | |
| CONTENT A2 |  | ○ | | | | |
| CONTENT A3 |  | | ○ | | | |
| CONTENT A4 |  | | ○ | | | |
| CONTENT A5 |  | | | | ○ | |
| CONTENT A6 |  | | | | ○ | |
| CONTENT A7 |  | | | | | ○ |
| CONTENT A8 |  | | | | | ○ |
| CONTENT A9 |  | | | | | | ○ |
| CONTENT A10 |  | | | | | | ○ |

Fig.56
| | | | | | |
|---|---|---|---|---|---|
| CONTENT B1 |  | ○ | | | |
| CONTENT B2 |  | | ○ | | |
| CONTENT B3 |  | | | ○ | |
| CONTENT B4 |  | | | | ○ |

# IMAGE GENERATING APPARATUS AND IMAGE GENERATING METHOD

BACKGROUND OF THE INVENTION

1. Technical Field

The present invention relates to an image generating apparatus and an image generating method capable of providing an interesting image based on a photographed image.

2. Related Art

A photo sticker apparatus is known that photographs a user, that allows the user to edit a photographed image, and that prints and provides the edited image on a sticker sheet. Such a photo sticker apparatus is disposed in amusement (play) facilities.

In a flow of one game provided by the photo sticker apparatus, typically, the apparatus photographs a user in a photographing space as a subject, causes the user to move to an edit space, edits the image in accordance with an operation performed in the edit space, and prints an image after the edit, i.e., an edited image, on a sticker sheet.

Some of these photo sticker apparatuses composite a stamp image which is rotatable to create a sense of depth, with an image to be edited (see, e.g., Japanese Laid-Open Patent Publication No. 2011-114744), while changing an inclination and a size of the stamp image based on an inclination and a size of a face of a subject.

Moreover, recent photo sticker apparatuses have variously designed images prepared as images used for composition to be composited with a photographed image, thereby providing an interesting sticker sheet to a user.

However, for example, if multiple users composite stamp images of different inclinations and sizes with respective faces of subjects with an edit target images to be edited by a photo sticker apparatus of Japanese Laid-Open Patent Publication No. 2011-114744, the users must perform operations of compositing the stamp image for each object, and those operations are time-consuming for the users.

Although there is known a function that composites the same stamp image with respective faces of users at one time in the edit target image, different stamp images cannot be composited with respective objects, thus resulting in providing less surprising or interesting stickers.

SUMMARY OF THE INVENTION

The present disclosure provides an interesting image more easily.

In a first aspect of the present disclosure, an image generating apparatus is provided that includes an imaging device that photographs a user to generate a photographed image; and, a control device that performs a process of compositing an image for composition with the photographed image. The control device detects a plurality of parts of a body of the user from the photographed image, adjusts the image for composition in size, position, and direction depending on a size, a position, and a direction of each of the plurality of detected parts, and composites the image for composition with the photographed image with the adjusted size, at the adjusted position, and in the adjusted direction.

In a second aspect of the present disclosure, an image generating method is provided which includes photographing a user to generate a photographed image, detecting a plurality of parts of a body of the user from the photographed image, adjusting the image for composition in size, position, and direction depending on a size, a position, and a direction of a plurality of the detected parts, and compositing the image for composition with the photographed image with the adjusted size, at the adjusted position, and in the adjusted direction.

BRIEF DESCRIPTION OF DRAWINGS

FIG. 26 is a diagram of an example of the edit pallet.

FIG. 55 is a diagram for explaining an example of stamp images included in a pirate category.

FIG. 56 is a diagram for explaining an example of stamp images included in a party category.

DETAILED DESCRIPTION OF EMBODIMENTS

Specific embodiments to which idea of the present invention is applied will now be described in detail with reference to the drawings.

First Embodiment

Configuration of Appearance of Photo Sticker Creating Apparatus

Figure 1:
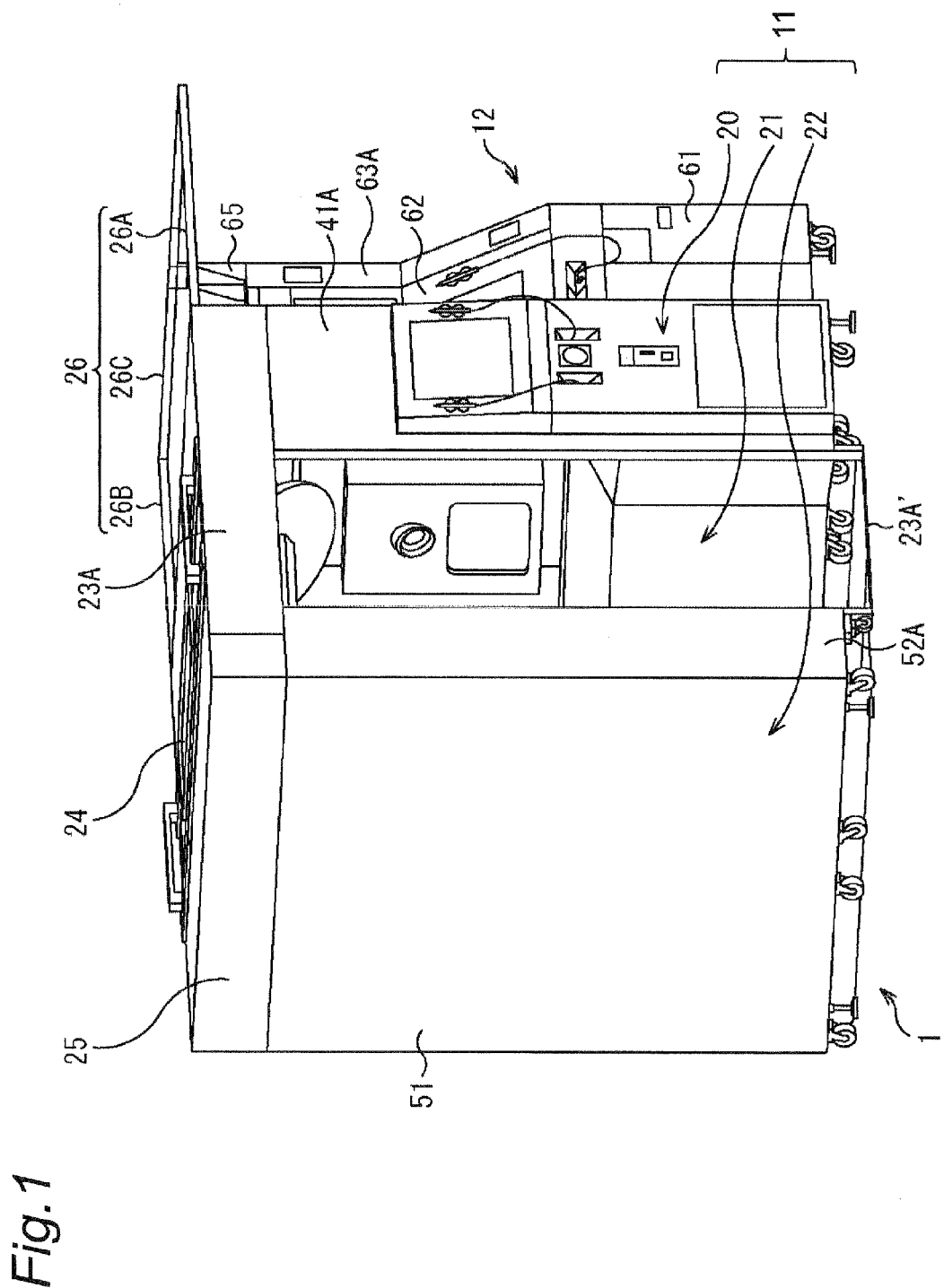
FIG. 1 is a perspective view of a configuration example of an appearance of a photo sticker creating apparatus according to an embodiment of the present invention.
Figure 2:
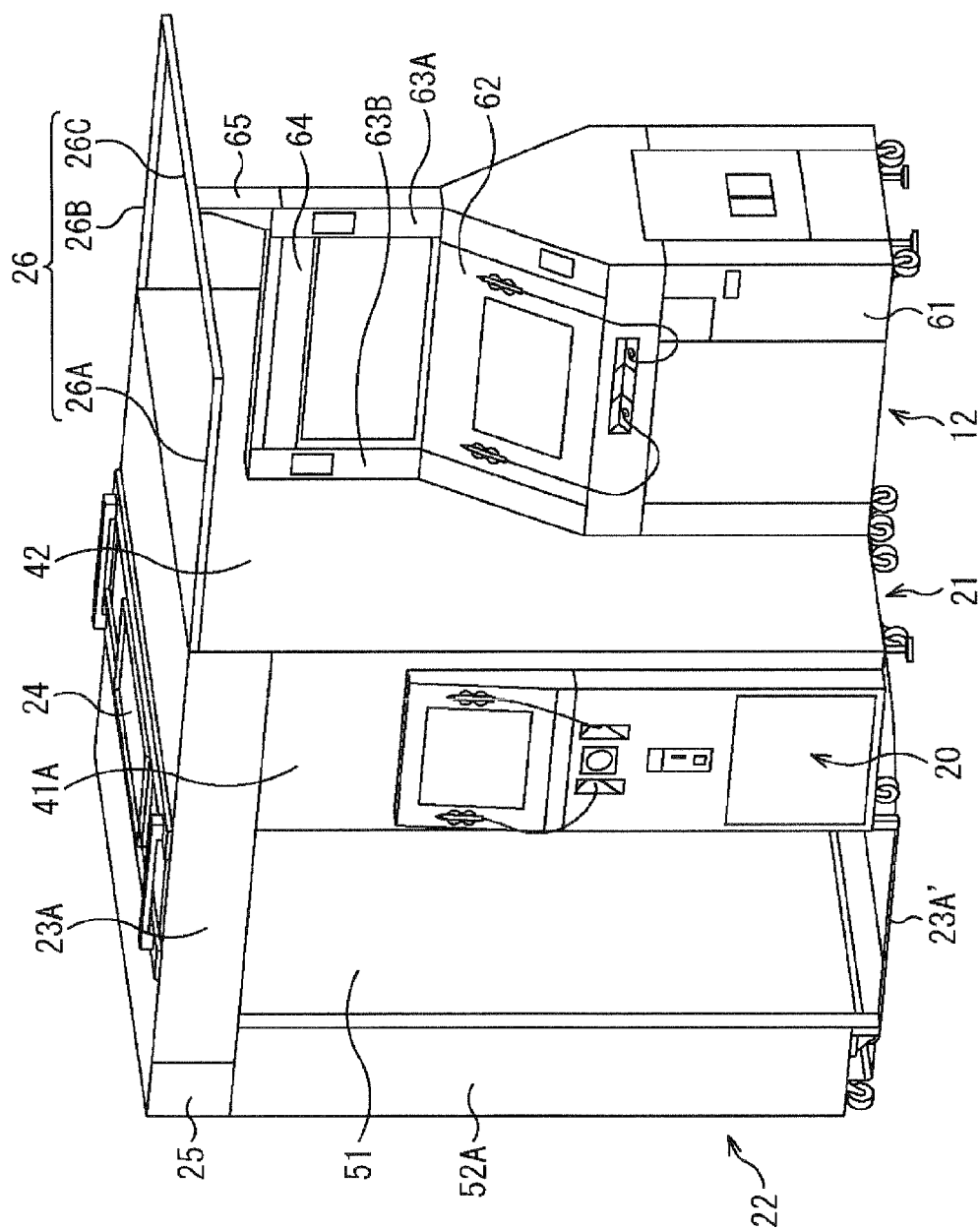
FIG. 2 is a perspective view of the appearance of the photo sticker creating apparatus viewed from another angle.

FIGS. 1 and 2 are perspective views of a configuration example of an appearance of a photo sticker creating apparatus that is an embodiment of an image generating apparatus according to the present invention.

A photo sticker creating apparatus 1 is a game machine providing a photographed image or an edited image. The image may be provided in a printed form on a sticker sheet or may be provided such that the image transmitted to a server is made viewable on a user's mobile terminal. The photo sticker creating apparatus 1 is disposed in facilities or stores such as amusement facilities. Main users are assumed to be female high-school students and young females. The apparatus may be used by one user and is typically used by a plurality of users such as two or three per group.

Users playing with the photo sticker creating apparatus 1 photograph themselves as subjects and edit an image selected from photographed images acquired from the photographing by compositing handwritten characters and stamp images with the selected image to create a colorful image from the photographed image. The user receives a sticker sheet having the photographed image or the edited image printed thereon, and then finishes one game.

As shown in FIG. 1, the photo sticker creating apparatus 1 is basically configured by a photographing unit 11 and an edit unit 12 disposed in contact with each other.

The photographing unit 11 is made up of a initial service section 20, a shooting section 21, and a background section 22. The initial service section 20 is disposed on each of the both side faces of the shooting section 21, and each of spaces in front thereof is defined as an initial service space in which an operation for an initial service process is performed. The shooting section 21 and the background section 22 are spaced at a predetermined distance from each other, and a space formed between the shooting section 21 and the background section 22 is defined as a photographing space in which an operation for a photographing process is performed.

The initial service section 20 is an apparatus for executing the initial service process including providing guidance for introducing the game provided by the photo sticker creating apparatus 1 and performing various settings for the photographing performed in the photographing space. The initial service section 20 is provided with a coin insert slot receiving a charge from a user and a tablet built-in monitor and stylus pens used for various operations. The initial service section 20 guides a user in the initial service space to the photographing space in accordance with availability of the photographing space.

The shooting section 21 is an apparatus for performing the photographing process which photographs the user as a subject. The shooting section 21 is located in front of the user in the photographing space. On a front surface of the shooting section 21 facing the photographing space, a camera and a touch panel monitor used for various operations are disposed. It is assumed that surfaces on the right side and the left side are referred to a right side surface and a left side surface, respectively when viewed from a user in the photographing space. The right side surface and the left side surface of the shooting section 21 are made up of a side panel 41A and a side panel 41B (FIG. 3) respectively, and the front surface is made up of a front panel 42. Each of the side panels 41A and 41B is provided with the initial service section 20.

The background section 22 is made up of a back panel 51 that is a plate-shaped member located on the back side of the user facing the front during the photographing, a side panel 52A that is a plate-shaped member attached to the right end of the back face panel 51 and having a width narrower than the side panel 41A, and a side panel 52B (FIG. 3) that is a plate-shaped member attached to the left end of the back panel 51 and having a width narrower than the side panel 41B.

The side panel 41A making up the right side of the shooting section 21 and the side panel 52A of the background section 22 are disposed on substantially the same plane. The side panel 41A and the side panel 52A are coupled at upper portions thereof with a coupling member 23A that is a plate-shaped member, and are coupled at lower portions thereof with a coupling member 23A' that is provided on a bottom and is a member made of metal, for example. The side panel 41B making up the left side of the shooting section 21 and the side panel 52B of the background section 22 are similarly disposed on substantially the same plane and are coupled at upper portions thereof with a coupling member 23B (not shown) and are coupled at lower portions with a coupling part 23B' (not shown).

An opening surrounded and formed by the side panel 41A of the shooting section 21, the coupling member 23A, and the side panel 52A of the background section 22 is defined as an entrance/exit of the photographing space. An opening surrounded and formed by the side panel 41B of the shooting section 21, the coupling member 23B, and the side panel 52B of the background section 22 is also defined as an entrance/exit of the photographing space.

The upper portion of the background section 22 is provided with a background curtain unit 25 disposed and supported by the back panel 51, the side panel 52A, and the side panel 52B. The background curtain unit 25 houses a background curtain of a predetermined color appearing on the background of a user in a photographed image acquired from the photographing. The background curtain unit 25 drops, as needed, for example, a green chroma-key curtain in the photographing space, in associating with the photographing.

The chroma-key curtain may be attached in advance to the back panel 51 acting as a backplane of the photographing space. If the chroma-key curtain is used as the background for photographing, a plurality of types of background images to be composited are prepared such that a user's desired background image can be composited at the portion of the curtain by executing a chroma-key process in a photographing process or an edit process.

A ceiling surrounded by the front surface of the shooting section 21, the coupling member 23A, the coupling member 23B, and the background curtain unit 25 is defined over the photographing space and a ceiling strobe unit 24 is provided as a portion of the ceiling. One end of the ceiling strobe unit 24 is fixed to the coupling member 23A and the other end is fixed to the coupling member 23B. The ceiling strobe unit 24 has a strobe for emitting light toward the photographing space in synchronization with the photographing, therein. The ceiling strobe unit 24 has a fluorescent light disposed inside along with the strobe, and also acts as illumination of the photographing space.

The edit unit 12 is a device for executing the edit process of a photographed image. The edit unit 12 is disposed, coupled to the photographing unit 11 with one side surface coming into contact with the back surface of the shooting section 21.

If it is assumed that a configuration of the edit unit 12 shown in FIGS. 1 and 2 is taken as a configuration on the front side, configurations used for editing are provided on the front side and the back side of the edit unit 12 so as to allow two groups of users to perform the edit at the same time.

A front surface side of the edit unit 12 is made up of a surface 61 that is a surface perpendicular to a floor face and substantially parallel to the side panel 41A of the shooting section 21, and a slope 62 formed above the surface 61. The slope 62 is provided with a tablet built-in monitor and stylus pens, as an element used for an edit operation. A column-shaped support member 63A supporting one end of a lighting device 64 is disposed on the right side of the slope 62. A column-shaped support member 63B supporting the other end of the lighting device 64 is disposed on the left side of the slope 62. A supporting member 65 supporting a curtain rail 26 is disposed on an upper surface of the support member 63A.

The curtain rail 26 is attached above the edit unit 12. The curtain rail 26 is made up of three rails 26A to 26C which are composited to be approximately U-shaped when viewed from above. The rails 26A and 26B disposed in parallel are fixed at one ends thereof to the coupling members 23A and 23B, respectively, and are connected at the other ends to the both ends of the rail 26C.

A curtain is attached to the curtain rail 26 to prevent the inside of spaces in front of the front face and the back face of the edit unit 12 from being seen from the outside. The spaces in front of the front face and the back face of the edit unit 12 surrounded by the curtain attached to the curtain rail 26 are defined as edit spaces for users editing the photographed images.

As described later, a discharge port for ejecting a printed sticker sheet is disposed on the right side of the edit unit 12. A space in front of the right side surface of the edit unit 12 is defined as a space for waiting print which users waiting for discharge of a printed and sticker sheet.

Movement of Users

A flow of a photo sticker creating game and user's movement associated therewith will be described below.

Figure 3:
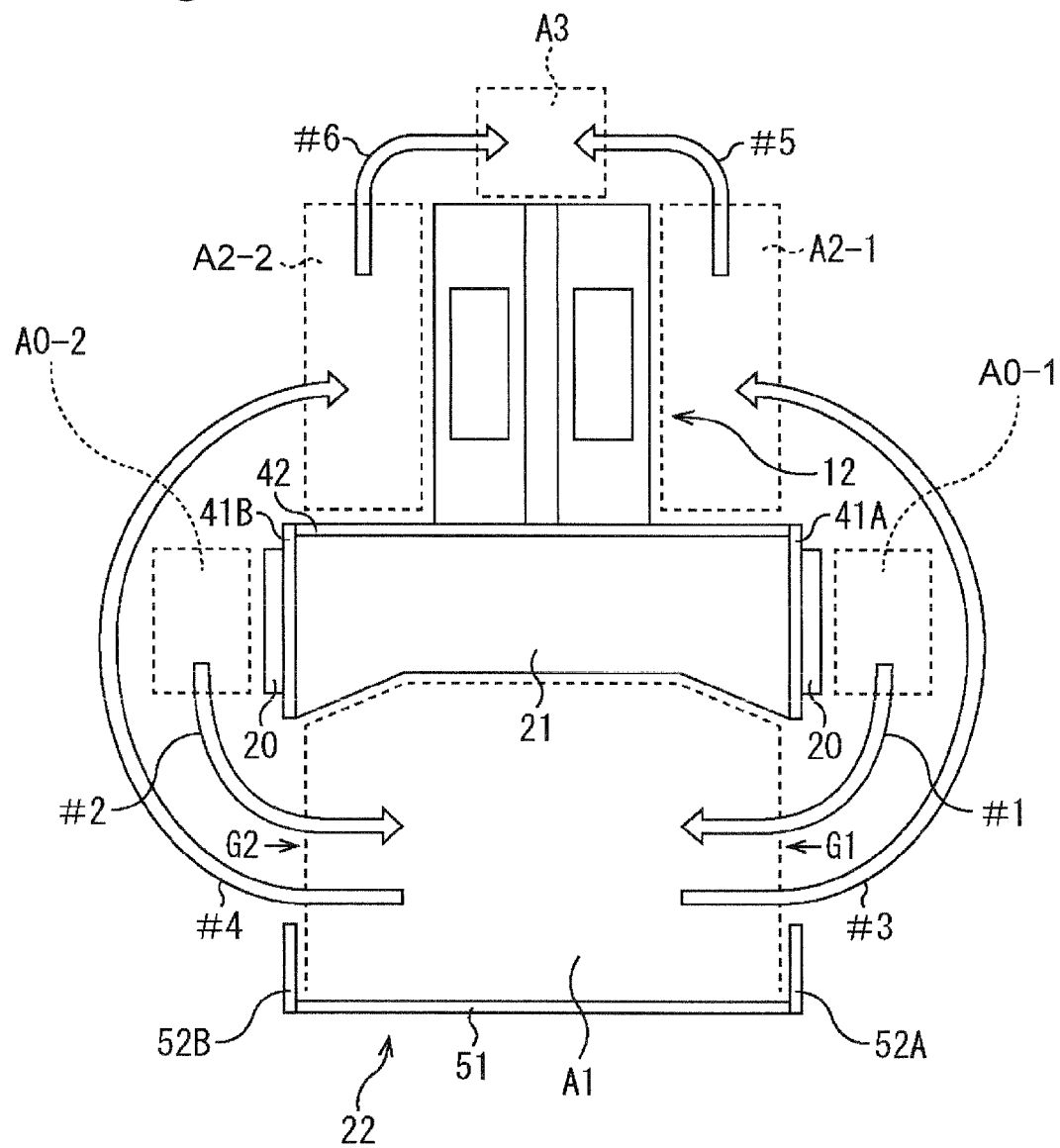
FIG. 3 is a diagram for explaining movement of a user.

FIG. 3 is a plane view of the photo sticker creating apparatus 1 viewed from above.

First, a user puts the coins into the coin insert slot in an initial service space A0-1 or an initial service space A0-2 that is a space in front of the initial service section 20, and then performs various settings with a user's finger or the stylus pen in accordance with a screen displayed on the tablet built-in monitor. In the initial service space A0-1, A0-2, for example, selection of conditions related to photographing in the photographing space (such as course selection for selecting a photographing process and background selection for selecting a photographed image) is performed as an initial service operation.

The user finishing the initial service operation enters a photographing space A1 formed between the shooting section 21 and the background section 22 from an entrance/exit G1 as indicated by a while arrow #1 or an entrance/exit G2 as indicated by a while arrow #2, and performs photographing by using the camera and the touch panel monitor disposed on the shooting section 21. The entrance/exit G1 is an opening between the side panel 41A and the side panel 52A and the entrance/exit G2 is an opening between the side panel 41B and the side panel 52B.

Although two groups of users can respectively perform the initial service operations at the same time in the initial service space A0-1 and the initial service space A0-2, the users finishing earlier the initial service operation are first guided to the photographing space A1. In this case, the initial service section 20 provides guidance for the photographing process, and so on to the users who do not finish the initial service operation to keep the users waiting, until the users first entering the photographing space A1 finishes the photographing.

The user finishing the photographing goes out of the photographing space A1 through the entrance/exit G1 as indicated by a while arrow #3 and moves to an edit space A2-1, or goes out of the photographing space A1 through the entrance/exit G2 as indicated by a while arrow #4 to and moves to an edit space A2-2.

The edit space A2-1 is the edit space on the front side of the edit unit 12 and the edit space A2-2 is the edit space on the back side of the edit unit 12. The user is guided to move either the edit space A2-1 or the edit space A22 by screen display and so on, on the touch panel monitor of the shooting section 21. For example, available one of the two edit spaces is defined as the destination to which the user is guided. The user having moved to the edit space A2-1 or the edit space A2-2 starts editing the photographed image. The users in the edit space A2-1 and the users in the edit space A2-2 can perform the editing at the same time.

After completion of the editing, printing of the photographed image or the edited image is started. When the printing of the image is completed, the user finishing the editing in the edit space A2-1 moves from the edit space A2-1 to a print waiting space A3, as indicated by a white arrow #5. The user finishing the editing in the edit space A2-2 moves from the edit space A2-2 to the print waiting space A1 as indicated by a white arrow #6.

The user moving to the print waiting space A1 receives a sticker sheet from the discharge port disposed in the right side surface of the edit unit 12 and finishes one photo sticker creating game.

The configurations of the apparatuses will be described.

Configuration of Initial Service Section

Figure 4:
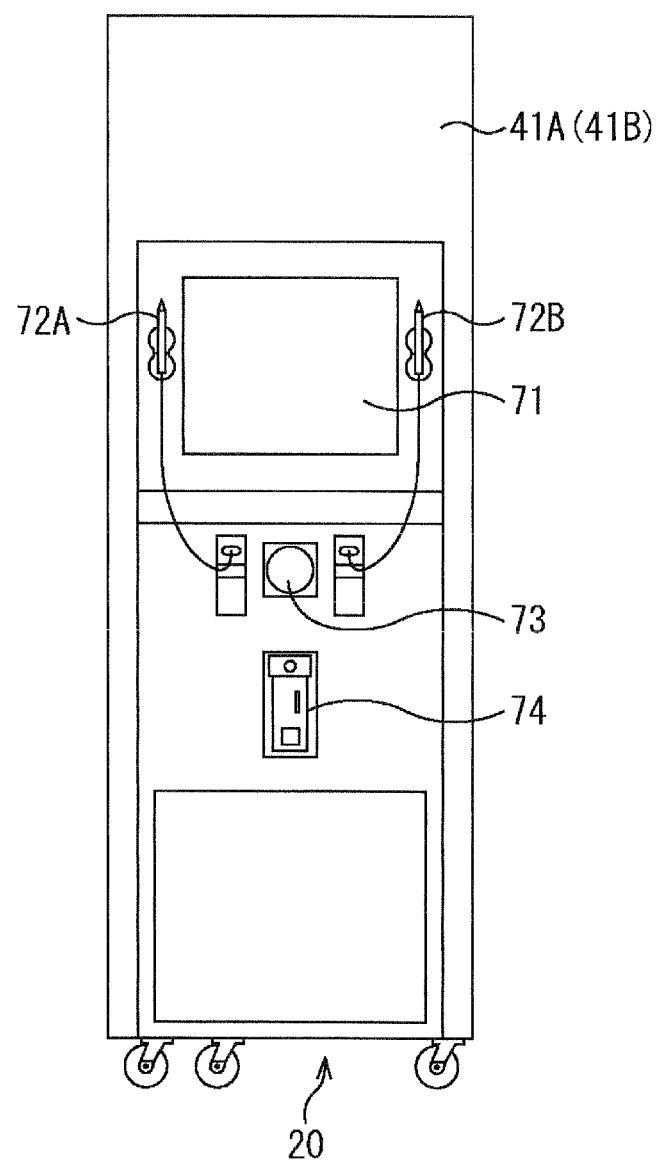
FIG. 4 is a diagram of a configuration example of a initial service section.

FIG. 4 is a front view showing an exemplary configuration of the initial service section 20 disposed on the side panel 41A (or the side panel 41B).

A tablet built-in monitor 71 is disposed on an upper portion of the initial service section 20. A stylus pen 72A is disposed on the left side and a stylus pen 72B is disposed on the right side across the tablet built-in monitor 71. The tablet built-in monitor 71 is configured a tablet which enables input of operation with a finger or the stylus pen 72A or 72B and is disposed with a display being exposed outside. The tablet built-in monitor 71 displays a screen used for the initial service process such as the course selection and the background selection. When two users perform the initial service operations at the same time with the two users facing the tablet built-in monitor 71, the stylus pen 72A is used by the user on the left side and the stylus pen 72B is used by the user on the right side.

A speaker 73 outputting sound such as guidance voice, BGM (background music), and sound effects of the initial service process is disposed under the tablet built-in monitor 71 and a coin insert/return slot 74 used by a user for inserting coins is disposed under the speaker 73.

Configuration of Shooting Section

Figure 5:
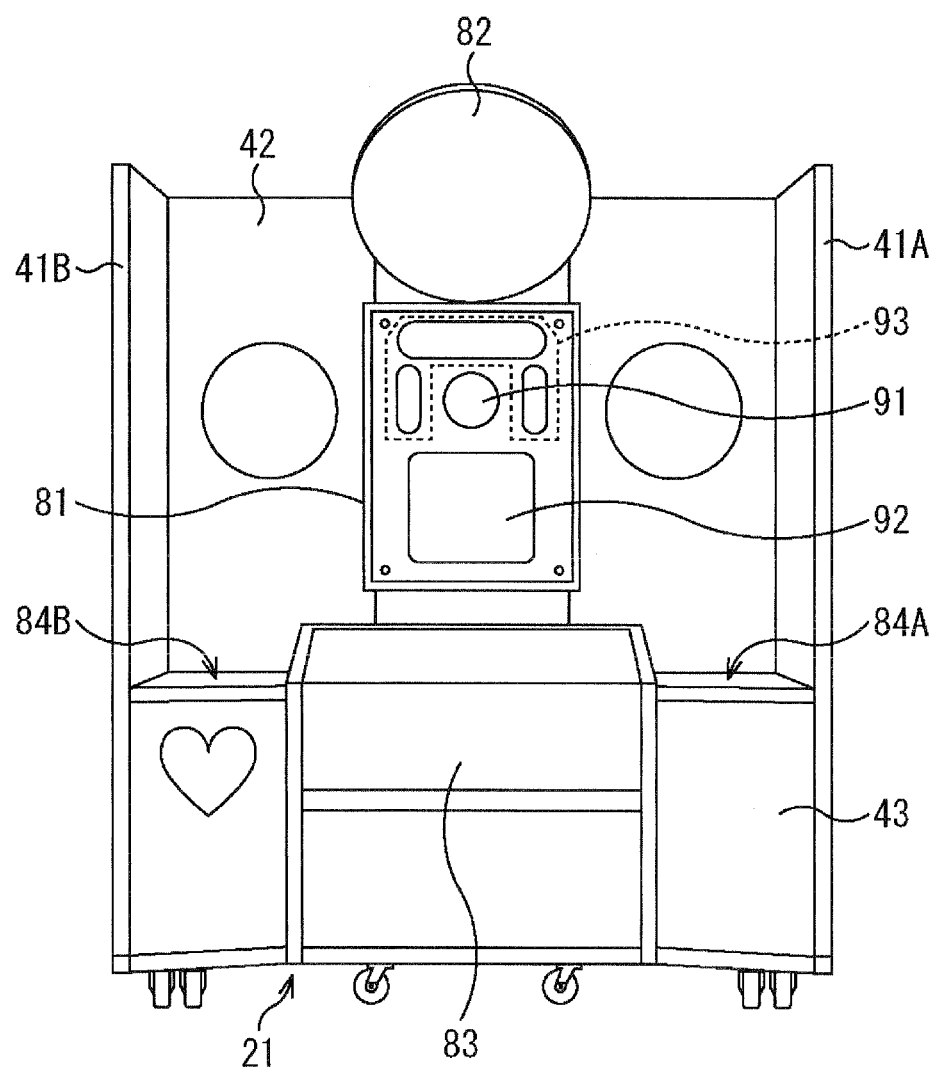
FIG. 5 is a diagram of a configuration example of a shooting section.

FIG. 5 is a front view showing an exemplary configuration of the shooting section 21. The shooting section 21 is made up of the side panel 41A, the side panel 41B, and the front panel 42 attached to a base member 43 having a box-like shape.

A camera unit 81 is disposed at the center of the front panel 42. The camera unit 81 is made up of a camera 91, a touch panel monitor 92, and a front strobe 93.

The camera 91 is, for example, a single-lens reflex camera, and is mounted inside the camera unit 81 with a lens exposed outside. The camera 91 has an imaging element such as a CCD (charge coupled device) image sensor and a CMOS (complementary metal oxide semiconductor) image sensor and captures an image of a user in the photographing space A1. A moving image captured by the camera 91 (hereinafter also referred to as a "live-view image") is displayed on the touch panel monitor 92 in real time. A still image is captured by the camera 91 at predetermined timing such as when a user gives an instruction for photographing and is then stored as a photographed image.

The front strobe 93 disposed above the camera 91 has one horizontally long elliptic light-emitting face and two vertically long elliptic light-emitting faces, where the light-emitting faces are made up of milky white acrylic plates. The front strobe 93 emits light in conjunction with the photographing by the camera 91 to illuminate the vicinity of the face of the user as an object from the front of the user.

The touch panel monitor 92 disposed under the camera unit 81 is made up of a monitor such as an LCD (liquid crystal display) and a touch panel laminated thereon. The touch panel monitor 92 has a function as a live-view monitor displaying the moving image captured by the camera 91 and a function of displaying various GUIs (graphical user interfaces) to receive a user's selection operation. The touch panel monitor 92 displays the moving image (the live-view image) and the still image (the photographed image) captured by the camera 91.

An upper strobe 82 with a curved light-emitting surface directed to the user is disposed above the camera unit 81. The upper strobe 82 emits light in conjunction with the photographing by the camera 91 to illuminate the user from above.

A foot strobe 83 is disposed in the center of the base member 43 to illuminate the lower body and the feet of the user.

Spaces 84A and 84B are formed on the upper surfaces of the base member 43 on the left and right, with the upper surface of the foot strobe 83 located therebetween. The spaces 84A and 84B are used as a baggage rack for placing baggage etc. of the user taking a photograph. Although not shown, a speaker outputting sound such as guidance voice, BGM, and sound effects of the photographing process is also disposed on the front panel 42 near a ceiling, for example.

Configuration of Background Section

Figure 6:
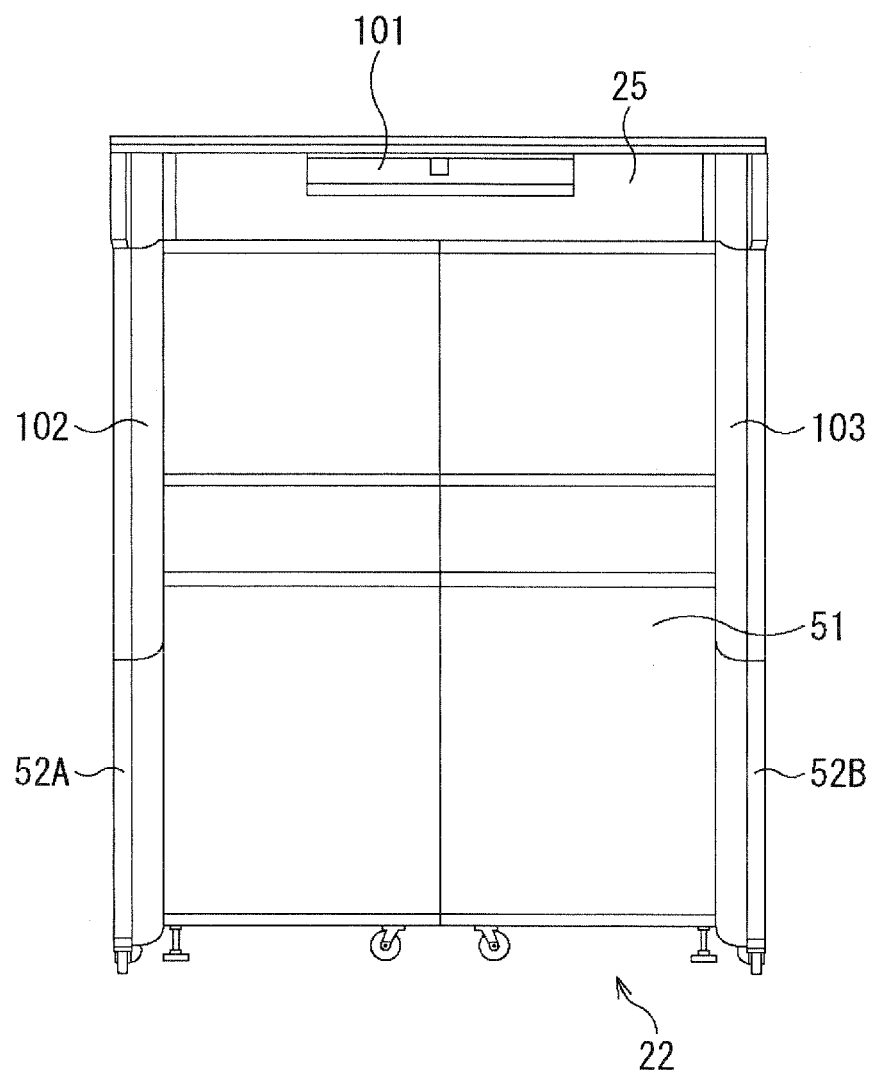
FIG. 6 is a diagram of a configuration example of a background section.

FIG. 6 is a side view showing an exemplary configuration of the photographing space A1 side of the background section 22.

As described above, the background curtain unit 25 is disposed on the upper side of the back panel 51. A back center strobe 101 is mounted substantially to the center of the background curtain unit 25 to illuminate the user performing the photographing process in the photographing space A1 from the center of the center rear.

A back right strobe 102 is mounted to the back panel 51 at a position close to the entrance/exit G1 to illuminate the user performing the photographing process in the photographing space A1 from the right rear. A back left strobe 103 is mounted to the back face panel 51 at a position close to the entrance/exit G2 to illuminate the users performing the photographing process in the photographing space A1 from the left rear.

Configuration of Edit Unit

Figure 7:
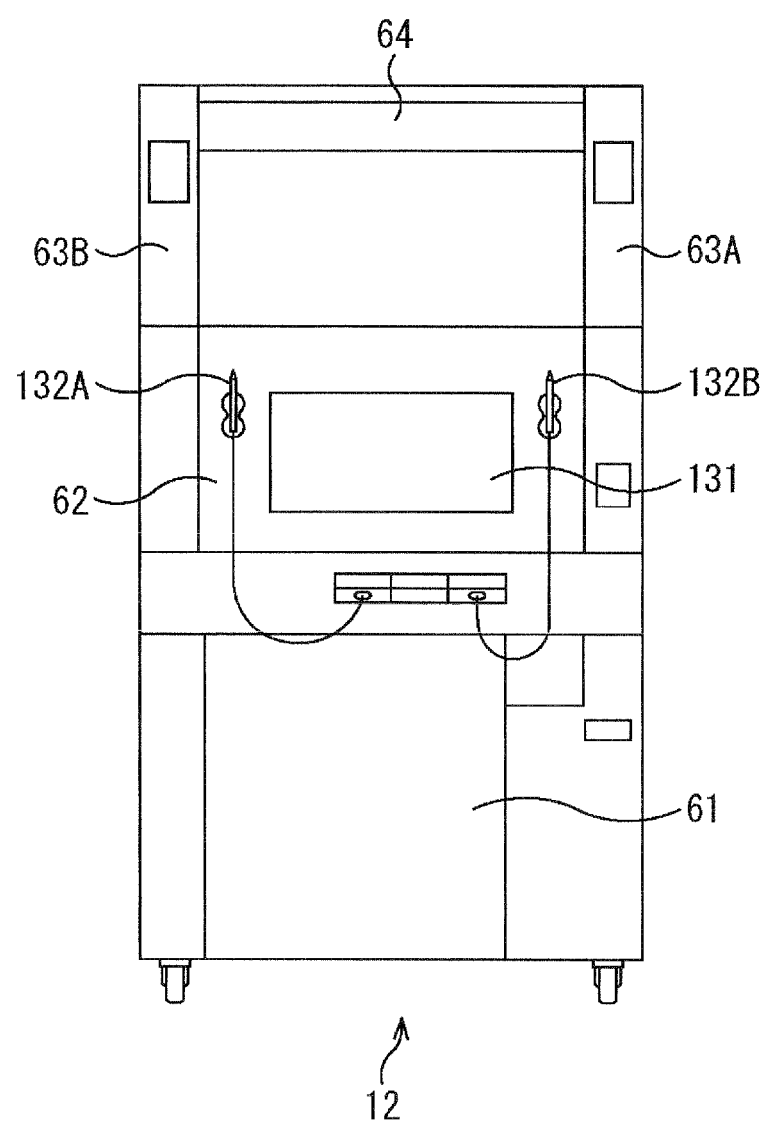
FIG. 7 is a diagram of a configuration example of a front face of an edit unit.

FIG. 7 is a front view showing an exemplary configuration of the edit unit 12 (on the edit space A2-1 side).

A tablet built-in monitor 131 is disposed on substantially the center of the slope 62. A stylus pen 132A and a stylus pen 132B are disposed on the left and right side, respectively, sandwiching the tablet built-in monitor 131.

The tablet built-in monitor 131 is configured by a tablet which enables input of operation with a finger or the stylus pen 132A or 132B and is disposed with a display being exposed outside. The tablet built-in monitor 131 displays an edit screen used for editing a photographed image, for example. When two users perform the edit operation at the same time with the two users facing the tablet built-in monitor 131, the stylus pen 132A is used by the user on the left side and the stylus pen 132B is used by the user on the right side.

Figure 8:
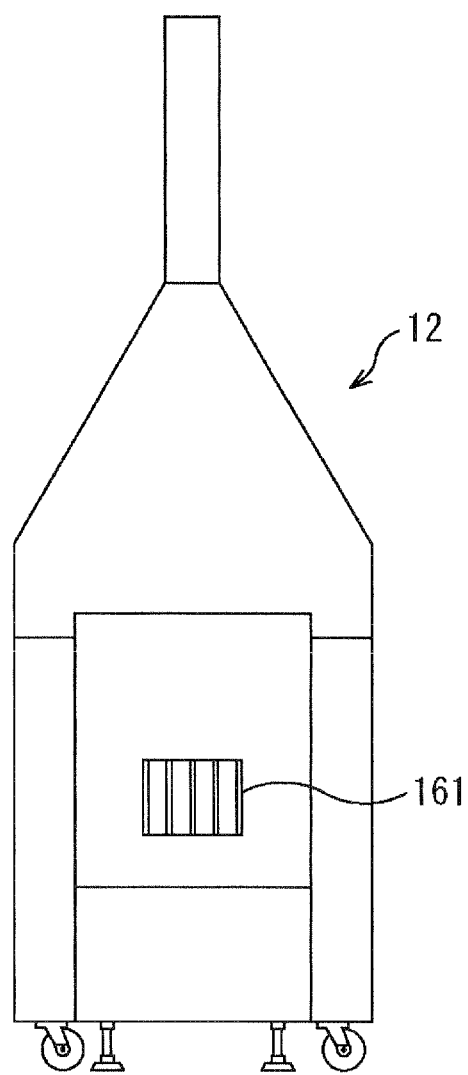
FIG. 8 is a diagram of a configuration example of a side face of the edit unit.

FIG. 8 is a side view showing an exemplary configuration of the right side of the edit unit 12.

A sticker sheet discharge port 161 is disposed at a lower portion of the right side of the edit unit 12. A printer is disposed inside the edit unit 12. An image of the users in the edit space A2-1 or an image of the users in the edit space A2-2 is printed on a sticker sheet and the printed sticker sheet is discharged from the sticker sheet discharge port 161.

Internal Configuration of Photo Sticker Creating Apparatus

Figure 9:
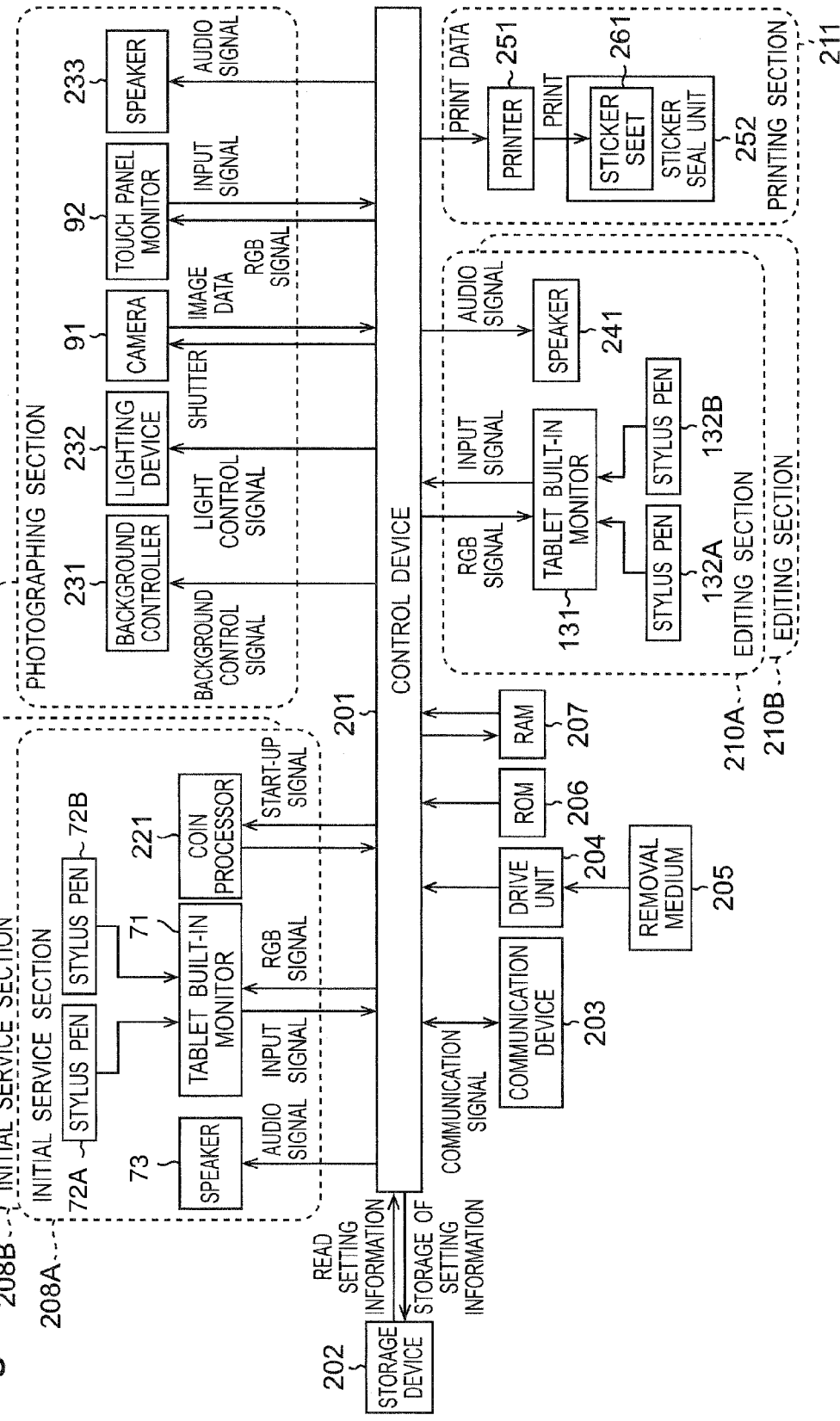
FIG. 9 is a block diagram of an internal configuration example of the photo sticker creating apparatus.

FIG. 9 is a block diagram of an internal exemplary configuration of the photo sticker creating apparatus 1. In FIG. 9, the constituent elements same as those described above are denoted by the same reference signs and will not redundantly be described.

A control device 201 is made up of a CPU (central processing unit) or the like, and executes programs stored in a ROM (read only memory) 206 and a storage device 202 to control overall operation of the photo sticker creating apparatus 1. The control device 201 is connected to the storage device 202, a communication device 203, a drive unit 204, the ROM 206, and a RAM (random access memory) 207. The control device 201 is also connected to constituent elements that are initial service sections 208A and 208B, a photographing section 209, editing sections 210A and 210B, and a printing section 211.

The storage device 202 is made up of a non-volatile storage medium such as a hard disk drive and a flash memory and stores various pieces of setting information supplied from the control device 201. The information stored in the storage device 202 is read by the control device 201 as needed.

The communication device 203 is an interface for a network such as the Internet and communicates with external apparatuses under the control of the control device 201. The communication device 203 transmits, for example, a photographed image and an edited image to a server. The images transmitted from the communication device 203 are stored in a predetermined storage area assigned thereto in the server and is displayed on or downloaded to a mobile terminal accessing the server.

The drive unit 204 is mounted, as needed, with a removable medium 205 that is made up of an optical disk or a semiconductor memory. Computer programs and data read by the drive unit 204 from the removable medium 205 are supplied to the control device 201, stored in the storage device 202, or installed.

The ROM 206 stores programs and data executed in the control device 201. The RAM 207 temporarily stores data and programs processed by the control device 201.

The initial service section 208A performs the initial service process for a user in the initial service space A0-1. The initial service section 208A is made up of the tablet built-in monitor 71, the stylus pens 72A and 72B, the speaker 73, and a coin processor 221. The initial service section 208B has the same configuration as the initial service section 208A and performs the initial service process for a user in the initial service space A0-2. The initial service sections 208A and 208B will hereinafter simply be referred to as the initial service section 208 if not particularly distinguished.

The tablet built-in monitor 71 displays various selection screens under the control of the control device 201 and detects a user s operation to the selection screens. Input signals indicative of details of the user's operation are supplied to the control device 201 which performs various selection processes.

The coin processor 221 detects insertion of coins to the coin insert/return slot 74. When detecting that coins in a certain amount, for example, 400 Japanese yen, are inserted, the coin processor 221 outputs an activation signal indicative of the insertion, to the control device 201.

The photographing section 209 performs the photographing process for a user in the photographing space A1. The photographing section 209 is made up of a background controller 231, a lighting device 232, the camera 91, the touch panel monitor 92, and a speaker 233.

The background controller 231 controls raising and lowering of the background curtain by the background curtain unit 25 in accordance with a background control signal supplied from the control device 201.

The lighting device 232 is each of strobes provided in the photographing space A1 and emits light in accordance with an illumination control signal supplied from the control device 201. In the photographing space A1, the strobe of the ceiling strobe unit 24 is provided as well as the front strobe 93, the upper strobe 82, the foot strobe 83 of the shooting section 21, the back center strobe 101, the back right strobe 102, and the back left strobe 103 of the background section 22.

The camera 91 takes a photograph in accordance with the shutter control of the control device 201 and outputs the image (image data) acquired from the photographing to the control device 201.

The editing section 210A performs the edit process for a user in the edit space A2-1. The editing section 210A is made up of the tablet built-in monitor 131, the stylus pens 132A and 132B, and a speaker 241. The editing section 210B has the same configuration as the editing section 210A and executes the edit process for a user in the edit space A2-2. The editing sections 210A and 210B will hereinafter simply be referred to as the editing section 210 if not particularly distinguished.

The tablet built-in monitor 131 displays an edit screen under the control of the control device 201 and detects a user's operation to the edit screen. Input signals indicative of details of user's operation are supplied to the control device 201 to edit the photographed image to be edited.

The printing section 211 performs a printing process to provide a printed sticker sheet to a user in the print waiting space A3. The printing section 211 includes a printer 251. The printer 251 is mounted with a sticker sheet unit 252.

The printer 251 prints the photographed image or the edited image on a sticker sheet 261 stored in the sticker sheet unit 252 based on print data supplied from the control device 201 and discharges the sticker sheet to the sticker sheet discharge port 161.

Configuration of Control Device

Figure 10:
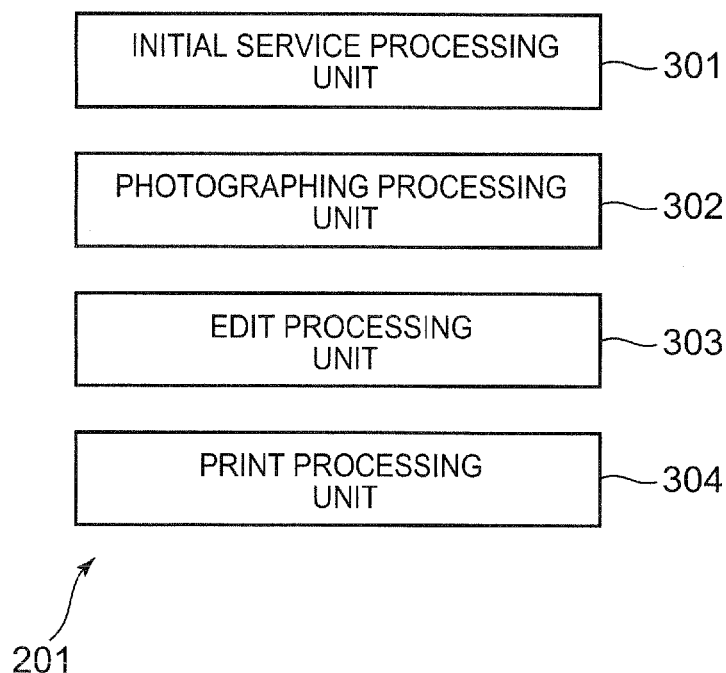
FIG. 10 is a block diagram of a functional configuration example of a control device.

FIG. 10 is a block diagram of an exemplary functional configuration of the control device 201. At least a part of functional blocks shown in FIG. 10 are implemented by executing a predetermined program by the CPU in the control device 201.

The control device 201 implements an initial service processing unit 301, a photographing processing unit 302, an edit processing unit 303, and a print processing unit 304.

The initial service processing unit 301 controls each of elements of the initial service section 208 to perform the initial service process. The photographing processing unit 302 controls each of elements of the photographing section 209 to perform the photographing process. The edit processing unit 303 controls each of elements of the editing section 210 to perform the edit process. The print processing unit 304 controls the printer 251 of the printing section 211 to perform the printing process.

Configuration Example of Edit Processing Unit

Figure 11:
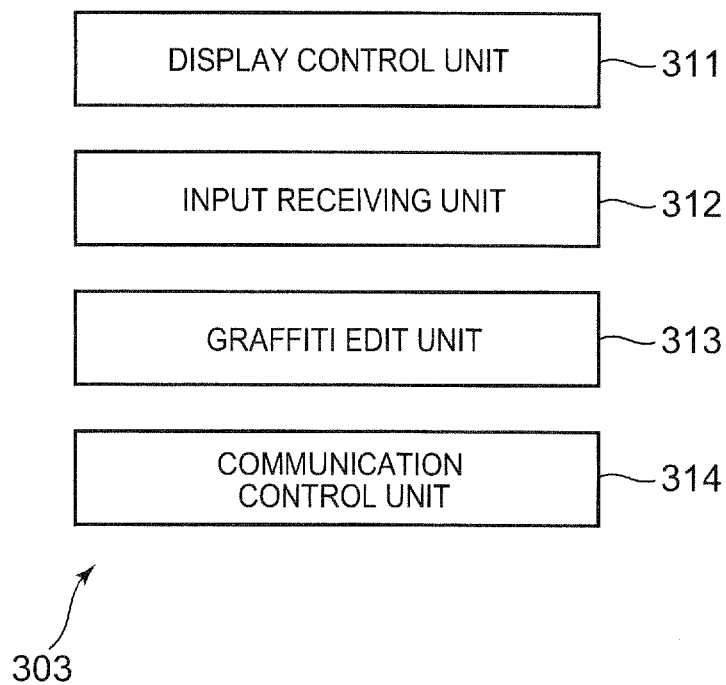
FIG. 11 is a block diagram of a functional configuration example of an edit processing unit.

FIG. 11 shows an exemplary functional configuration of the edit processing unit 303.

The edit processing unit 303 performs the edit process which allows a user to select a photographed image acquired from the photographing process as an edit target image (image to be edited), to allow the user to select an "image for composition" to be composited with the edit target image (the photographed image), composite the selected image for composition with the edit target image, and outputs the composited image as an edited image and transmits the photographed image or the edited image to an external server.

The images for composition include a pen image that is an image made up of a line composited in accordance with a drawing locus of drawing input from a user, a stamp image that is an image of a figure, a character, and so on composited at an arbitrary position on the photographed image, and a frame image that is an image of a graphic, a pattern, and so on composited at a predefined position on the photographed image. Therefore, the edit processing unit 303 composites the pen image, the stamp image, and the frame image with the photographed image based on input for edition from the user to generate a composite image.

The edit processing unit 303 is made up of a display control unit 311, an input receiving unit 312, a graffiti editing unit 313, and a communication control unit 314.

The display control unit 311 controls the display of the tablet built-in monitor 131 in the editing section 210. For example, the display control unit 311 displays the photographed image, as an edit target image to be edited that is a target of graffiti edit in a predetermined region, on the edit screen displayed on the display control unit 311, and displays images for composition to be composited with the photographed image in another region of the edit screen.

The input receiving unit 312 receives input of operation to the tablet built-in monitor 131 from the user using a finger or the stylus pen 132A and 132B. For example, the input receiving unit 312 receives selection of an image for composition to be composited with the edit target image displayed on the edit screen.

The graffiti edit unit 313 performs a process related to a graffiti edit operation to the photographed image performed by users in the edit space A2-1 and the edit space A2-2. Specifically, the graffiti edit unit 313 performs a composition process of compositing the image for composition selected by a user with the edit target image.

The communication control unit 314 controls the communication device 203 and performs a process related to the communication via a network such as the Internet. For example, the communication control unit 314 controls the communication device 203 to transmit the photographed image acquired from the photographing process and the edited image acquired as a result of the graffiti edit to an external server.

With the configuration as described above, the photo sticker creating apparatus 1 can transmit the photographed image and the edited image via the external server to a mobile terminal. In other words, the photo sticker creating apparatus 1 can photograph a user as a subject, allow the user to perform the graffiti edit to an acquired image, and transmit the image to the external server.

Operation of Photo Sticker Creating Apparatus

The operation of the photo sticker creating apparatus 1 providing the photo sticker creating game will be described with reference to a flowchart of FIG. 12.

The initial service processing unit 301 determines whether a predetermined amount of coins are inserted based on the activation signal supplied from the coin processor 221 (S1), and waits until it is determined that the predetermined amount of coins are inserted.

When it is determined that the coins are inserted (YES at step S1), the initial service processing unit 301 controls the initial service section 208 corresponding to one of the initial service spaces A0-1 and A0-2 in which the coins are inserted, so as to perform the initial service process in which various settings are performed by a user (S2). The various settings include selection of photographing conditions (such as the course selection for the photographing process performed in the photographing space and the background selection for the photographed image) and selection of BGM played in the photographing space. The photographing conditions include a background image that is a background of a subject in the photographed image acquired from the photographing performed in the photographing space, a category into which the background image is categorized, an image process applied to the photographed image, and picture condition of the object determined by illumination control and so on at the time of photographing.

The initial service processing unit 301 determines whether the user performing the initial service operation can move to the photographing space A1 (S3). Specifically, the initial service processing unit 301 determines whether the photographing space A1 is being used based on a progress of the photographing operation of the users of the preceding group. If it is determined that the user performing the initial service operation cannot move to the photographing space A1 because the photographing space A1 is being used, the process goes back to step S2 to continue the initial service process by giving guidance for the photographing process, for example.

If it is determined that the user can move to the photographing space A1 because the photographing space A1 is not being used (YES at step S3), the initial service processing unit 301 guides the user in the initial service space A0-1 or the initial service space A0-2 to move to the photographing space A1 (S4). The guiding for the movement to the photographing space A1 is provided by a guide screen displayed on the tablet built-in monitor 71 of the initial service section 208 or sound output from the speaker 73.

The photographing processing unit 302 controls the photographing section 209 to perform the photographing process by causing the touch panel monitor 92 to perform the live-view display of the moving image of the object captured by the camera 91 and by photographing the user in the photographing space A1 as the subject to acquire the photographed image (S5).

In the photographing process, for example, the photographing is performed seven times to acquire seven photographed images as a photographing result. The number of times of photographing is obviously not limited to seven.

The photographing processing unit 302 guides the user in the photographing space A1 to move to the edit space A2-1 or the edit space A2-2 (S6). The guiding for the movement to the edit space A2-1 or the edit space A2-2 is performed by a guide screen displayed on the touch panel monitor 92 of the photographing section 209 or sound output from the speaker 233.

The edit processing unit 303 controls the editing section 210 corresponding to one of the edit space A2-1 and the edit space A2-2 which is defined as the destination of the user who finishes the photographing process, so as to perform the edit process (S7). In the edit process, edit processing unit 303 allows the user to perform the graffiti edit on the photographed image acquired from the photographing process to generate the edited image subjected to the graffiti edit (S7). In the edit process, a sticker layout is determined by user's selection. The sticker layout represents the arrangement of the edited images or the photographed images printed on the sticker sheet, and the design (including color and graphics) of a region other than the region in which the edited images or the photographed images are arranged on the sticker sheet.

The edited image or the photographed image is transmitted via the external server to a mobile terminal such as a mobile phone owned by a user. Therefore, in the edit process, the user is prompted to input an e-mail address of the mobile terminal necessary for receiving an e-mail describing a URL required for accessing the server.

As a result, the server transmits, to the e-mail address input by the user, the e-mail describing a URL required for the mobile terminal to access the server. When the mobile terminal owned by the user accesses the server via the network such as the Internet based on the URL, the edited image or the photographed image transmitted to the server is sent to the mobile terminal.

Subsequently, the print processing unit 304 performs (starts) the printing process by outputting the photographed image acquired from the photographing process or the edited image acquired from the edit process, as a print image, to the printer 251 for printing it on a sticker sheet (S8).

After completion of the printing, the printer 251 discharges the sticker sheet with the printed image to the sticker sheet discharge port 161 (S9) and terminates the process. In this case, the edit processing unit 303 causes the tablet built-in monitor 131 to display that the printing is completed, for the user finishing the edit process in the edit space A2-1 or the edit space A2-2, thereby guiding the user to move to the print waiting space A3. The guiding for the movement to the print waiting space A3 may be performed by sound output from the speaker 241.

A predetermined game may be provided to and be played by the users after the edit process finishes until the printing of the sticker sheet finishes. For example, the use is allowed to play a so-called "spot the difference" game to find wrong points between two images by displaying two images which are apparently same but have several different points on the tablet built-in monitor 131 and prompting the users to find the different points within a predetermined time.

As a result, the user can spend the time after the edit process finishes until the printing of the sticker sheet finishes, without being bored.

Flow of Edit Process

Figure 13:
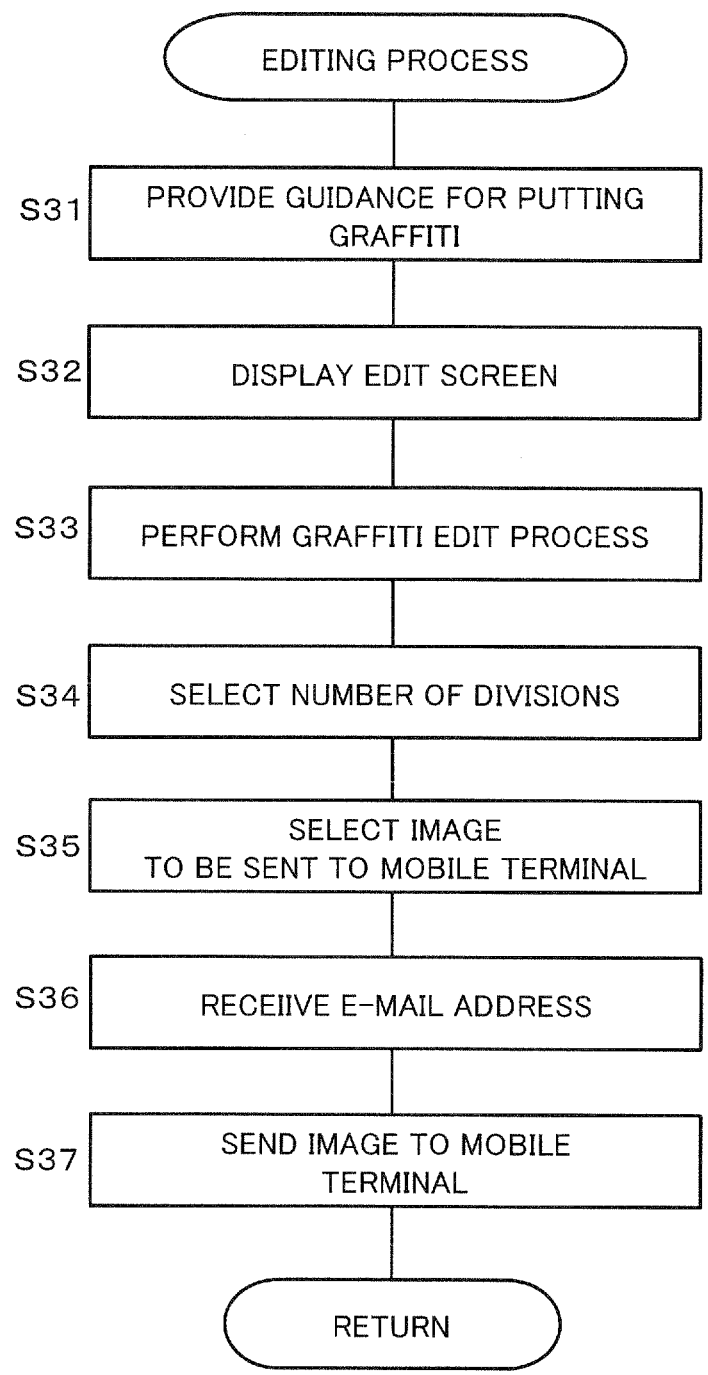
FIG. 13 is a flowchart for explaining an edit process in a first embodiment.

The flow of the edit process of the second embodiment will be described with reference to a flowchart of FIG. 13. This process is mainly executed by the edit processing unit 303 of the control device 201.

When the edit process is started, the edit processing unit 303 acquires, for example, seven photographed images acquired from the photographing process, from the storage device 202. The edit processing unit 303 controls the tablet built-in monitor 131, the speaker 241, and so on to output the image and sound introducing a flow of the graffiti operation (S31). As a result, the guidance for the graffiti operation is given to the users.

Subsequently, the display control unit 311 of the edit processing unit 303 displays the edit screen on the tablet built-in monitor 131 (S32).

The input receiving unit 312 and the graffiti edit unit 313 control the elements of the editing section 210A or 210B (in which the users perform the edit operation) to perform the graffiti edit process by receiving the graffiti edit operation to the photographed image from the users (S33). In particular, the graffiti editing section 313 composites an image for composition with the edit target image by the graffiti edit of the users.

When the graffiti edit operation is finished, the display control unit 311 controls the display control unit 311 to display a division number selection screen and the input accepting part 312 receives an instruction from the user of the division number selection screen. As a result, the number of division of the sticker sheet is selected (S34). The edit processing unit 303 determines the division number of the sticker sheet and sets the sticker layout according to an instruction from the users.

The information representative of the sticker layout is supplied to the print processing unit 304 and the print processing unit 304 prints the photographed image or the edited image on the sticker sheet in the sticker layout represented by the information.

Subsequently, the display control unit 311 controls the tablet built-in monitor 131 to display a selection screen for selecting an image to be transmitted to a mobile terminal and the input receiving unit 312 receives an instruction from the user, thereby allowing the user to select, for example, one photographed image as an image to be transmitted to a mobile terminal (S35). The image selected as the image to be transmitted to a mobile terminal is not limited to the photographed image, and it may be the edited image, and the number of images selected as the image to be transmitted to a mobile terminal is not limited to one and may be two or more.

The display control unit 311 controls the tablet built-in monitor 131 to display an e-mail address input screen, and the input receiving unit 312 receives an instruction from the users to receive input of the e-mail address of the mobile terminal owned by the user (S36).

Subsequently, after a predetermined time elapses, or when a finish button is operated, the communication control unit 314 controls the communication device 203 to transmit the image to be transmitted to the mobile terminal which is selected by the user along with the e-mail address input by the user via the network such as the Internet to a server managed by a manufacturer of the photo sticker creating apparatus 1, for example (S37).

The server transmits, to the e-mail address which is input by the user, an e-mail describing the URL required for the mobile terminal to access the server. When the mobile terminal owned by the user accesses the server via the network such as the Internet based on the URL, the image transmitted to the server is provided to the mobile terminal.

Figure 12:
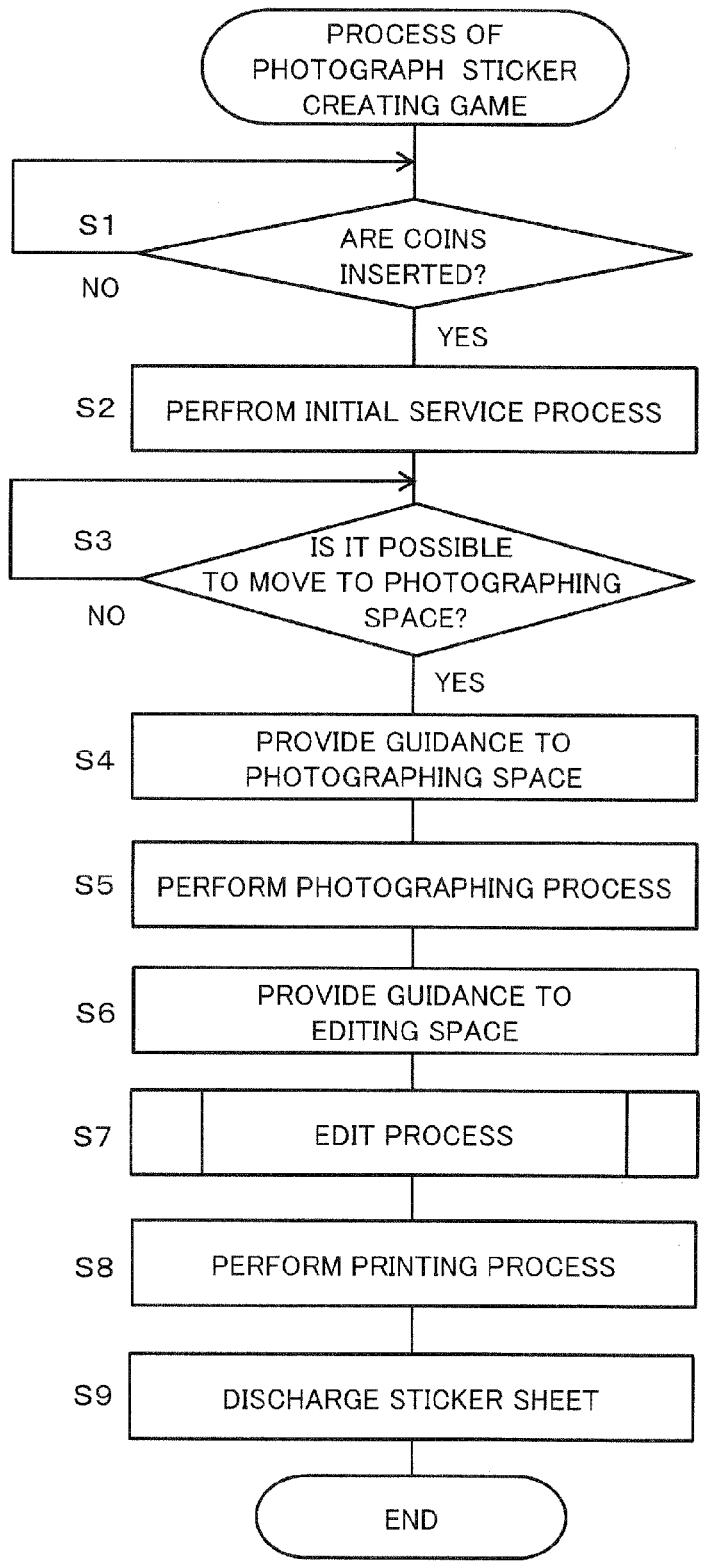
FIG. 12 is a flowchart for explaining an example of a flow of a photo sticker creating game process.

After step S37, the process goes back to step S7 of FIG. 12 and the subsequent processes are executed.

Example of Edit Screen

An example of the edit screen displayed at step S32 of FIG. 13 will be described with reference to FIG. 14.

Figure 14:
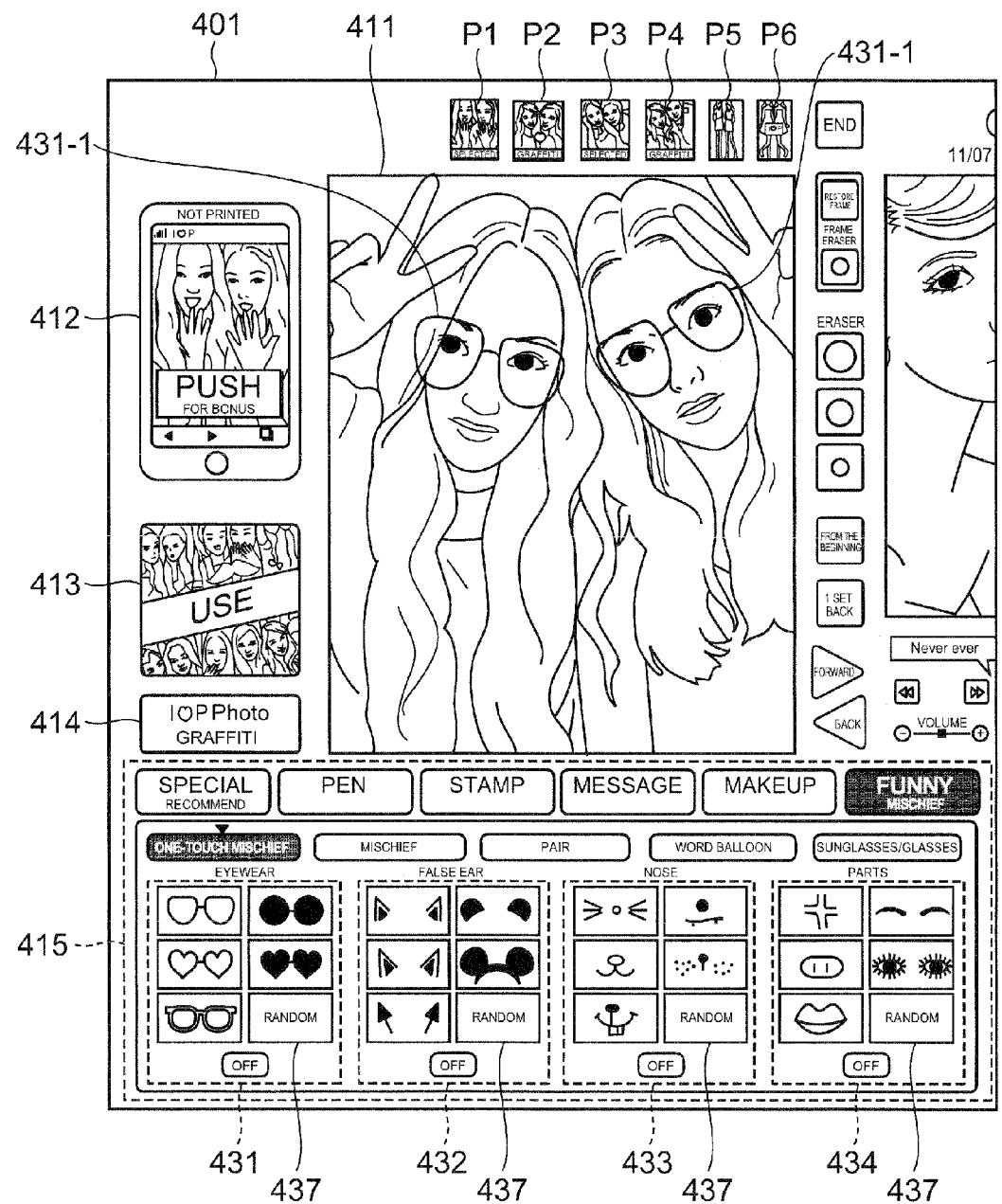
FIG. 14 is a diagram of an example of an edit screen in the first embodiment.

Although the edit screen has two each of the main constituent elements disposed respectively on the left and right sides except some elements, for convenience of description, an edit screen 401 shown in FIG. 14 and other drawings shows only a left half of the whole edit screen displayed on the tablet built-in monitor 131.

An edit target image display region 411 displays, as the edit target image, the photographed image corresponding to a thumbnail image selected by a user from thumbnail images P1 to P6 corresponding to six photographed images out of the seven photographed images displayed on the upper side thereof.

On the left side of the edit target image display region 411, a bonus button 412 is displayed that is to be operated when an image to be transmitted to the server is edited, along with a one-touch graffiti button 413 that is to be operated when a predetermined graffiti edit is performed by one-time operation.

The operation of the bonus button 412 enables creation of a bonus for a mobile terminal (a standby image for a mobile terminal or an image to be attached to an e-mail or a blog). The operation of the one-touch graffiti button 413 enables creation of the edited image composited with a plurality of images for composition by one-touch operation.

Under the one-touch graffiti button 413, a special graffiti button 414 is displayed that is to be operated when one photographed image which is not displayed as the thumbnail images P1 to P6 out of the seven photographed images is subjected to the graffiti edit dedicated to the photographed image.

Under the edit target image display region 411, an edit pallet 415 is displayed for allowing a user to select an edit tool providing an edit function for performing the graffiti edit to the edit target image displayed on the edit target image display region 411.

In the edit pallet 415, edit tools are displayed which are categorized by tabs of respective categories such as "RECOMMEND", "PEN", "STAMP", "MESSAGE", "MAKEUP", and "MISCHIEF". The edit function will hereinafter be described by taking the case of the "MISCHIEF" tab is selected as shown in FIG. 14, as an example.

As shown in FIG. 14, when the "MISCHIEF" tab is selected, buttons are displayed for respective types such as "ONE-TOUCH MISCHIEF", "MISCHIEF", "PAIR", "WORD BALLOON", and "SUNGLASSES/GLASSES". The edit tools are categorized and displayed for each type of the buttons. In the example of FIG. 14, the "ONE-TOUCH MISCHIEF" button is selected on the edit pallet 415.

When the "ONE-TOUCH MISCHIEF" button is selected, an eyewear stamp image group 431, a false ear stamp image group 432, a nose stamp image group 433, and a part stamp image group 434 are displayed on the edit pallet 415, as sets of multiple stamp images categorized by the group.

In this case, the display control unit 311 displays stamp images categorized in accordance with predetermined parts, specifically, facial parts (such as eyes, a nose, and a mouth), of a user in the edit target image, as stamp images included in the respective groups (the stamp image groups). When any stamp image is selected, the graffiti edit unit 313 recognizes the facial part (such as eyes, a nose, and a mouth) based on a face recognition process, and then composites the selected stamp image with a facial part corresponding to the group of the selected stamp image.

For example, the eyewear stamp image group 431 includes the images for composition that are images composited with eye portion of the user in the edit target image and are categorized into a group of stamp images representing glasses and sunglasses. When any stamp image included in the eyewear stamp image group 431 is selected on the edit pallet 415, the stamp image is composited with the eye portions of the respective users at one time in the edit target image displayed in the edit target image display region 411.

In the example of FIG. 14, a left upper stamp image is selected in the eyewear stamp image group 431, and the corresponding stamp image 431-1 is composited with the eye portions of two respective users in the edit target image.

The false ear stamp image group 432 includes the images for composition that are images composited with portions upper than the forehead of the user in the edit target image and that are categorized into a group of stamp images representing ears of animals and characters. When any stamp image included in the false ear stamp image group 432 is selected on the edit pallet 415, the stamp image is composited, at one time, with the portions upper than the foreheads of the respective users in the edit target image displayed in the edit target image display region 411.

The nose stamp image group 433 includes the images for composition that are images composited with nose portion of the user in the edit target image and that are categorized into a group of stamp images representing the noses and adjacent part thereof of animals and characters. When any stamp image included in the nose stamp image group 433 is selected on the edit pallet 415, the stamp image is composited, at one time, with the nose portions of the respective users in the edit target image displayed in the edit target image display region 411.

The part stamp image group 434 includes the images for composition that are images composited with facial parts (parts) of the user in the edit target image and that are categorized into a group of stamp images representing the parts themselves. When any stamp image included in the part stamp image group 434 is selected on the edit pallet 415, the stamp image is composited, at one time, with the corresponding parts (parts) of the respective users in the edit target image displayed in the edit target image display region 411.

The composition of the stamp image with each of facial parts of the users as described above is implemented by executing the face recognition process for the users in the edit target image. In particular, the stamp image is adjusted in size and/or direction thereof depending on the size and/or the direction of the face acquired by the face recognition and is composited with the corresponding part in the edit target image. The direction of the stamp image in this case represents not only two-dimensional inclination on the edit target image but also three-dimensional inclination including a depth direction. Operation buttons for changing a direction and a size of a stamp image may be disposed on the edit pallet 415 such that the stamp image to be composited is adjusted in direction and size by user's operation.

Figure 14A:
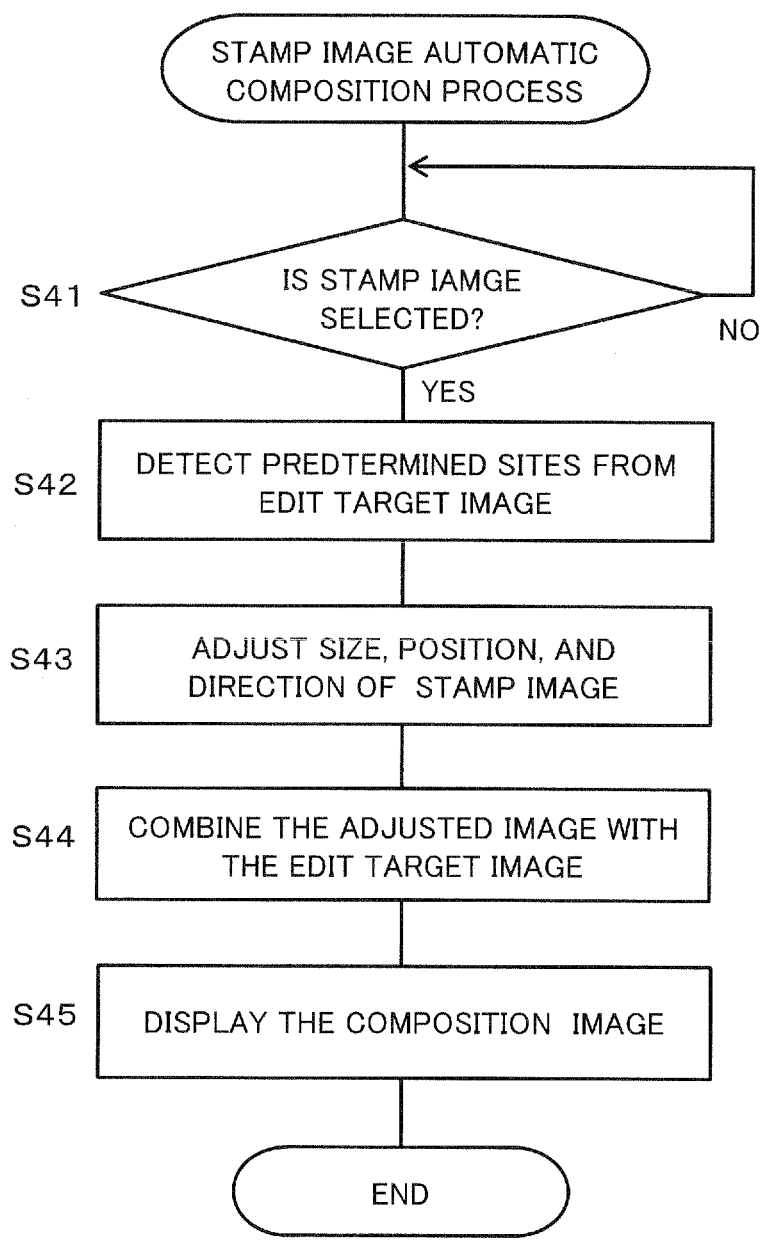
FIG. 14A is a flowchart of an example of a stamp image automatic composition process in the first embodiment.

FIG. 14A is a flowchart for explaining an automatic composition process of a stamp image. When a user selects one stamp image from one stamp image group (YES at S41), the edit processing unit 303 of the control device 201 detects a plurality of predetermined parts (such as eyes, a nose, and a mouth) from the edit target image (S42). Specifically, the edit processing unit 303 detects feature points (reference points) of the eyes, the nose, the mouth, etc. from the edit target image to detect these parts by using a face recognition function, and determines the positions, sizes, and/or directions of the parts. For example, the face recognition function detects, as the feature points (the reference points), the inner corners of the eyes, the outer corner of the eyes, the centers of the eyes, the center of the mouth, the left end of the mouth, the right end of the mouth, the top of the mouth, and the left and right ends of the nose, and detects the parts (the eyes, the mouth, the nose, and the entire face) based on the detected feature points. The edit processing unit 303 adjusts the selected stamp in size, position, and/or direction for the facial part corresponding to the selected stamp image, depending on the size, position, and direction of the detected part (S43). Subsequently, the edit processing unit 303 composites the adjusted stamp image with the edit target image (S44), and displays the composited image in the edit target image display region 411 (S45). If a plurality of faces is included in the photographed target image, the face recognition function is performed for each face and the stamp image is adjusted in position, size, and so on.

The stamp image adjustment process at step S43 described above will specifically be described. For example, a stamp image included in the eyewear stamp image group 431 is composited with the edit target image such that the center of the stamp image overlaps with a position defined based on the positions of the left and right eyes recognized by the face recognition of a user in the edit target image. In this case, the stamp image is composited in accordance with a three-dimensional direction (angle) of the user s face. Although it is assumed that no stamp image in the eyewear stamp image group 431 is composited with a user when one of the eyes is not recognized, the stamp image may be composited based on the position of the one recognized eye.

Figure 15:
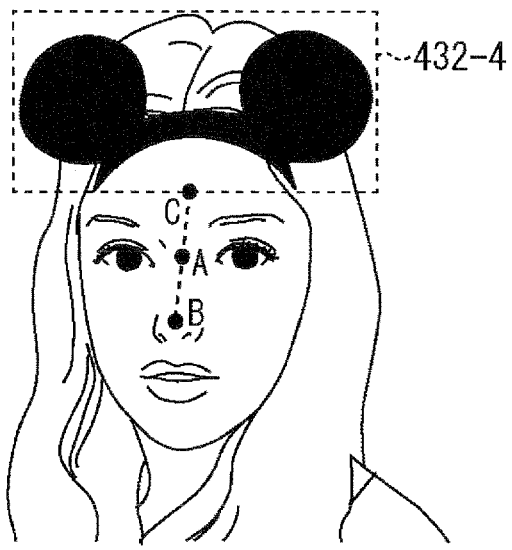
FIG. 15 is a diagram for explaining an example of composition of the stamp image.

A stamp image included in the false ear stamp image group 432 is composited with the edit target image such that the center of the stamp image overlaps with a position defined based on the positions of the left and right eyes and the position of the nose of a user recognized by the face recognition in the edit target image. Specifically, as shown in FIG. 15, a false ear stamp image 432-4 included in the false ear stamp image group 432 is composited such that the center of the base of the rectangular surrounding the false ear stamp image 432-4 overlaps with a position defined based on a point C, where the point C is obtained from a position A of a part between the left and right eyes and a position B of the nose recognized by the face recognition of a user and the point C and the position B are symmetric with respect to the position A.

A stamp image included in the nose stamp image group 433 is composited with the edit target image such that the center of the stamp image overlaps with a position defined based on the position of the nose recognized by the face recognition of a user in the edit target image. A stamp image included in the nose stamp image group 433 may be composited such that the center of the stamp image overlaps with a position shifted downward by a predetermined distance from the position between the left and right eyes recognized by the face recognition of a user.

Figure 16:
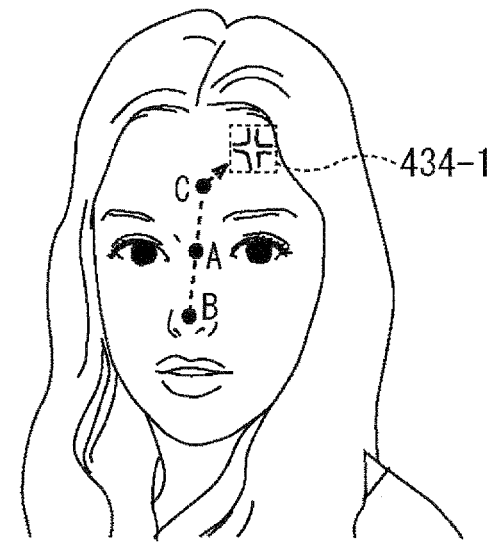
FIG. 16 is a diagram for explaining an example of composition of the stamp image.

A stamp image included in the part stamp image group 434 is composited with the edit target image such that the center of the stamp image overlaps with a position defined based on the position of each part recognized by the face recognition of a user in the edit target image. For example, as shown in FIG. 16, a stamp image 434-1 representing blood vessels out of the stamp images included in the part stamp image group 434 is composited such that the center of the stamp image 434-1 overlaps with a position shifted by a predetermined direction at a predetermined angle toward upper right from a point C, where the point C is obtained from a position A between the left and right eyes and a position B of the nose recognized by the face recognition of a user and the point C and the position B are symmetric with respect to the position A.

A stamp image included in the part stamp image group 434 is composited with the edit target image such that the center of the stamp image overlaps with a position defined based on the position of each part of a user recognized by the face recognition of the user in the edit target image. For example, a stamp image representing left and right eyebrows out of the stamp images included in the part stamp image group 434 is composited such that the center of the stamp image overlaps with a position between the left and right eyebrows recognized by the face recognition of a user in the edit target image, and a stamp image representing the lips is composited such that the center of the stamp image overlaps with the center of the lip recognized by the face recognition of a user in the edit target image.

After any stamp images included in the eyewear stamp image group 431, the false ear stamp image group 432, and the nose stamp image group 433 are selected and composited with parts of the face of the user in the edit target image, if another stamp image included in the same group (stamp image group) is selected, the previously selected and composited stamp image is erased (disappeared) and the subsequently selected stamp image is composited. Therefore, the most recently selected one of the stamp images included in the same group is reflected on the edit target image.

On the other hand, after any stamp image included in the part stamp image group 434 is selected and composited with each part of the face of the user in the edit target image, if another stamp image included in the part stamp image group 434 is selected, the previously selected and composited stamp image is not erased and the subsequently selected stamp image is composited.

In each group of the eyewear stamp image group 431, the false ear stamp image group 432, the nose stamp image group 433, and the part stamp image group 434, an OFF button is provided. If the OFF button is pressed, all the stamp images selected in the group and composited with the edit target image are erased (disappeared).

In each group of the eyewear stamp image group 431, the false ear stamp image group 432, the nose stamp image group 433, and the part stamp image group 434, a random button 437 is provided in addition to the stamp images included in each group. If the random button 437 is pressed, any stamp image included in the group is randomly selected and composited with a corresponding part of the face of the user in the edit target image.

More specifically, in the case of one user, when the random button 437 is pressed, any one stamp image included in the corresponding group is randomly selected and composited with the user in the edit target image. Each time the random button 437 is pressed, any one stamp image included in the corresponding group is randomly selected and composited with the user in the edit target image.

In the case of multiple users, when the random button 437 is pressed, multiple stamp images including at least one pair of stamp images different from each other are randomly selected and composited with the respective users in the edit target image. Each time the random button 437 is pressed, any one stamp image included in the corresponding group is randomly selected and composited with each of the users in the edit target image.

Figure 17:
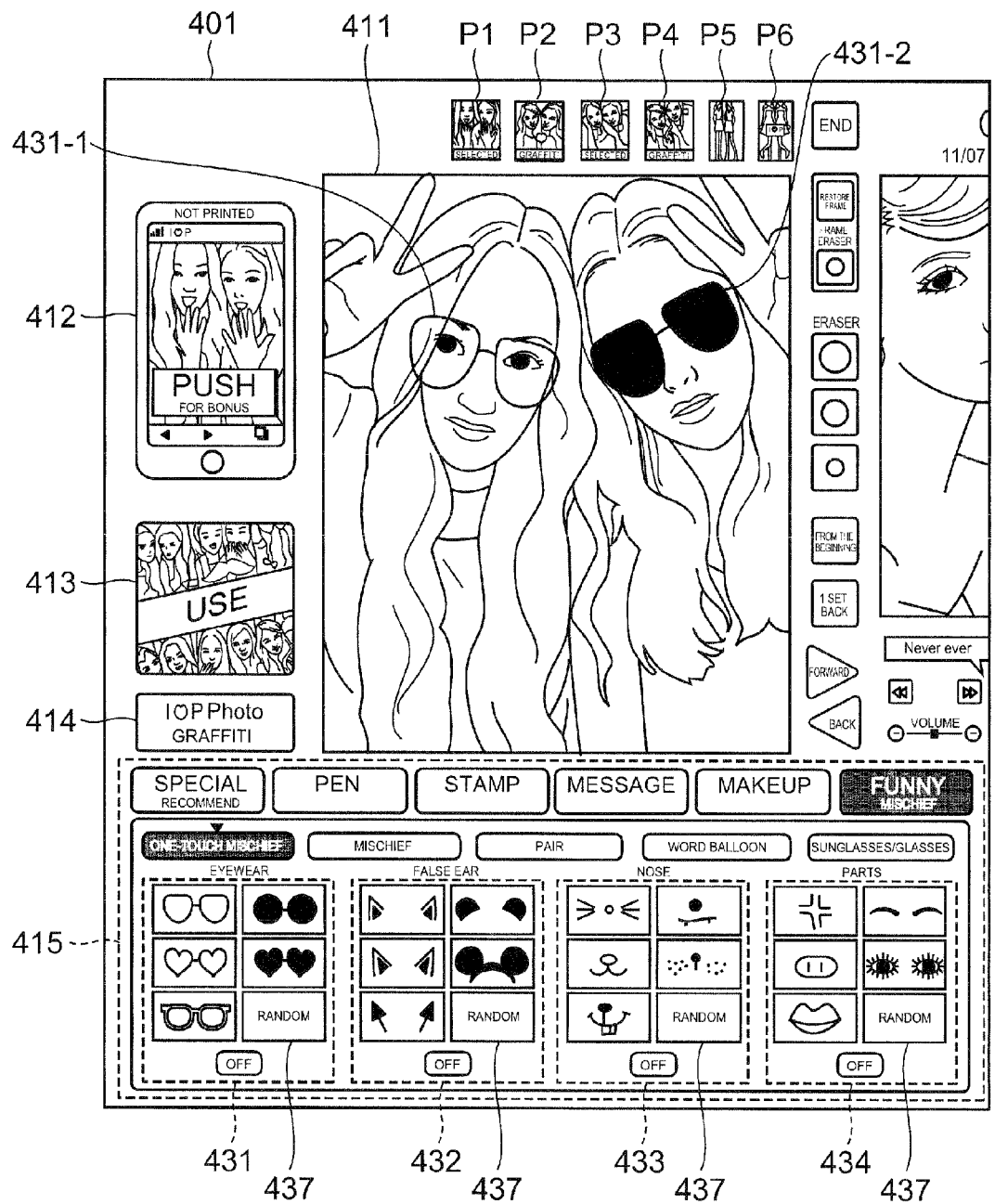
FIG. 17 is a diagram of an example of the edit screen.

For example, if the random button 437 included in the eyewear stamp image group 431 is pressed on the edit pallet 415, as shown in FIG. 17, the eyewear stamp image 431-1 is composited with the eye portion of the left user of the users in the edit target image. Each time the random button 437 is pressed, any stamp images included in the eyewear stamp image group 431 are randomly selected and composited with the eye portions of the respective users.

Figure 18:
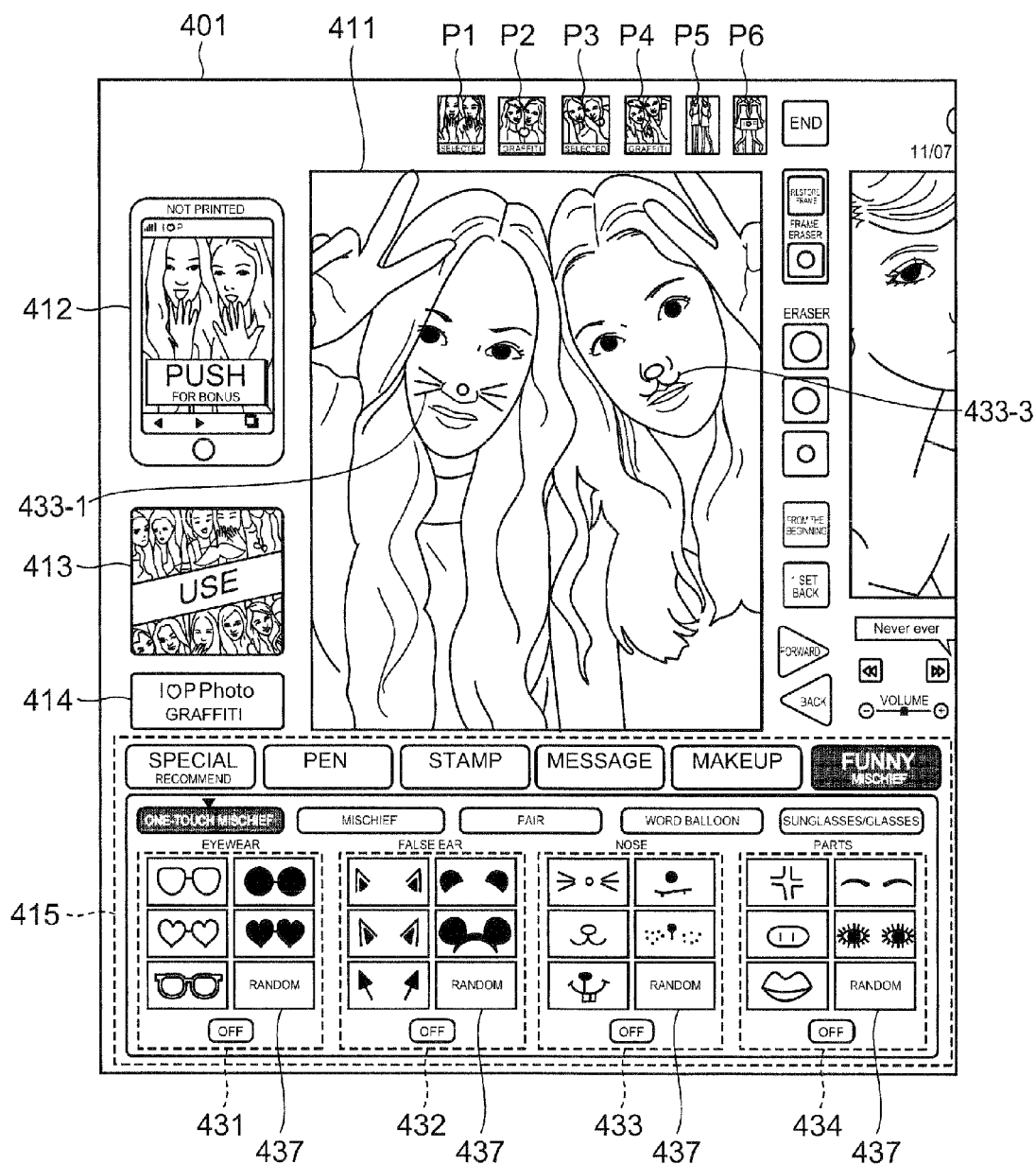
FIG. 18 is a diagram of an example of the edit screen.

If the random button 437 included in the nose stamp image group 433 is pressed on the edit pallet 415, as shown in FIG. 18, a nose stamp image 433-1 is composited with the nose portion of the left user of the users in the edit target image while a nose stamp image 433-3 is composited with the nose portion of the right user. Each time the random button 437 is pressed, any stamp images included in the nose stamp image group 433 are randomly selected and composited with the nose portions of the respective users.

As described above, a simple operation of pressing the random button 437 of the stamp image group causes stamp images included in a stamp image group to be randomly selected and composited with the respective users in the edit target image. Thus, a surprising and interesting image can more easily be provided to the users without the need of performing an operation for compositing a stamp image with each user (subject).

In the case of multiple users, all the stamp images composited with the respective users may not be different from each other.

If the random button 437 included in the part stamp image group 434 is pressed on the edit pallet 415, any multiple stamp images included in the part stamp image group 434 are randomly selected, and the selected stamp images are combined and composited with the parts of the faces of the respective users in the edit target image.

Figure 19:
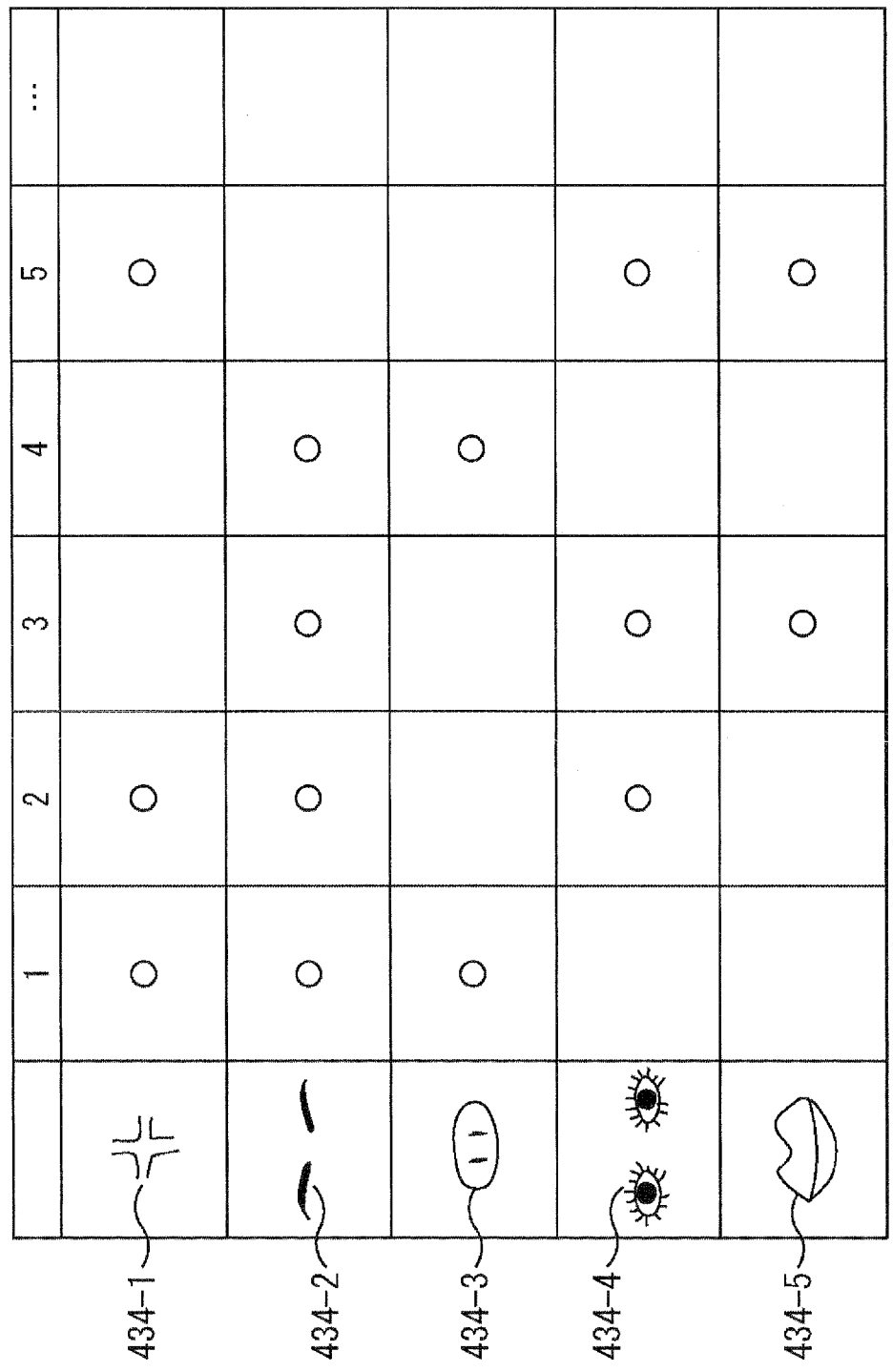
FIG. 19 is a diagram for explaining patterns of combination of stamp images.
Figure 20:
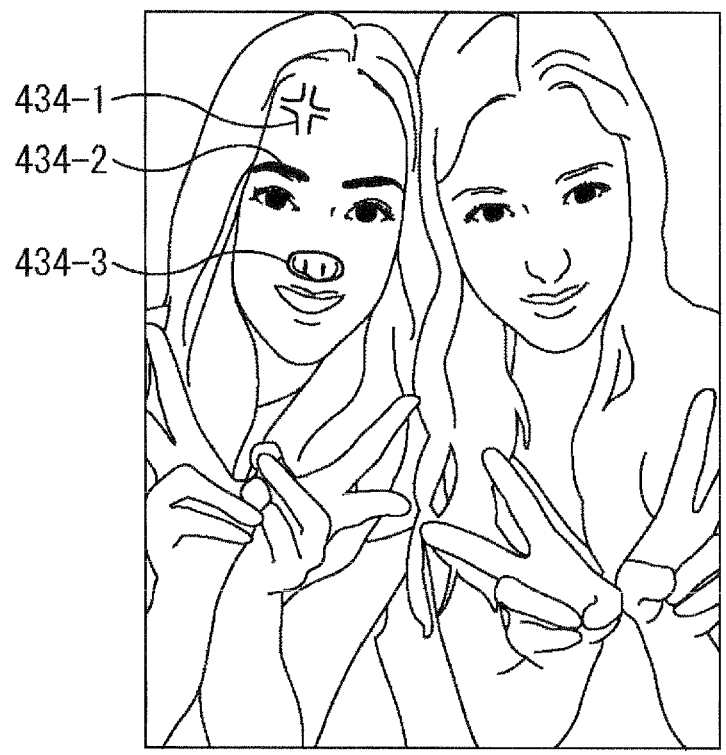
FIG. 20 is a diagram for explaining composition of composited stamp images.

Specifically, when the random button 437 included in the part stamp image group 434 is pressed, multiple part stamp images are randomly selected out of five part stamp images 434-1 to 434-5 included in the part stamp image group 434. FIG. 19 is a diagram of examples of combination of randomly selected stamp images in the part stamp image group 434. As shown in FIG. 19, for example, the part stamp images 434-1, 434-2, and 434-3 are randomly selected and combined. In this case, as shown in FIG. 20, the combined part stamp images 434-1, 434-2, and 434-3 are composited with the left user in the edit target image.

When the random button 437 included in the part stamp image group 434 is pressed for the second time, the part stamp images 434-1, 434-2, and 434-4 are randomly selected and combined. When the random button is pressed for the third time, the part stamp images 434-2, 434-4, and 434-5 are randomly selected and combined. When the random button 437 is pressed for the fourth time, the part stamp images 434-2 and 434-3 are combined. When the random button 437 is pressed for the fifth time, the part stamp images 434-1, 434-4, and 434-5 are combined.

As described above, each time the random button 437 included in the part stamp image group 434 is pressed, any part stamp images included in the part stamp image group 434 are randomly selected and combined and then are composited with the parts of the face of the user in the edit target image. Therefore, a surprising and interesting image can more easily be provided to the users without performing the operation of compositing a stamp image a number of times.

If there are multiple users for the edit target image, the stamp images may be selected as follows. For example, in the case of two users, when the random button 437 is pressed for the first time, the stamp images in a randomly selected first combination may be composited with the left user and the stamp images in a randomly selected second combination may be composited with the right user. When the random button 437 is pressed for the second time, the stamp images in a randomly selected third combination may be composited with the left user, and the stamp images in a randomly selected fourth combination may be composited with the right user. Alternatively, the stamp images may randomly be composited as shown in FIG. 19 for each user and may be composited with each user in the edit target image each time the random button 437 is pressed.

An interchange button may be disposed in a predetermined region of the edit screen 401. When the interchange button is operated, the stamp images composited with the multiple users may be interchanged between respective users. Specifically, in the case of two users in the edit target image, the stamp images composited with the respective users may be interchanged between the users. In the case of three users, the stamp images composited with the respective users may randomly be interchanged among the three users.

In the above description, any stamp images included in the stamp image groups are randomly selected and composited with the edit target image in accordance with the operation to the eyewear stamp image group 431, the false ear stamp image group 432, the nose stamp image group 433, and the part stamp image group 434, or specifically, in accordance with the selection of the random buttons 437 of the stamp image groups. However any stamp images included in a category or a type may randomly be selected and composited with the edit target image in accordance with the operation to a tab categorized into each category or a button categorized into each type on the edit pallet 415.

For example, when the "MISCHIEF" tab is selected and "ONE-TOUCH MISCHIEF" button is selected, one random button may be disposed on the edit pallet 415 for the entire stamp image group (i.e., one tab) instead of disposing the random buttons 437 for the respective stamp image groups 431 to 434. When this random button is selected, a plurality of stamp images are randomly selected across the stamp image groups. In this case, a combination of the multiple stamp images may be for example, combination of the stamp images representing the ears and the nose of the same animal (such as a cat or a mouse) out of the stamp images included in the false ear stamp image group 432 and the nose stamp image group 433, for example.

In the above description, the stamp images are composited with the corresponding parts of the faces of the respective users in the edit target image based on a result of the face recognition. However the positions of composition of the stamp images may be determined by user's operation.

Specifically, when any stamp image included in any group is selected with a user's finger or the stylus pen 132A or 132B on the edit pallet 415 and a predetermined position is then selected in the edit target image display region 411, the stamp image selected on the edit pallet 415 may be composited at a corresponding position in the edit target image displayed in the edit target image display region 411.

Figure 21:
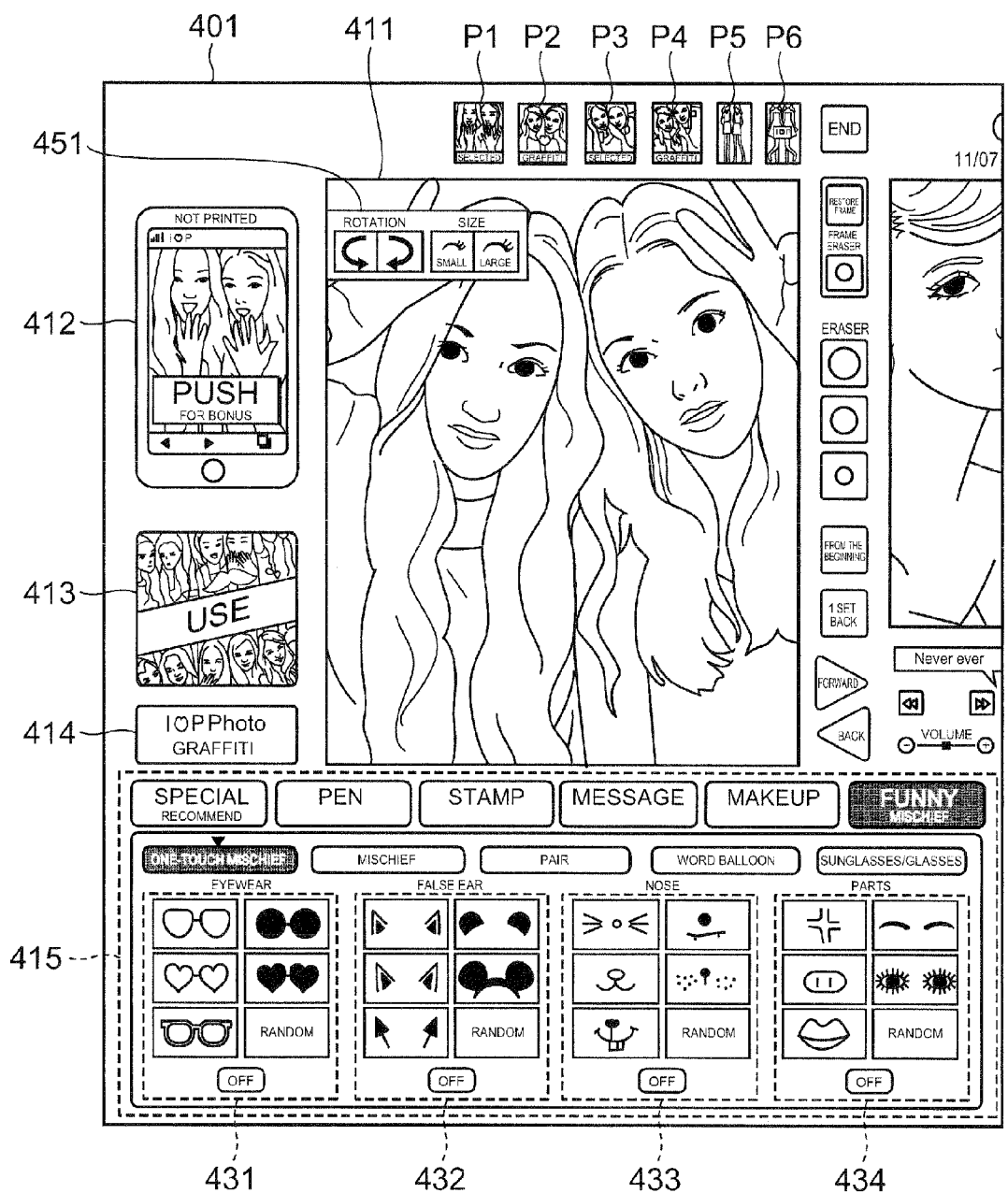
FIG. 21 is a diagram of an example of the edit screen.

In this case, as shown in FIG. 21, operation icons 451 for changing the direction and the size of the stamp image to be composited may be displayed on the edit target image display region 411. The operation icons 451 include an icon for rotating the stamp image displayed on the edit target image display region 411 and an icon for changing the size. The operation icons 451 are displayed so as not to overlap with the faces of the users in the edit target image in the edit target image display region 411.

In this case, The stamp image may be moved by sliding user's finger or the stylus pen 132A or 132B while the stamp image is held by user's finger or the stylus pen 132A or 132B on the edit target image display region 411.

When the position of composition of the stamp image is determined by the user's operation in this way, an interesting image can be provided in accordance with user's idea.

Description has been made of an example of composition of the stamp images when the "MISCHIEF" tab is selected and the "ONE-TOUCH MISCHIEF" button is selected on the edit palette 415.

Next, description will then be made of an example of composition of the stamp images when the "MISCHIEF" tab is selected and a "MISCHIEF" button is selected.

Figure 22:
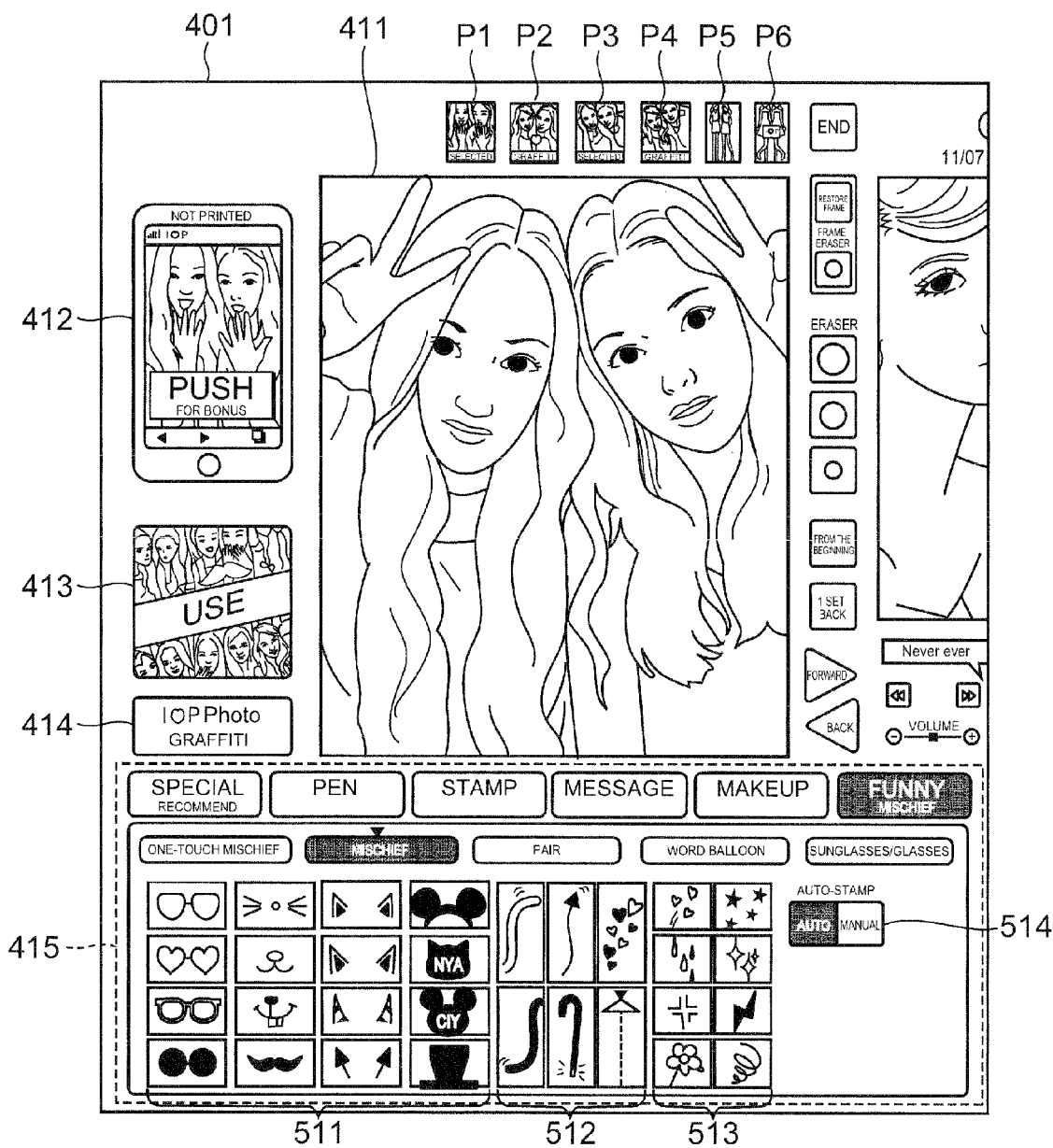
FIG. 22 is a diagram of an example of the edit screen.

As shown in FIG. 22, when the "MISCHIEF" tab is selected, stamp image groups 511, 512, and 513, and an auto-stamp button 514 are displayed on the edit palette 415.

In this case, the display control unit 311 displays stamp images categorized in accordance with predetermined parts, or specifically, parts of the face and the body parts other than the face of a user in the edit target image, as stamp images included in the respective groups (the stamp image groups). When any stamp image is selected, the graffiti edit unit 313 composites the selected stamp image with a facial or body part corresponding to the group. However, even in the case of multiple users, the stamp images included in the stamp image groups 511, 512, and 513 are not composited at one time with the respective multiple users in the edit target image.

The stamp image group 511 is made up of stamp images composited with parts of the face of a user in the edit target image and includes the stamp images same as those included in the eyewear stamp image group 431, the false ear stamp image group 432, and the nose stamp image group 433 described above.

The stamp image group 512 is made up of stamp images composited with parts (specifically, a hand, a waist, etc.) of the body other than the face and the vicinity of the body of a user in the edit target image. The stamp image group 513 is made up of stamp images composited with an arbitrary region in the edit target image.

The auto-stamp button 514 is a button for allowing a user to select whether the stamp images included in the stamp image groups 511, 512, and 513 are automatically composited ("apply automatically"), or composited in accordance with user's operation ("apply manually"), at corresponding positions in the edit target image.

In the example of FIG. 22, "AUTO" which means to apply automatically is selected in the auto-stamp button 514. In this state, if a stamp image included in the stamp image group 511 is selected with a user's finger or the stylus pen 132A or 132B and a position in a region near the face of a user formed by the face recognition is selected (tapped) or a slide operation is performed from the outside toward the inside of the region near the face in the edit target image displayed in the edit target image display region 411, then the graffiti edit unit 313 composites the stamp image selected on the edit pallet 415 with the corresponding part of the face of the user in the edit target image. In this case, the stamp image is adjusted in direction and size depending on the direction and the size of the face of the user and then is composited.

In the state that "AUTO" (apply automatically) is selected in the auto-stamp button 514, if a stamp image included in the stamp image group 512 is selected with a user's finger or the stylus pen 132A or 132B and a position in a region near the body of a user detected by person recognition is selected (tapped) or a slide operation is performed from the outside toward the inside of the region near the body in the edit target image displayed in the edit target image display region 411, the graffiti edit unit 313 composites the stamp image selected on the edit pallet 415 with the corresponding part of the body of the user in the edit target image. In this case, the stamp image is adjusted in direction and size depending on the direction and the size of the face of the user and then is composited.

In the state that "AUTO" (apply automatically) is selected in the auto-stamp button 514, if a stamp image included in the stamp image group 513 is selected with a user's finger or the stylus pen 132A or 132B, the graffiti edit unit 313 composites the stamp image selected on the edit pallet 415 with a region other than the region of the user in the edit target image, for example.

Figure 23:
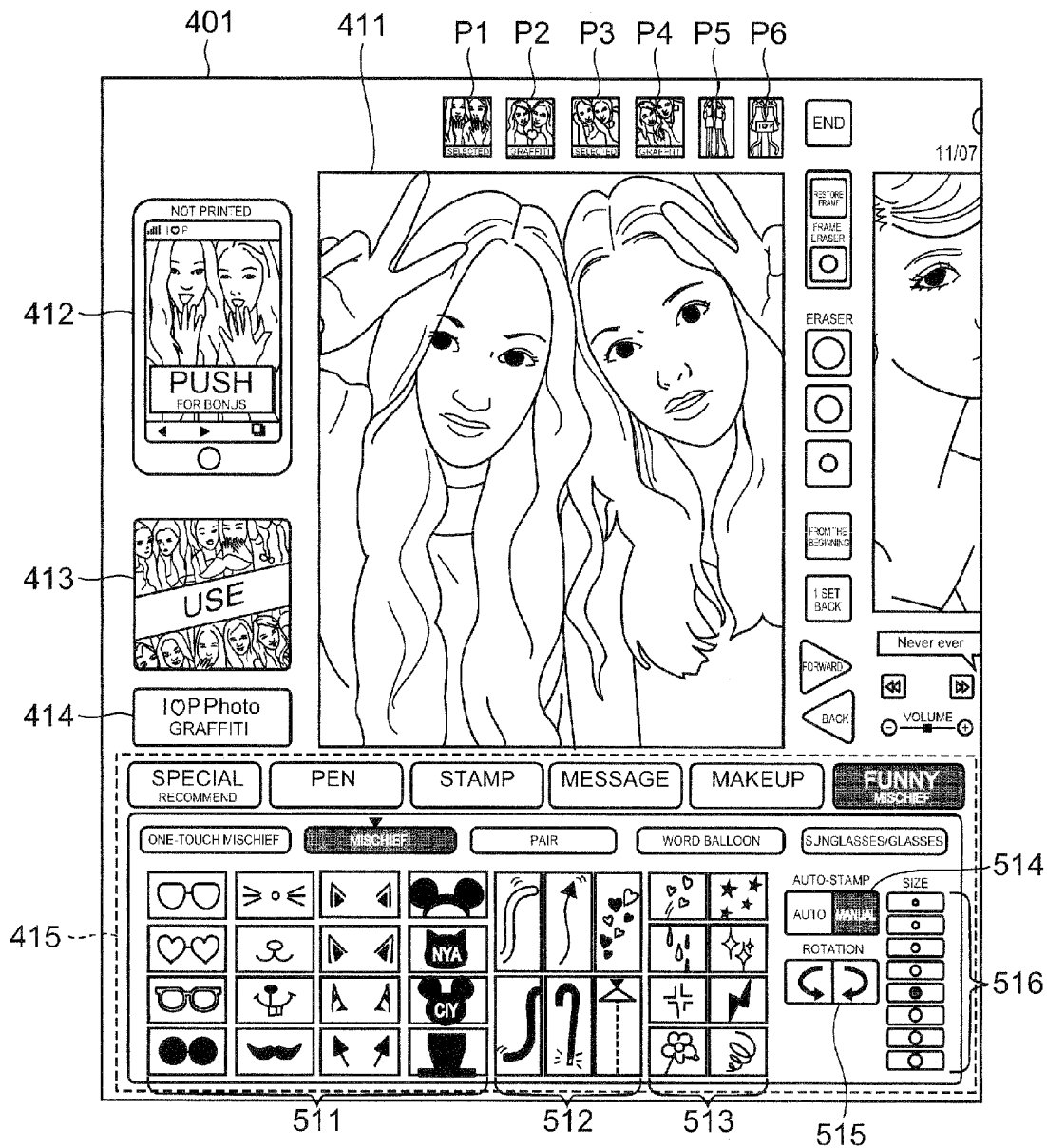
FIG. 23 is a diagram of an example of the edit screen.

On the other hand, in the state that "MANUAL" (apply manually) is selected by the auto-stamp button 514 in the example of FIG. 23, if a stamp image included in the stamp image group 511, 512, or 513 is selected with a user's finger or the stylus pen 132A or 132B and a predetermined position in the edit target image display region 411 is then selected, the stamp image selected on the edit pallet 415 is composited at the corresponding position of the edit target image displayed in the edit target image display region 411.

If "MANUAL" which means to apply manually is selected by the auto-stamp button 514, a rotation button 515 and a size change button 516 are displayed on the edit pallet 415. The graffiti edit unit 313 adjusts a stamp image in direction and size depending on user's operation to the rotation button 515 and the size change button 516 and composites the stamp image with the image in the edit target image display region 411. Each time the rotation button 515 is pressed, the stamp image is rotated clockwise or counterclockwise by a predetermined angle. Each time the size change button 515 is pressed, the stamp image is scaled up or down by a predetermined size.

Even when "AUTO" (apply automatically) is selected by the auto-stamp button 514, the rotation button 515 and the size change button 516 may be displayed. However, in this case, the rotation button 515 and the size change button 516 are brought into a non-active state so as not to receive selection by a user.

Next, description will then be made of an example of composition of the stamp images when the "MAKEUP" tab is selected and a "COLORED CONTACT LENS" button is selected.

Figure 24:
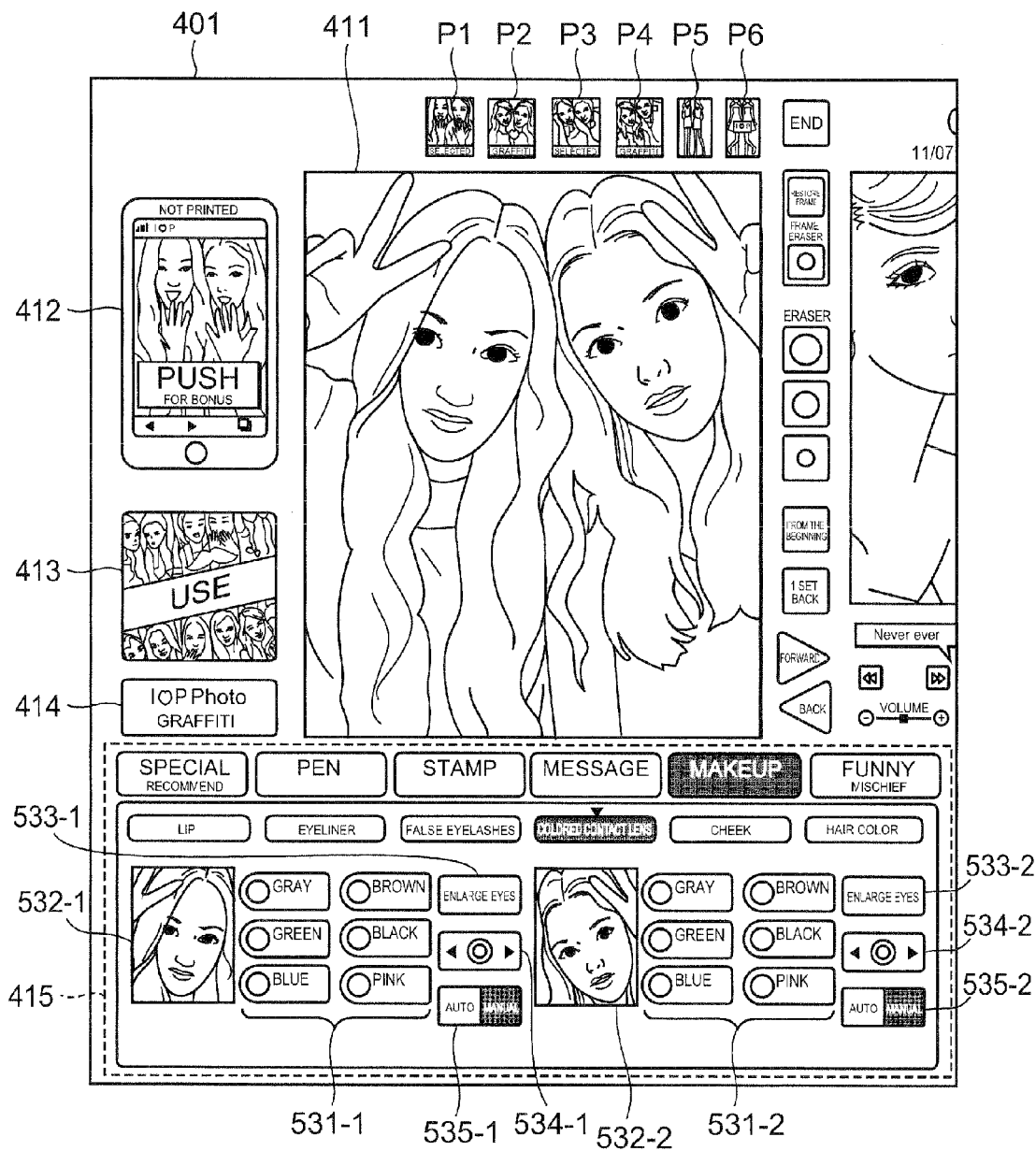
FIG. 24 is a diagram of an example of the edit screen.

As shown in FIG. 24, when the "COLORED CONTACT LENS" tab is selected, the display control unit 311 displays color contact stamp images 531-1, an subject image 532-1, an eye enlargement button 533-1, a size change button 534-1, and an auto-stamp button 535-1 in a region on the left side of the edit pallet 415.

The colored contact lens stamp images 531-1 are images representing colored contact lenses and are images for composition which is to be composited with eye portions of a user in the edit target image. The subject image 532-1 is an image of the face of the left user of the two users in the edit target image, with which any of the color contact stamp images 531-1 are composited.

The eye enlargement button 533-1 is a button for performing enlarged display of the eye portion of the left user in the edit target image of the edit target image display region 411 and the subject image 532-1. The size change button 534-1 is a button for adjusting the size of the colored contact lens stamp images 531-1 composited with the eye portion of the left user in the edit target image.

The auto-stamp button 535-1 has the function same as the auto-stamp button 514 described above and is a button for allowing a user to select whether the colored contact lens stamp images 531-1 are automatically composited, or composited in accordance with a user's operation, with the eye portion of the left user in the edit target image.

Additionally, colored contact lens stamp images 531-2, a subject image 532-2, an eye enlargement button 533-2, a size change button 534-2, and an auto-stamp button 535-2 are displayed in a region on the right side of the edit pallet 415. Basically, they are the same as those for the right side user except that the subject image 532-2 is an image of the face of the right user of the two users in the edit target image.

As described above, in this embodiment, in the case of two users, one user can select and composite a colored contact lens stamp image for each of the users (subjects) in the edit target image.

The edit pallet 415 shown in FIG. 24 is displayed when two faces are recognized by the face recognition process for the edit target image.

Figure 25:
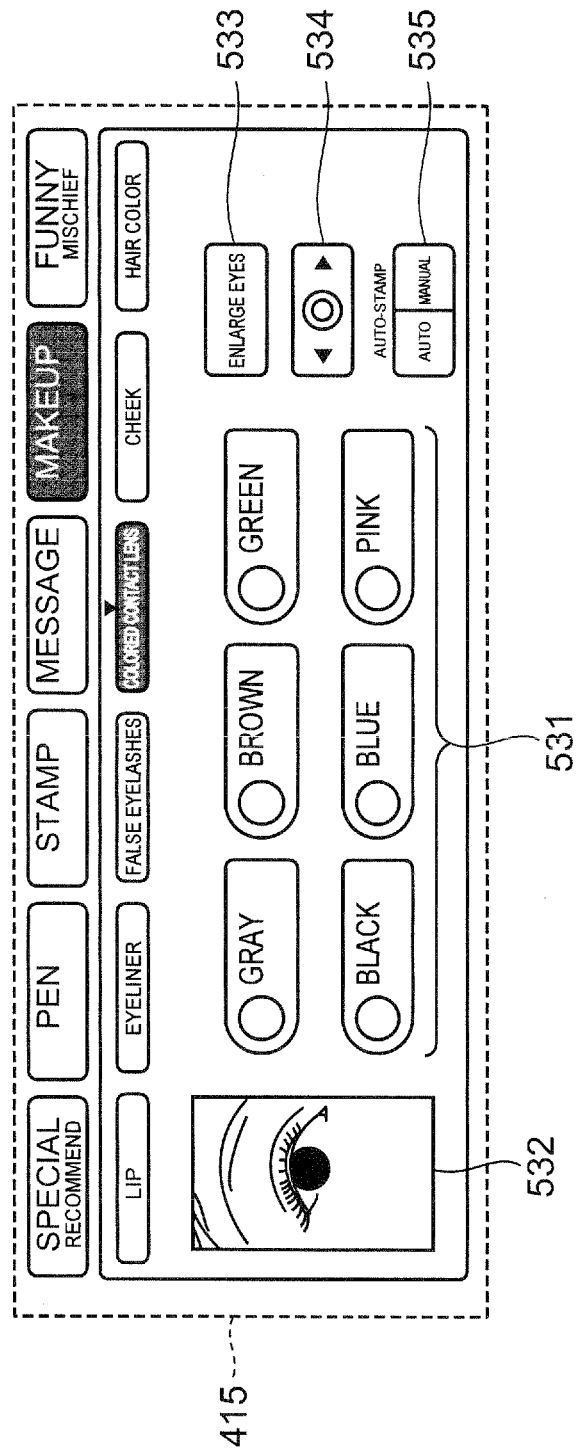
FIG. 25 is a diagram of an example of an edit pallet.

If only one face is recognized in the edit target image, i.e., in the case of one user, the edit pallet 415 for single user as shown in FIG. 25 is displayed.

The edit pallet 415 shown in FIG. 25 displays colored contact lens stamp images 531, a subject image 532, an eye enlargement button 533, a size change button 534, and an auto-stamp button 535. The edit pallet 415 shown in FIG. 25 enables one user to select and composite a colored contact lens stamp image with the user (himself/herself) in the edit target image.

FIG. 26 shows another example of the displayed edit pallet 415 for a single user. In FIG. 26, stamp images 537-1 to 537-3 for false eyelashes are displayed. The user can use a finger or the stylus pens 132A, 132B on the edit pallet 415 shown in FIG. 26 to select eyelashes to be composited with the image.

When the "MAKEUP" tab is selected on the edit pallet 415 and an "FALSE EYELASHES" or a "COLORED CONTACT LENSES" button is then selected, a plurality of stamp images 537-1 to 537-3, and 531 indicative of false eyelashes or colored contact lens are displayed on the edit pallet 415 as shown in FIG. 26 or 25.

If the composite position of the stamp image is manually determined, the photo sticker creating apparatus 1 may be configured to enable a user to determine the composite position of the stamp image by using the following drag operation (by moving the image while touching the screen). The user first touches one of the multiple stamp images displayed on the edit pallet 415 with a finger or the stylus pen 132A, 132B. As a result, the control device 201 (the graffiti edit unit 313) selects the touched stamp image as a stamp image for composition (to be composited). The user then touches one point in the edit target image display region 411 with the finger or the stylus pen 132A, 132B. The control device 201 displays the selected stamp image in the vicinity of the touched position. Subsequently, the user drags and moves a stamp image 610 in the edit target image display region 411 to a desired position with the finger or the stylus pen 132A, 132B. In this case, the control device 201 moves the display position of the stamp image 610 in accordance with the drag operation. When the stamp image reaches the desired position, the user terminates the drag operation. The control device 201 determines the desired position at the time of termination of the drag operation as the composite position of the stamp image 610.

Figure 27A:
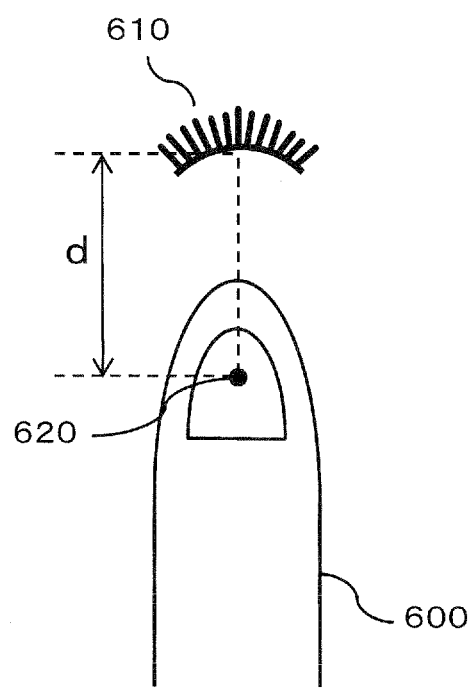
FIGS. 27A and 27B are diagrams for explaining a display position of the stamp image in an edit target image display region.

Particularly, in the case of the example described above, when the stamp image 610 is dragged in the edit target image display region 411, the stamp image 610 is displayed as shown in FIG. 27A at a position separated, by a predetermined distance d, from a touch position 620 of the finger 600 or the stylus pen 132A, 132B (i.e., the position at which a finger pressure is most applied when the display screen is pressed by the finger or the stylus pen). Displaying the stamp image 610 at a position separated from the touch position of the finger or the stylus pen can prevent the problem that a stamp image is hidden and hardly visible behind the finger or the stylus pen.

Figure 27B:
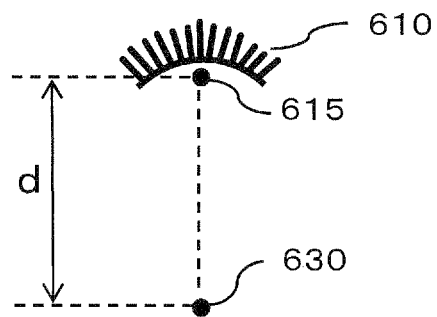

To implement the display described above, as shown in FIG. 27B, a reference point 630 for the stamp image 610 is set at a position separated by the distance d from a center 615 of the stamp image 610. The control device 210 disposes and displays (draws) the stamp image 610 such that the position of the reference point 630 matches the touched position 620. As a result, the stamp image 610 is displayed at the position separated from the touch position 620 by the predetermined distance d.

Figure 28:
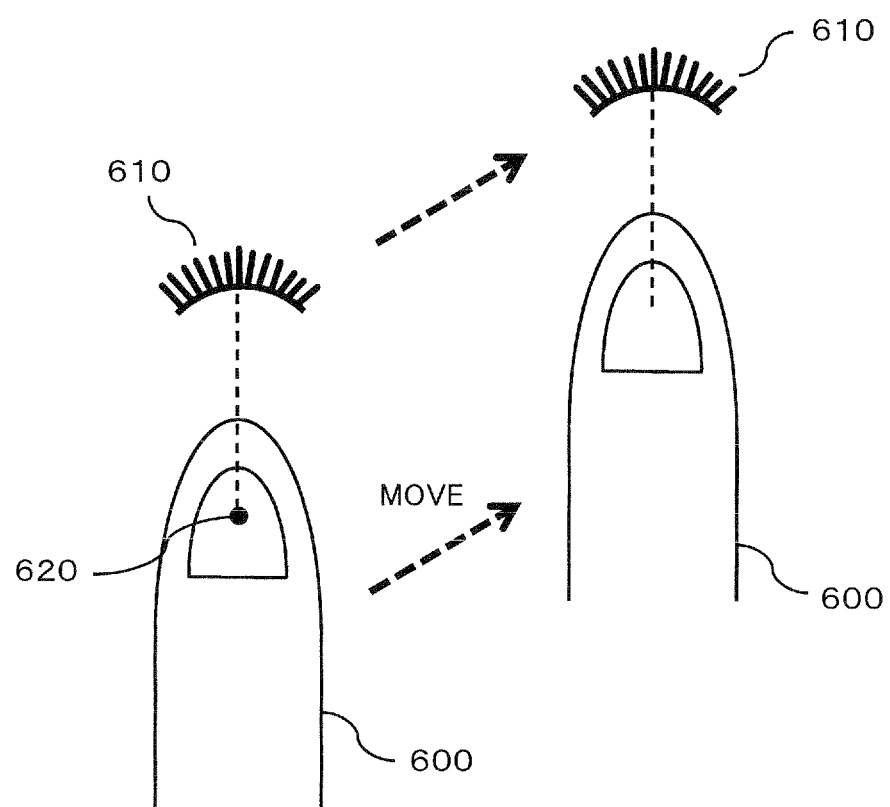
FIG. 28 is a diagram for explaining the display position of the stamp image in the edit target image display region.

If the stamp image 610 is dragged while the stamp image 610 is displayed at the position separated from the touch position 620 by the predetermined distance d, the control device 201 moves the stamp image 610 in conjunction with the movement of the finger 600 as shown in FIG. 28. In this case, a portion of the stamp image 610 forced out of the edit target image display region 411 is not displayed (printed) in the edit target image display region 411.

Figure 29A:
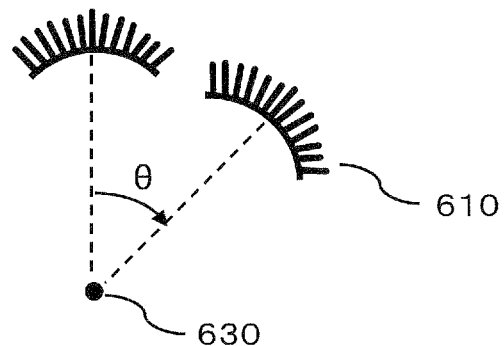
FIGS. 29A and 29B are diagrams for explaining the display position of the stamp image when a rotating operation is performed.
Figure 29B:
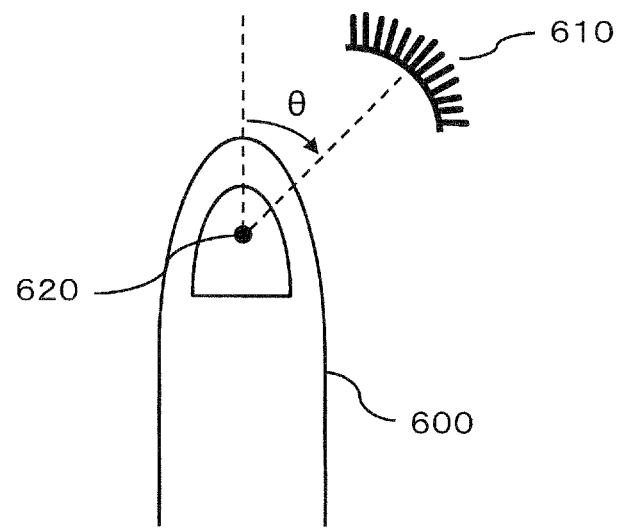

When the rotation button 515 is pressed, as shown in FIG. 29A, the control device 201 rotates the stamp image 610 around the reference point 630 in a direction (clockwise/counterclockwise) corresponding to the operation of the rotation button 515 by an angle θ corresponding to the operation of the rotation button 515. In this case, the stamp image 610 is displayed, rotated by the angle θ corresponding to an operation amount of the rotation button 515 around the touch position 620, as shown in FIG. 29B. The stamp image may be rotated around the center point 615 of the stamp image rather than the reference point 630. After the stamp image is composited on the display screen, the stamp image may be rotated by a predetermined angle when the rotation button 515 is pressed. If the rotation button is not provided, the stamp image may be rotated when an operation of drawing a circular is performed with a stylus pen or a finger after the stamp image is composited on the display screen.

Second Embodiment

With respect to the operation of the photo sticker creating apparatus 1, a flow of process different from that of the first embodiment will hereinafter be described below. The configuration, the flow of the game, and so on of the photo sticker creating apparatus described with reference to FIGS. 1 to 12 in the first embodiment are also applied to the photo sticker creating apparatus of the present embodiment. In other words, although the photo sticker creating apparatus 1 of the present embodiment performs the photo sticker creating game process in the procedures shown in the flowchart FIG. 12, specific process details at some steps are different from those of the first embodiment. This will hereinafter be described.

Flow of Initial Service Process

Description will be made of a flow of the initial service process (step S2) in a series of processes of the photo sticker creating game shown in the flowchart of FIG. 12 in this embodiment with reference to a flowchart of FIG. 30. This process is mainly executed by the initial service processing unit 301 of the control device 201.

When the initial service process is started, the initial service processing unit 301 controls the tablet built-in monitor 71, the speaker 73, and so on to output images and sounds introducing a flow of the photo sticker creating game. As a result, the guidance for the photo sticker creating game is presented to a user.

The initial service processing unit 301 causes the tablet built-in monitor 71 to display a background course selection screen and receives an instruction from the user using the stylus pen 72A or 72B, thereby allowing the user to select a background course (S31). Based on a result of receiving the instruction from the user, the initial service processing unit 301 selects any one of multiple background courses as one of the photographing conditions. The background course selection screen is a screen used for selecting a background course determining a type of background images composited with the photographed images. The background courses include, for example, an "enjoy shot" course providing background images each making the photographed image composited with the background image a cheerful and amusing atmosphere, as types of background images, and a "beauty shot" course providing background images each making the photographed image composited with the background image a calm and somewhat mate ire atmosphere.

The initial service processing unit 301 causes the tablet built-in monitor 71 to display a picture condition course selection screen and accepts an instruction from the user using a finger or the stylus pen 72A, 72B, thereby allowing the user to select an picture condition course (S32). Based on an acceptance result of the instruction from the user, the initial service processing unit 301 selects any one of multiple picture condition courses as one of the photographing conditions. The picture condition course selection screen is a screen used for selecting the picture condition course determining the picture condition of the object in the photographed image.

The initial service processing unit 301 causes the tablet built-in monitor 71 to display a name entry screen and receives an instruction from the user using a finger or the stylus pen 72A or 72B, thereby allowing the users to enter the respective names (S33). The name entry screen is a screen used by the users for entering the names.

The initial service processing unit 301 causes the tablet built-in monitor 71 to display a background set selection screen and receives an instruction from the users, thereby allowing the users to select a background set (S34). Based on a receiving result of the instruction from the users, the initial service processing unit 301 selects any one of multiple background sets as one of the photographing conditions.

A background set is configured as one set of multiple background images unified under a predetermined theme. Here, background sets made up of background images of the type corresponding to the background course selected at step S31 are displayed on the background set selection screen.

Figure 31:
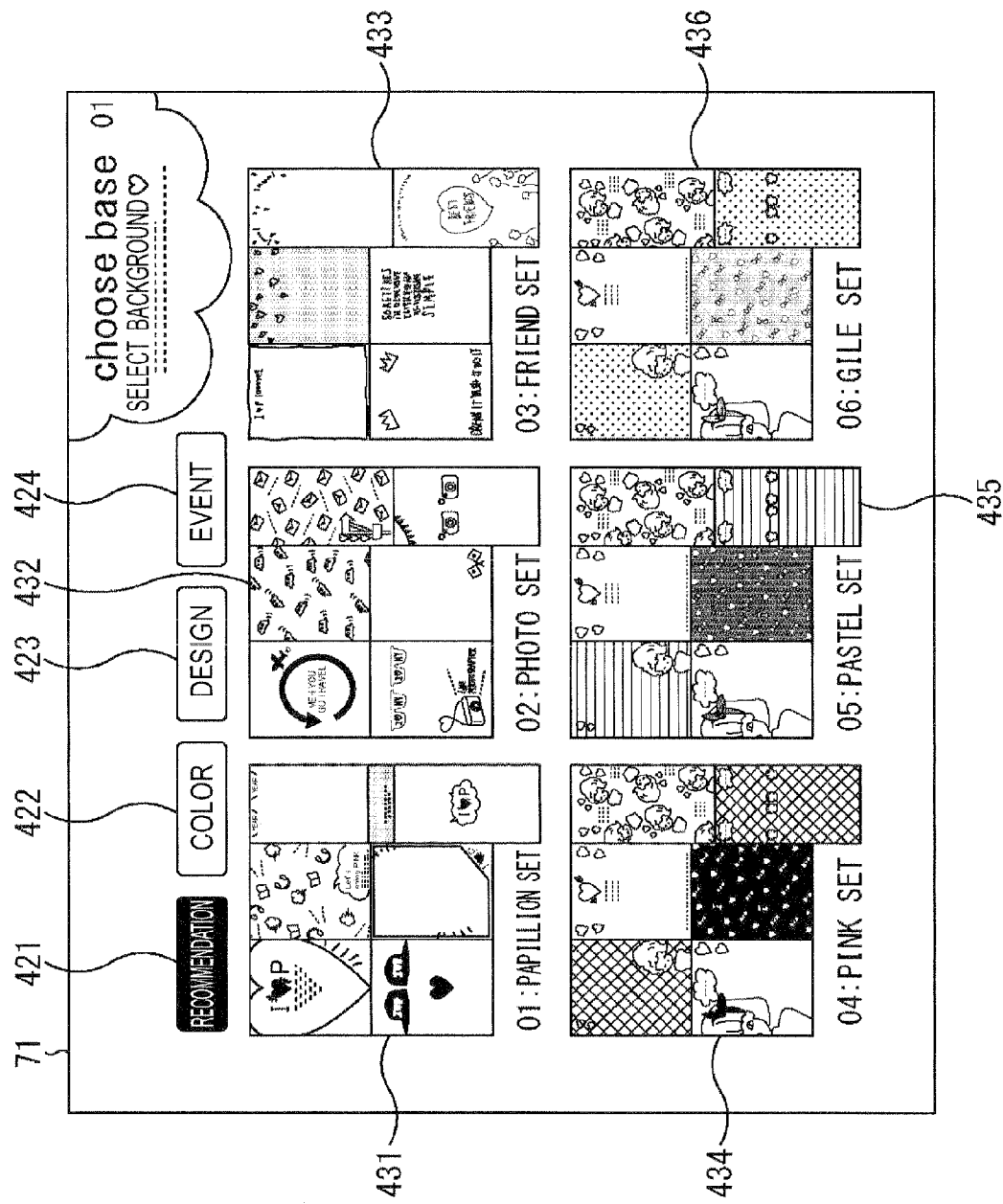
FIG. 31 is a diagram of an example of a background set selection screen.

FIG. 31 is a diagram of an example of the background set selection screen displayed for selecting a background set.

The background sets displayed on the background set selection screen are switched by buttons 421 to 424 of respective categories such as "RECOMMENDATION", "COLOR", "DESIGN", and "EVENT". In the example of FIG. 31, the "RECOMMENDATION" button 421 is selected. On the background set selection screen with the "RECOMMENDATION" button 421 selected, six background sets 431 to 436 are displayed under respective themes.

Although not shown, if the "EVENT" button 424 is selected, the background sets under the theme of seasonal events and memorial days such as a birthday are displayed on the background set selection screen.

The background sets displayed on the background set selection screen shown in FIG. 31 are background sets in the case of selecting the "enjoy shot" course as the background course at step S31. Among these background images, one or two background images are prepared that include foreground images such as stamp images and frame images composited with a foreground of an object in addition to images composited with a background of the subject in the photographed image. For example, among six background images corresponding to first photographing to sixth photographing out of seven times of photographing performed in the photographing process, two background images corresponding to the second photographing and the sixth photographing may include the foreground images. Alternatively, all the six background images may include the foreground images.

Figure 30:
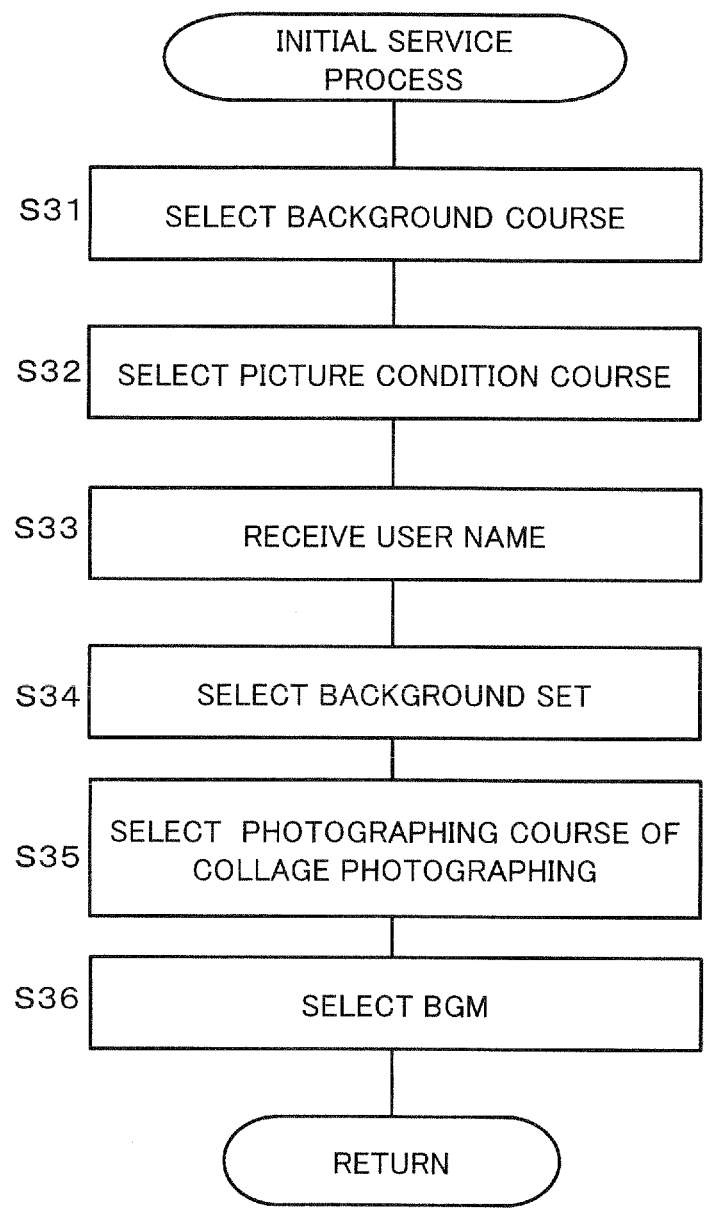
FIG. 30 is a flowchart of an example of a initial service process in a second embodiment.

Returning to the flowchart of FIG. 30, the initial service processing unit 301 causes the tablet built-in monitor 71 to display a collage photographing course selection screen and receives an instruction from the user using the stylus pen 72A or 72B, thereby allowing the user to select the course of collage photographing (S35). Based on a reception result of the instruction from the user, the initial service processing unit 301 selects any one of multiple photographing courses of collage photographing, as one of the photographing conditions.

The collage photographing is performed at the seventh photographing in the seven times of photographing performed in the photographing process. A seventh photographed image (collage photographed image) acquired from the photographing is arranged on a design image having a predetermined design to generate a composition image (collage image). The collage photographing course selection screen is a screen used for the course selection to determine whether a predetermined image process is applied to the collage photographed image.

Lastly, the initial service processing unit 301 causes the tablet built-in monitor 71 to display a BGM selection screen and receives an instruction from the user using the stylus pen 72A or 72B, thereby allowing the user to select BGM played in the photographing space (S36). Based on a result of receiving the instruction from the user, the initial service processing unit 301 selects the BGM to be played in the photographing space. The initial service process (step S2 of FIG. 12) is then terminated. After the initial service process (step S2 of FIG. 12), the photographing process (step S5) is executed.

Flow of Photographing Process

Figure 32:
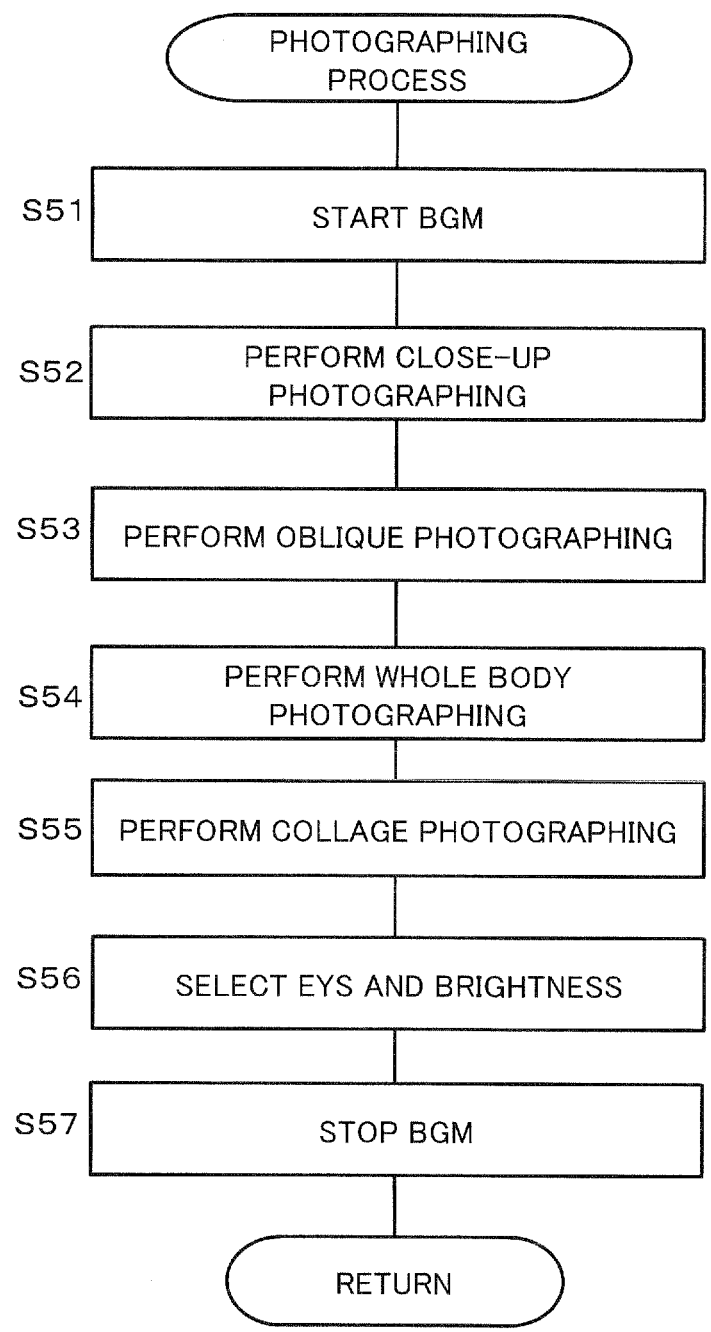
FIG. 32 is a flowchart of an example of a photographing process in the second embodiment.

A flow of the photographing process (step S5 of FIG. 12) in the present embodiment will be described with reference to a flowchart of FIG. 32. This process is mainly executed by the photographing processing unit 302 of the control device 201.

When the photographing process is started, the photographing processing unit 302 causes the touch panel monitor 92 to display a message such as "Please touch!" and receives an instruction from the user and starts output of the BGM (music) selected by the user in the initial service process (S51). At this time, the touch panel monitor 92 displays the title of music selected by the user, i.e., the music output from the speaker 233.

Instead of starting the output of the BGM in accordance with the user's operation to the touch panel monitor 92, the output of the BGM may be started when a certain time elapses after the detection of movement of the users to the photographing space.

Subsequently, the photographing processing unit 302 controls the touch panel monitor 92, the speaker 233, and so on to give guidance for close-up photographing and then performs the close-up photographing at step S52 (S52). The close-up photographing is to shoot an image of a user such that the face and the upper body of the user standing straight can be directly photographed straight.

Specifically, the photographing processing unit 302 controls the camera 91 to start capturing an image covering a range from the top of the head to near the waist of the user and causes the touch panel monitor 92 to display a moving image (the live-view image) captured by the camera 91 (performs the live-view display). The photographing processing unit 302 displays a countdown indicator on the touch panel monitor 92 to notify the user of photographing timing. When the photographing timing comes, the photographing processing unit 302 controls the camera 91 to perform the photographing and acquires a close-up photographed image that is a still image in which the face and the upper body of the user standing straight is directly photographed straight. The acquired close-up photographed image is displayed as a photographed result on the touch panel monitor 92.

After the close-up photographing is performed twice, the photographing processing unit 302 controls the touch panel monitor 92, the speaker 233, and so on to give guidance for oblique photographing and then performs the oblique photographing twice (S53). The oblique photographing is to photograph an image such that the face and the upper body of the user standing straight are photographed obliquely to the left or right.

Details of the oblique photographing are basically the same as the close-up photographing and will not be described. An obliquely photographed image acquired from the oblique photographing is a still image in which the face and the upper body of the user standing straight are photographed obliquely to the left or right.

After the oblique photographing is performed twice, the photographing processing unit 302 controls the touch panel monitor 92, the speaker 233, and so on to give guidance for whole body photographing, i.e., photographing of an image in which the whole body of the user standing straight is photographed, and then performs the whole body photographing twice (S54).

Although details of the whole body photographing are also basically the same as the close-up photographing and will not be described, a whole body photographed image acquired from the whole body photographing is a still image in which the whole body of the user standing straight is photographed.

As described above, the first photographing to the sixth photographing are performed out of the seven times of the photographing. The music selected in the initial service process is output as the BGM via the speaker 233 also during this period.

Description will be made of an example of a photographing screen displayed on the touch panel monitor 92 at the time of the first photographing to the sixth photographing with reference to FIG. 33.

In a region on the lower side of the photographing screen, six sample images 521-1 to 521-6 are displayed that are generated by compositing six respective model images photographed models as subjects with the six background images included in the background set selected in the initial service process. In the example of FIG. 33, the six background images making up the background set 431 selected in the initial service process are composited with the sample images 521-1 to 521-6 and displayed.

The background images composited with the sample images 521-1 to 521-6 are composited with respective photographed images acquired from the first photographing to the sixth photographing, respectively. Therefore, for example, the background image composited with the sample image 521-1 is composited with the close-up photographed image acquired from the first photographing. The background image composited with the sample image 521-3 is composited with the obliquely photographed image acquired from the third photographing. The background image composited with the sample image 521-5 is composited with the whole body photographed image acquired from the fifth photographing.

When n-th (n is an integer from one to six) photographing is performed, a sample image 521-n is displayed more largely on the photographing screen, and the live-view image captured by the camera 91 is displayed on the background image composited with the sample image 521-n in a live-view image display region 522 displayed substantially at the center of the photographing screen.

Figure 33:
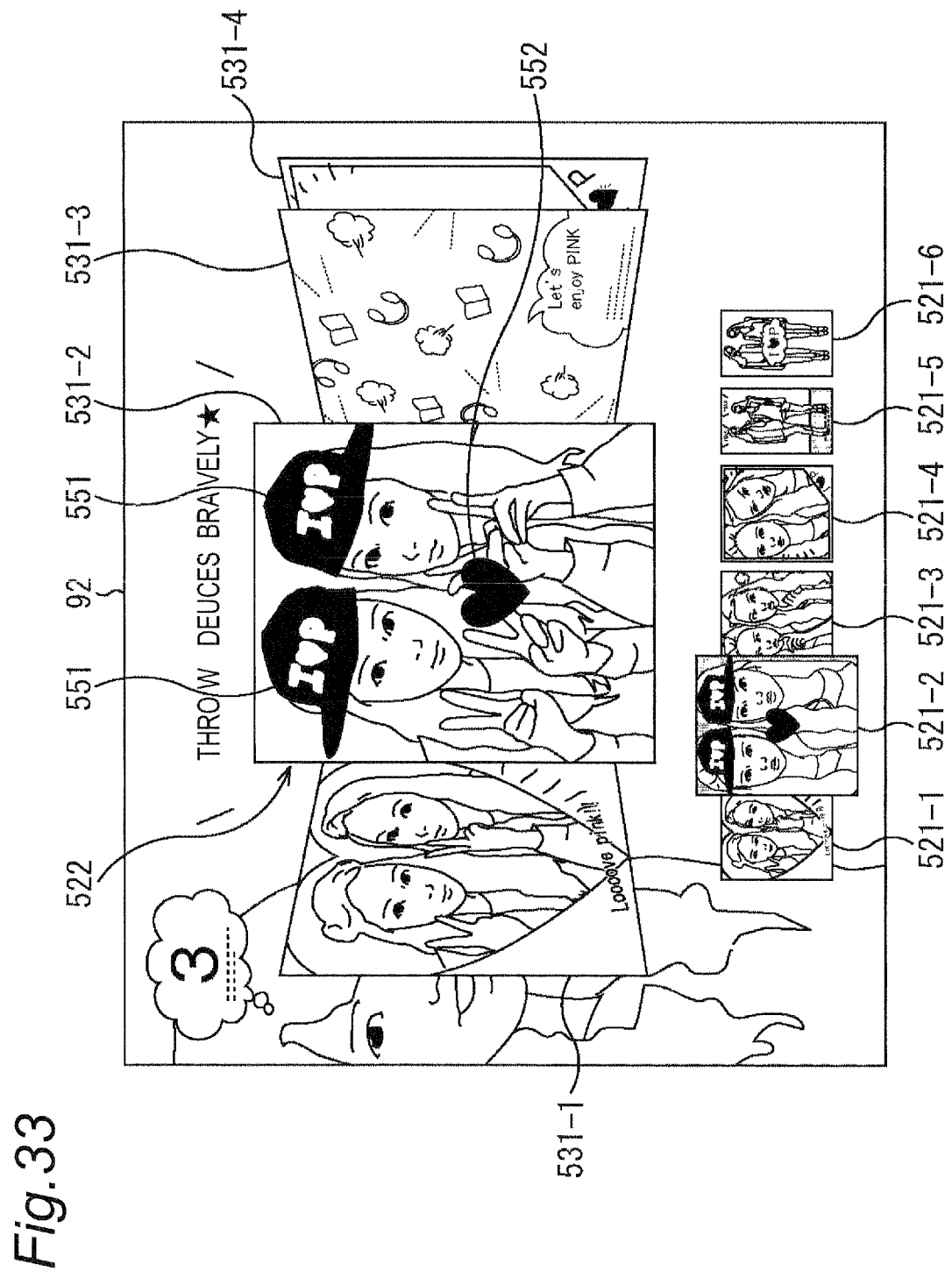
FIG. 33 is a diagram of an example of a photographing screen.

In the example of FIG. 33, the sample image 521-2 is displayed more largely, and a live-view image 531-2 is composited and displayed in the live-view image display region 522 with the background image composited with the sample image 521-2. FIG. 33 shows an example of the photographing screen when the second photographing is performed.

As described above, the background image corresponding to the second photographing includes the foreground image to be composited with the foreground of the subject, in addition to the image to be composited with the background of the subject. Specifically, in the example of FIG. 33, stamp images 551 representing caps and a heart-shaped stamp image 552 are composited, as the foreground image, at the heads of the two respective users appearing in the live-view image 531-2 and substantially at the center of the live-view image, respectively.

In the live-view image, the stamp images 551 are adjusted in size and direction depending on the sizes and directions of the faces (heads) of the respective users and composited at the positions of the heads of the respective users. The photographing processing unit 302 can recognize the sizes and directions of the faces (heads) of the users by the face recognition from the photographed image and can adjust the sizes and the directions of the stamp images 551. On the other hand, the stamp image 552 is composited at a predetermined position regardless of the positions of the two users and the sizes and directions of the faces.

On the left side of the live-view image display region 522 in the photographing screen, an image is displayed that is acquired by compositing a photographed image 531-1 acquired from the first photographing with the background image composited with the sample image 521-1. On the right side of the live-view image display region 522 on the photographing screen, a background image 531-3 composited with the sample image 521-3 and a background image 531-4 composited with the sample image 521-4 are displayed such that the images are three-dimensionally piled up.

After the second photographing, the closed-up photographed image acquired as a result of the photographing is displayed on the left side of the live-view image display region 522 on the photographing screen symmetrically to the background images 531-3 and 531-4. The closed-up photographed image acquired from the second photographing is also displayed in the region in which the sample image 521-2 is previously displayed, in place of the sample image 521-2.

Subsequently, when the third photographing is performed, the sample image 521-3 is displayed more largely. Along with this, the background image 531-3 displayed on the right side of the live-view image display region 522 is moved to the live-view image display region 522, is composited with the live-view image (the subject is not shown), and is displayed.

The photographing is sequentially performed as described above.

Returning to FIG. 32, after the sixth photographing, the photographing processing unit 302 controls the touch panel monitor 92, the speaker 233, and so on to give guidance for the collage photographing and then performs the collage photographing as the seventh photographing (S55).

As a result of the collage photographing, a collage photographed image is acquired as the seventh photographed image in which the images of the subjects are arranged on a design image having a predetermined design.

After the seventh photographing, the photographing processing unit 302 controls the touch panel monitor 92 to display an eye/brightness selection screen and receives instructions from the users to receive the selection of the eye size and the skin brightness of the subjects (users) in the photographed images (S56). The photographing processing unit 302 processes the photographed images to change the eye size and the skin brightness of the subjects in the first to seven photographed images to the selected eye size and skin brightness.

When a certain time elapses after the selection of the eye size and the skin brightness of the subjects is terminated, the output of the BGM (music) output via the speaker 233 is stopped. The photographing process (step S5 of FIG. 12) is then terminated.

As described above, in the photo sticker creating apparatus of the present embodiment, the stamp image corresponding to a predetermined part (organ) of a face of a user is adjusted in size and direction in the live-view image depending on the size and direction of the face of the user, and is composited with the face of the user in the live-view image, and is displayed.

A flow of a process implementing the display of the live-view image as described above will hereinafter be described.

Display Process During Photographing

Figure 34:
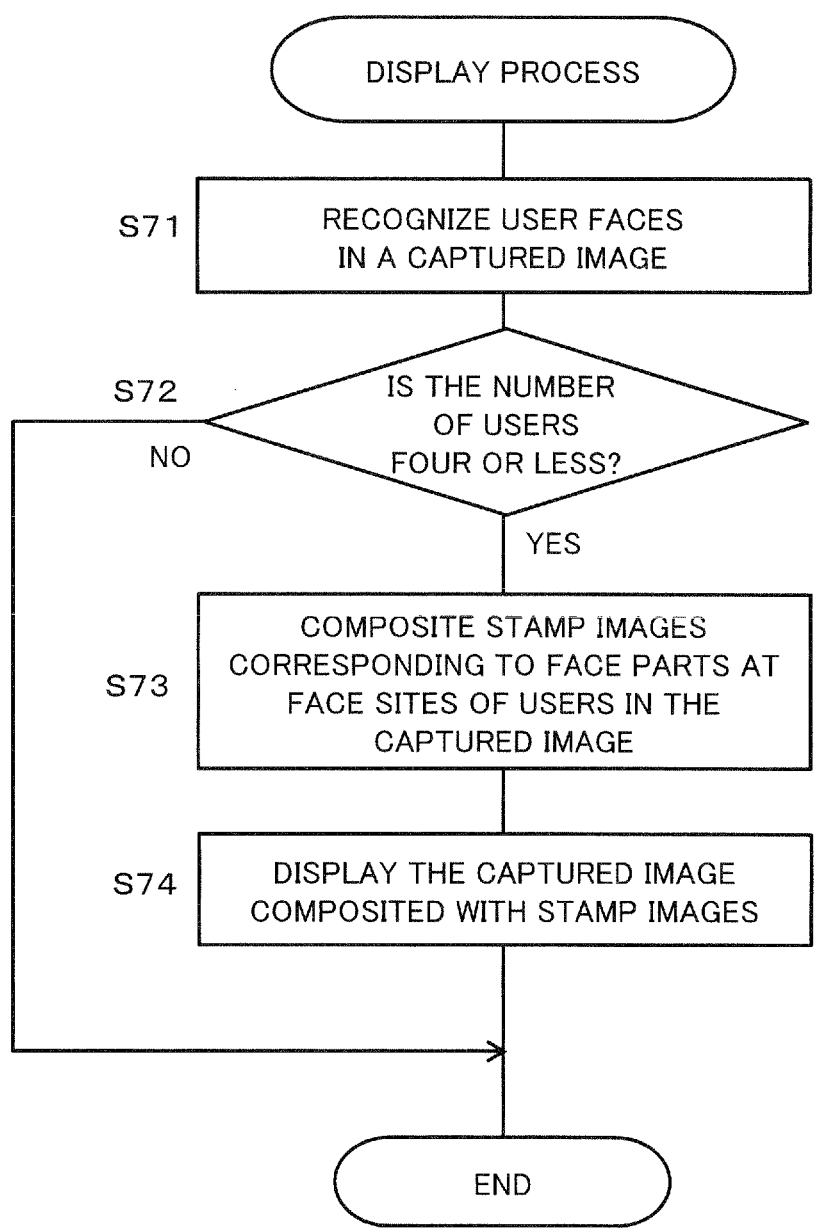
FIG. 34 is a flowchart of an example of a displaying process in the second embodiment.

A display process during photographing will be described with reference to a flowchart of FIG. 34. The display process of FIG. 34 is performed to display the live-view image 531-2 on the photographing screen shown in FIG. 33, for example.

The photographing processing unit 302 recognizes faces of users in the live-view image captured by the camera 91 (S71). The face recognition is performed by extracting features such as relative positions, sizes, and shapes of parts (such as eyes and a nose) of faces and outlines of faces. The face recognition can estimate the number of faces (i.e., the number of users), the direction of the face, sex, age, and expression.

The photographing processing unit 302 determines whether the number of the users is equal to or less than four based on the recognition result of the faces of the users (S72).

The number of the users may be determined from the number of persons appearing in the photographed image acquired from already performed photographing, instead of the recognition result of the faces of the users.

If it is determined that the number of the users is equal to or less than four, the photographing processing unit 302 composites stamp images corresponding to parts of the faces of the users with the parts of the recognized faces of the users in the live-view image (S73). In this case, the photographing processing unit 302 adjusts the stamp images in size and direction depending on the sizes and directions of faces of the recognized users and composites the stamp images with the corresponding parts of the faces of the users in the live-view image.

The directions of the faces of the users include directions on the two-dimensional plane in the live-view image as well as directions of the faces swinging left and right and nodding up and down. In this case, the stamp images are adjusted in direction such that the stamp images are apparently deformed in a depth direction, in addition to the direction on the two-dimensional plane in the live-view image. Therefore, for example, if the user's face is facing diagonally forward, the stamp image to be composited with the eye portion has an apparently laterally shape as compared to the stamp image to be composited when the user's face is facing forward. If the user's face is facing diagonally upward, the stamp image to be composited with the eye portion has an apparently longitudinally reduced shape as compared to the stamp image to be composited when the user's face is facing forward.

Although the stamp image is a still image in the present embodiment, the stamp image may be a moving image.

The photographing processing unit 302 displays the live-view image composited with the stamp images on a monitor 613 configured as the touch panel monitor 92 (S74).

Since the live-view image is a moving image displayed in real time, the stamp images are composited at step S33 while being adjusted in size and direction in accordance with (following) the motions of the users in the live-view image. In this case, an average value of motion amounts may be obtained for a predetermined number of frame images among the frame composing the moving image so as to adjust the sizes and directions of the stamp images based on the average value.

If it is determined that the number of the users is not equal to or less than four, i.e., is greater than five (NO at step S72), no stamp image is displayed on the live-view image and the process is terminated.

With the process described above, the stamp images 551 are composited with the respective heads of the users depending on the sizes and directions of the faces of the users in accordance with motions of the two users in the live-view image displayed in the photographing screen of FIG. 33 and is displayed. Therefore, it is not necessary for the users to change the standing positions and the postures in accordance with the stamp images displayed in advance on the live-view image, so that an interesting image can more easily be provided.

When the number of the users is large, if the stamp images are composited with the faces of the users, respectively, a finally acquired photographed image may give a visually complicated impression. With the process described above, no stamp image is displayed if the number of the users is greater than five. Thus, it is possible to avoid the finally acquired photographed image from having the visually complicated impression.

In the example of FIG. 33, the shape of the stamp image is deformed depending on the position of the face of each user. Specifically, if the positions of the faces of the respective users are closer than a predetermined distance, the shapes of the stamp images 551 are deformed such that each of visors of caps of the stamp images 551 composited with the heads of the respective users is directed to the outside (to the side where no user exists).

Hence, the stamp images 551 are composited with the heads of the respective users without overlapping.

If the number of the users is equal to or greater than three, a visor of a cap of the stamp image 511 composited with a head of a certain user other than users located at the both ends is deformed in shape such that the visor does not overlap at least with the stamp images 551 composited with the heads of the users adjacent the certain user. For example, also when the stamp images representing ponytails are composited as the stamp images with the heads of the users, ponytail portions thereof are deformed in shape such that the ponytail portion of a certain user does not overlap with at least the stamp image composited with the head of a user adjacent to the certain user.

If the stamp images 551 overlap with each other, a message may be displayed on a screen for the photographing or sound may be output from the speaker 233 to notify the users of the overlap, or an overlapping portion or the whole of one of the stamp images 551 may be erased.

A stamp image to be composited may partially be cut off when displayed in the live-view image depending on a direction and a size of a face of a user and a shape of the stamp image to be composited. In this case, a message such as "Please move back a little!" prompting a user to change the standing position may be displayed on the photographing screen or output as sound from the speaker 233 so as to achieve a proper shape of the stamp image to be composited.

In the above description, for the predetermined parts of the faces of the users, the examples of the stamp images to be composited with heads of the users have been described. However, stamp images to be composited with parts other than heads of the users may also be prepared.

FIGS. 35 to 39 show examples of the live-view images composited with other stamp images.

Figure 35:
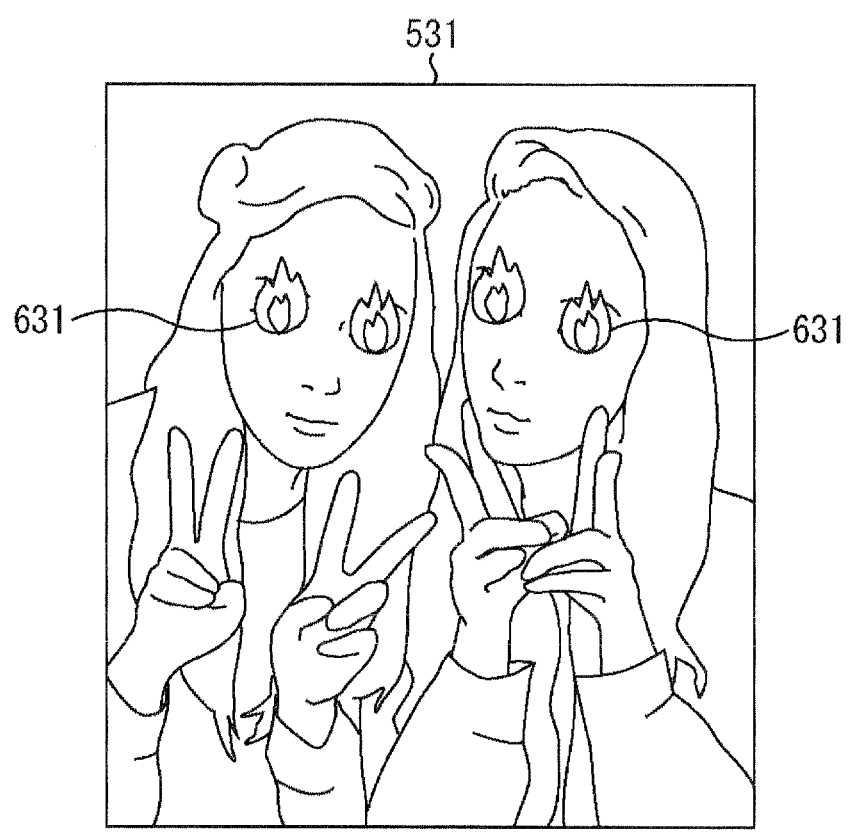
FIG. 35 is a diagram of an example of a live-view image.

In the example of FIG. 35, stamp images 631 representing flames are composited as the foreground images with the portions of the both eyes of the two respective users appearing in a live-view image 531.

In the live-view image 531, the stamp images 631 are adjusted in size and direction depending on the size and the direction of the faces of the respective users and composited at the positions of the both eyes of the respective users.

Figure 36:
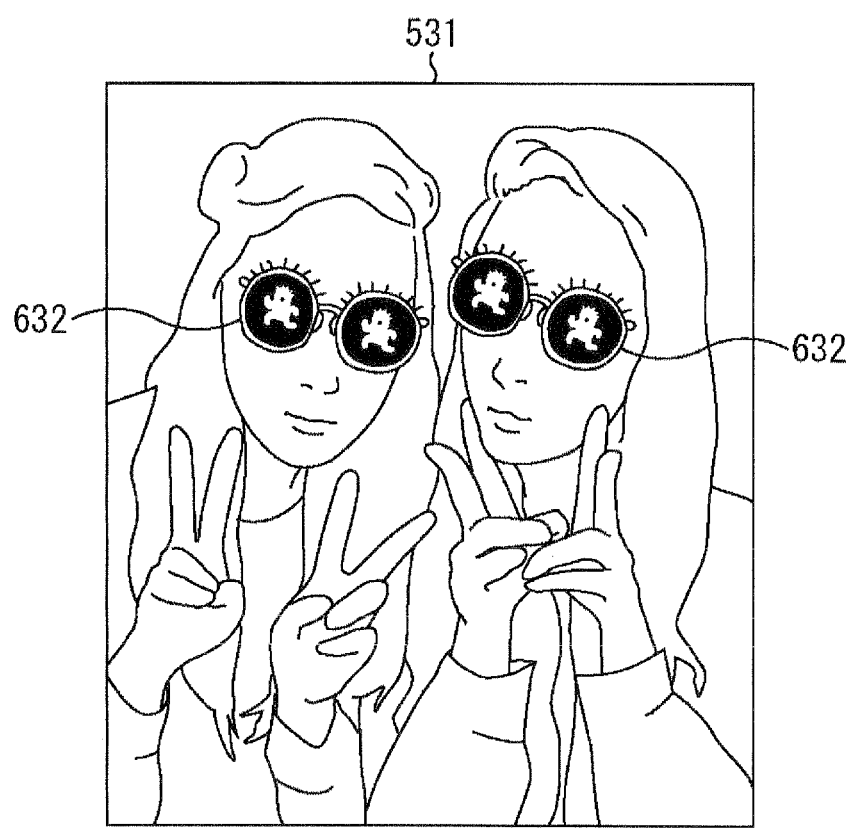
FIG. 36 is a diagram of an example of the live-view image.

In the example of FIG. 36, stamp images 632 representing sunglasses are composited as the foreground images with the portions of the both eyes of the two respective users appearing in the live-view image 531.

In the live-view image 531, the stamp images 632 are adjusted in size and direction depending on the size and the direction of the faces of the respective users and composited at the positions of the both eyes of the respective users.

Figure 37:
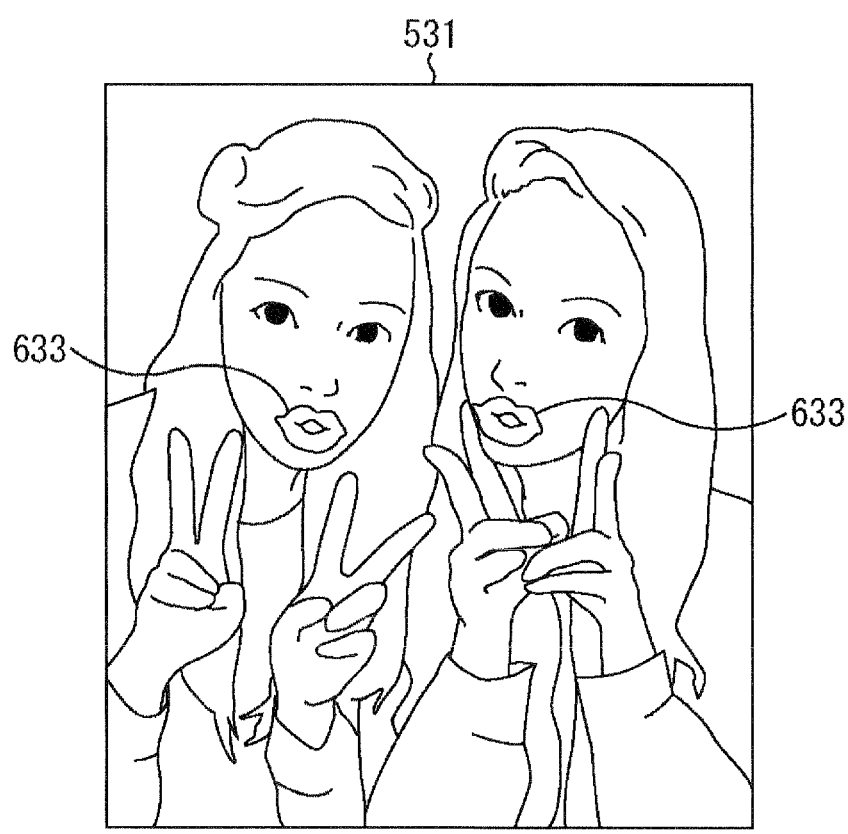
FIG. 37 is a diagram of an example of the live-view image.

In the example of FIG. 37, stamp images 633 representing lips are composited as the foreground images with the portions of the mouths of the two respective users appearing in the live-view image 531.

In the live-view image 531, the stamp images 633 are adjusted in size and direction depending on the size and the direction of the faces of the respective users and composited at the positions of the mouths of the respective users.

Figure 38:
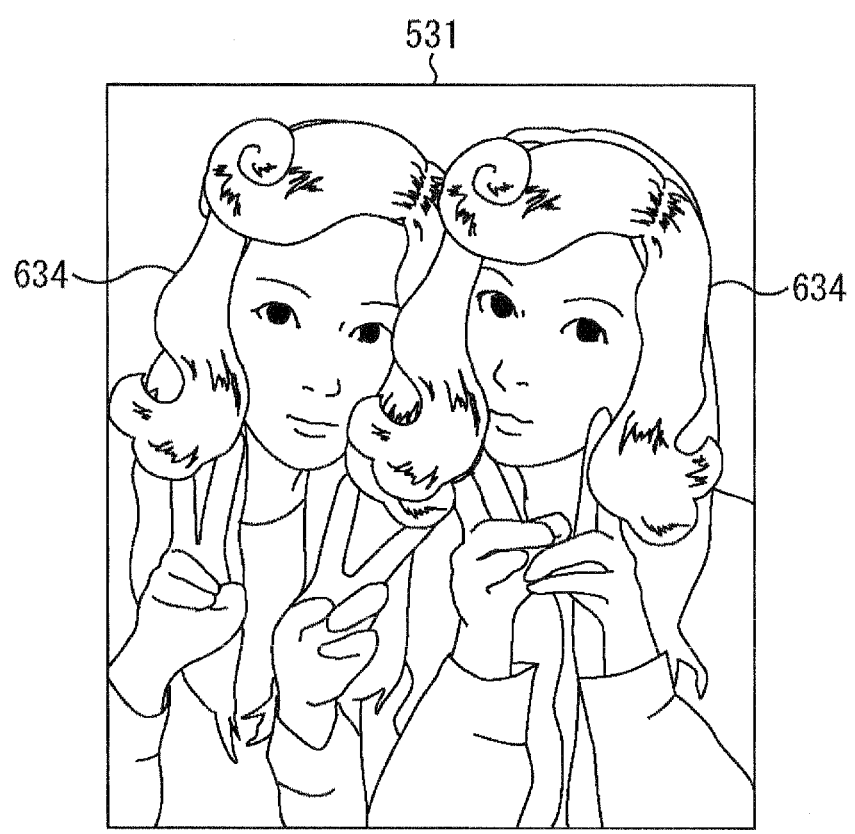
FIG. 38 is a diagram of an example of the live-view image.

In the example of FIG. 38, stamp images 634 representing blonde wigs are composited as the foreground images with the portions of the heads of the two respective users appearing in the live-view image 531.

In the live-view image 531, the stamp images 634 are adjusted in size and direction depending on the size and the direction of the faces of the respective users and composited at the positions of the heads of the respective users.

The stamp images shown above are determined depending on the background set selected in the initial service process. If there are multiple users, different stamp images may be composited with the respective users. Specifically, a stamp image is composited with each of the users depending on sex and age of each of the users identified by the face recognition.

Figure 39:
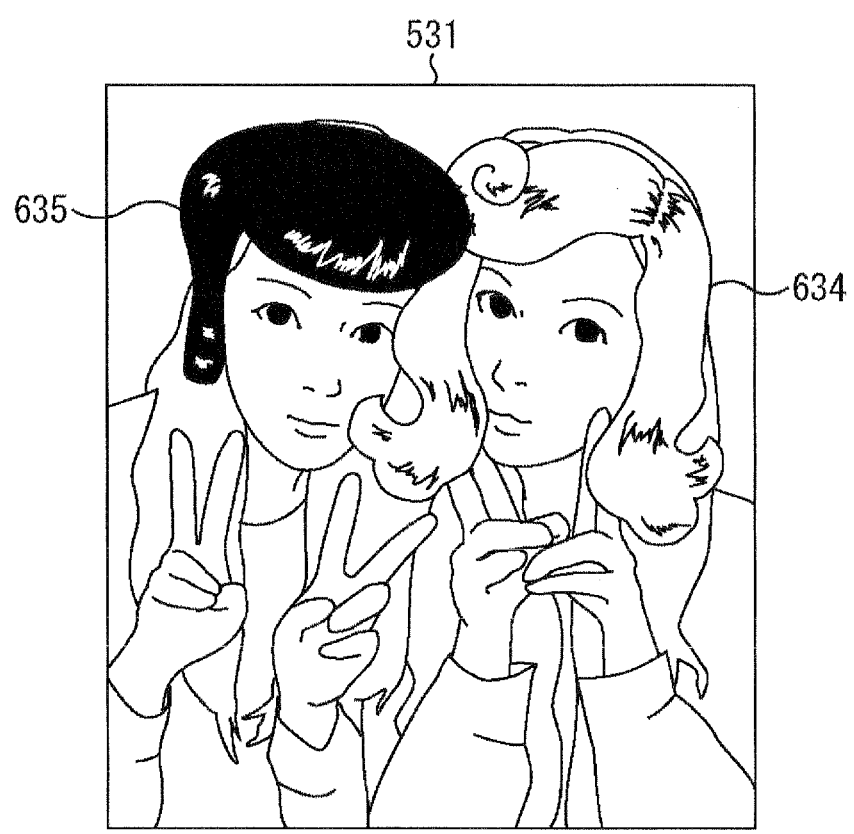
FIG. 39 is a diagram of an example of the live-view image.

For example, if two left and right users appearing in the live-view image 531 shown in FIG. 39 are identified as a male and a female, respectively, by the face recognition, a stamp image 634 representing a blonde wig is composited with the portion of the head of the right user while a stamp image 635 representing a male wig is composited with the portion of the head of the left user.

The sex and age of each of the users may be selected by the user before photographing and so on instead of identification by the face recognition. In this case, guidance is output for guiding the users to the standing positions so as not to change a positional relationship of the users such as a female user on the right side and a male user on the left side.

Stamp images to be composited with the nose portions and the ear portions of the users may also be prepared along with the stamp images as described above.

If some of the parts of the face are not detected because the face recognition is not correctly performed in the live-view image, a stamp image corresponding to a part which is detected may be composited. For example, if eyes of a user are closed, a stamp image representing a wig is composited rather than a stamp image representing sunglasses being composited.

A level of a smiling face of a user may be determined by the face recognition and a stamp image to be composited may be changed depending on a determined level.

Further, stamp images to be composited may be changed depending on the positions of the faces of the respective users. If a distance between the positions of the faces of the respective users is closer than a predetermined distance, the respective users are presumed as close friends or a couple. Therefore, in the example of FIG. 33, instead of the respective stamp images 551 representing caps, a stamp image representing a shared umbrella over the heads of the two users may be composited.

As described above, a more interesting image can be provided.

In the foregoing description, as the live-view image, the example of display of the live-view image at the time of performing the close-up photographing has been described. However, the stamp images corresponding to predetermined parts of the body of a user other than the face such as the hands, the feet, and the waist (e.g., stamp images representing gloves, boots, and a tail) may be composited with the live-view image at the time of performing the whole body photographing. In this case, the stamp images are composited on the live-view image based on identification of a skin color region and a result of a person detection process using motion capture etc. for recognizing the bodies of the users.

In the above example, a button for preventing the display of the stamp images displayed on the live-view image may be disposed on the screen for photographing.

The stamp images described above are composited also with a photographed image that is obtained as a result of photographing, and the photographed image with the composited stamp images is subjected to editing in the edit process.

Example of Edit Screen

Figure 40:
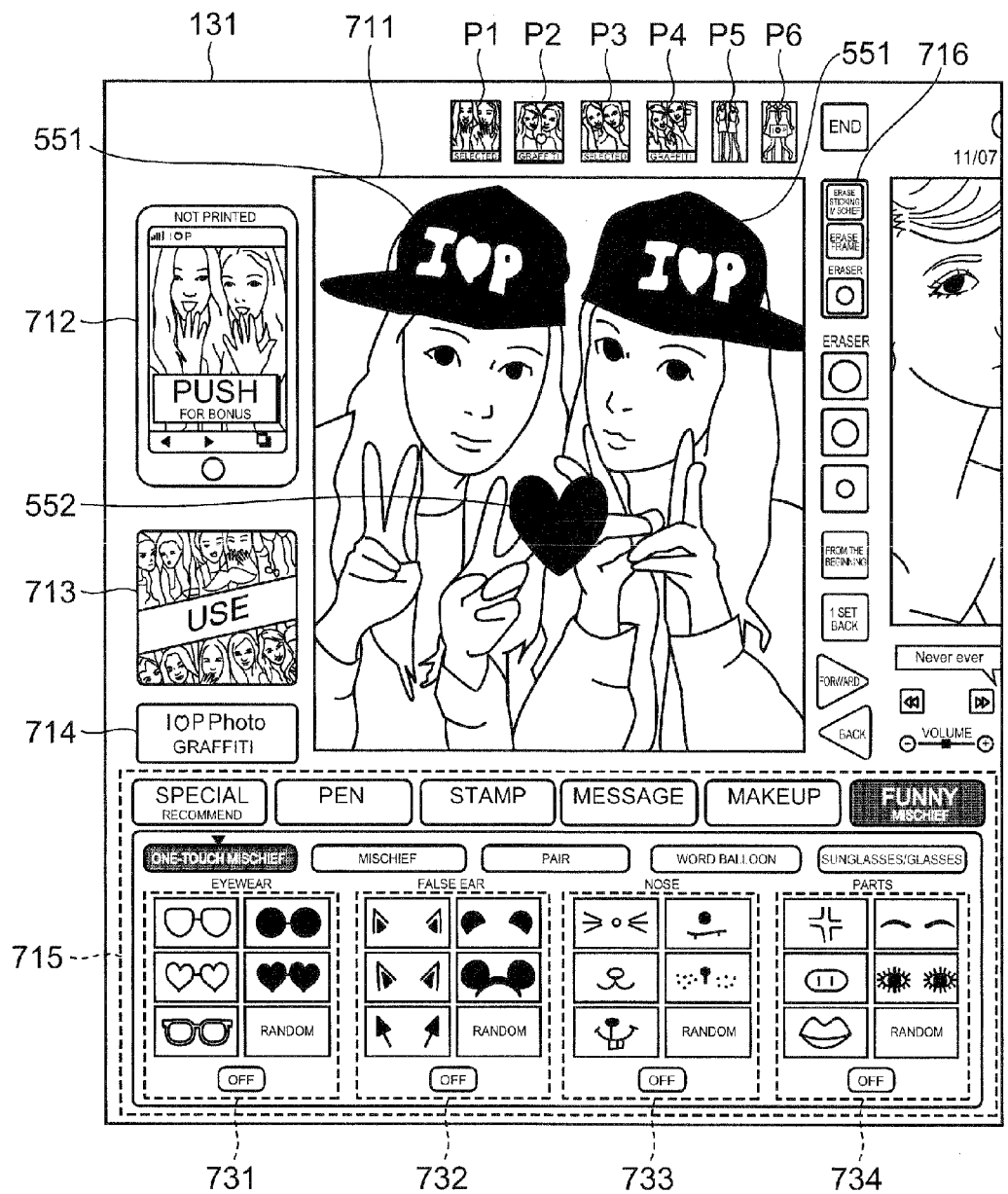
FIG. 40 is a diagram of an example of an edit screen.

FIG. 40 is a diagram of an example of an edit screen displayed in the edit process of the second embodiment. Although the edit screen shown in FIG. 40 has basically the same configuration as the edit screen in the first embodiment shown in FIG. 14, the edit screen has an eraser button different from the first embodiment.

Figure 41:
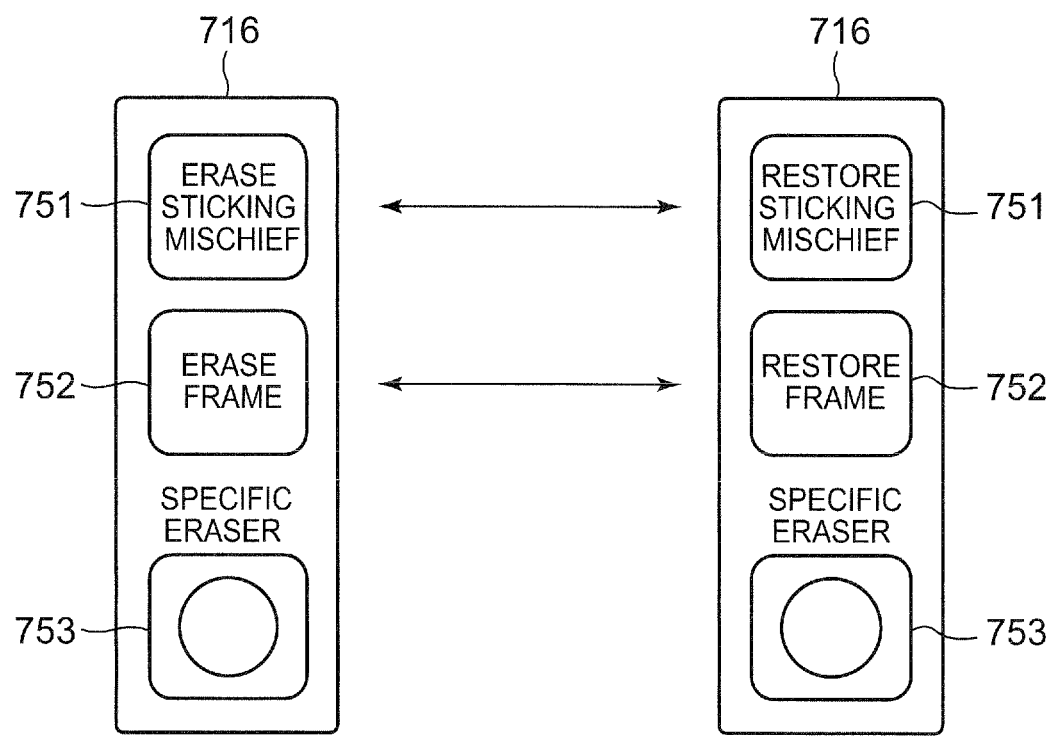
FIG. 41 is a diagram for explaining an eraser button.

In particular, an eraser button 716 for erasing some or all of the corresponding stamp images composited with the parts of the faces of the users in the photographing process is disposed on the upper right side of an edit target image display region 711. FIG. 41 shows details of the eraser button 716.

As shown in FIG. 41, the eraser button includes a sticking mischief eraser button 751, a frame eraser button 752, and a specific eraser button 753.

The sticking mischief eraser button 751 is a button for erasing the corresponding stamp images composited with the parts of the faces of the users in the photographing process. The corresponding stamp image composited with the part of the face of the user in the photographing process is hereinafter referred to as "STICKING MISCHIEF" as needed.

As shown in FIG. 41, when the sticking mischief eraser button 751 which is in a state of displaying "ERASE STICKING MISCHIEF" is pressed by a user, the sticking mischief images added to the edit target image are erased and the indication on the sticking mischief eraser button 751 is changed to "RESTORE STICKING MISCHIEF".

In contrast, when the sticking mischief eraser button 751 which is in a state of displaying "RESTORE STICKING MISCHIEF" is pressed by a user, the sticking mischief images erased from the edit target image are displayed again and the indication on the sticking mischief eraser button 751 is changed to "ERASE STICKING MISCHIEF.

The frame eraser button 752 is a button for erasing, in addition to the sticking mischief, the stamp image (e.g., the stamp image 552) which is composited at a predetermined position regardless of the positions of the two users and the sizes and directions of the faces in the photographing process.

As shown on the left side of FIG. 41, when the frame eraser button 752 which is in a state of displaying "ERASE FRAME" is pressed by input from a user, all the stamp images composited in the photographing process on the edit target image are erased and the indication on the frame eraser button 752 is changed to "RESTORE FRAME" as shown on the left side of FIG. 41.

In contrast, as shown on the right side of FIG. 41, when the frame eraser button 752 which is in a state of displaying "RESTORE FRAME" is pressed by input from a user, the stamp images which is composited in the photographing process and erased from the edit target image are displayed again and the indication on the frame eraser button 752 is changed to "ERASE FRAME" as shown on the left side of FIG. 41.

The specific eraser button 753 is a button for erasing a part of stamp images composited in the photographing process and the sticking mischief. When the stylus pen 132A or 132B is used for pressing the specific eraser button 753 and then selecting a portion of the stamp images composited in the photographing process, such as a portion of the sticking mischief composited with the edit target image, the selected portion of these stamp images is erased.

As described above, the stamp images composited in the photographing process are edited depending on input from the users.

The stamp image same as the stamp image (sticking mischief) which is composited in the photographing process may be prepared as a stamp image to be displayed on the edit pallet 715. When the prepared stamp image is selected, the selected stamp image may be composited with a corresponding part of the face after the parts of the face are recognized based on the face recognition process. As a result, even if a position of composition of the sticking mischief deviates in the photographing process, the position can be corrected to the proper position in the edit process. The position of composition of the sticking mischief may be determined by input from a user in the edit process.

Also a fine adjustment button for finely adjusting a position of the stamp image composited in the edit target image may be provided in the edit screen, so that the position can be corrected to the proper position in the edit process even if the position of composition of the sticking mischief deviates in the photographing process.

Example of Collage Photographing Image

As described above, the collage photographing is performed as the seventh photographing in the photographing process and a collage photographed image is acquired.

An example of the collage photographed image will be described with reference to FIGS. 42 and 43.

Figure 42:
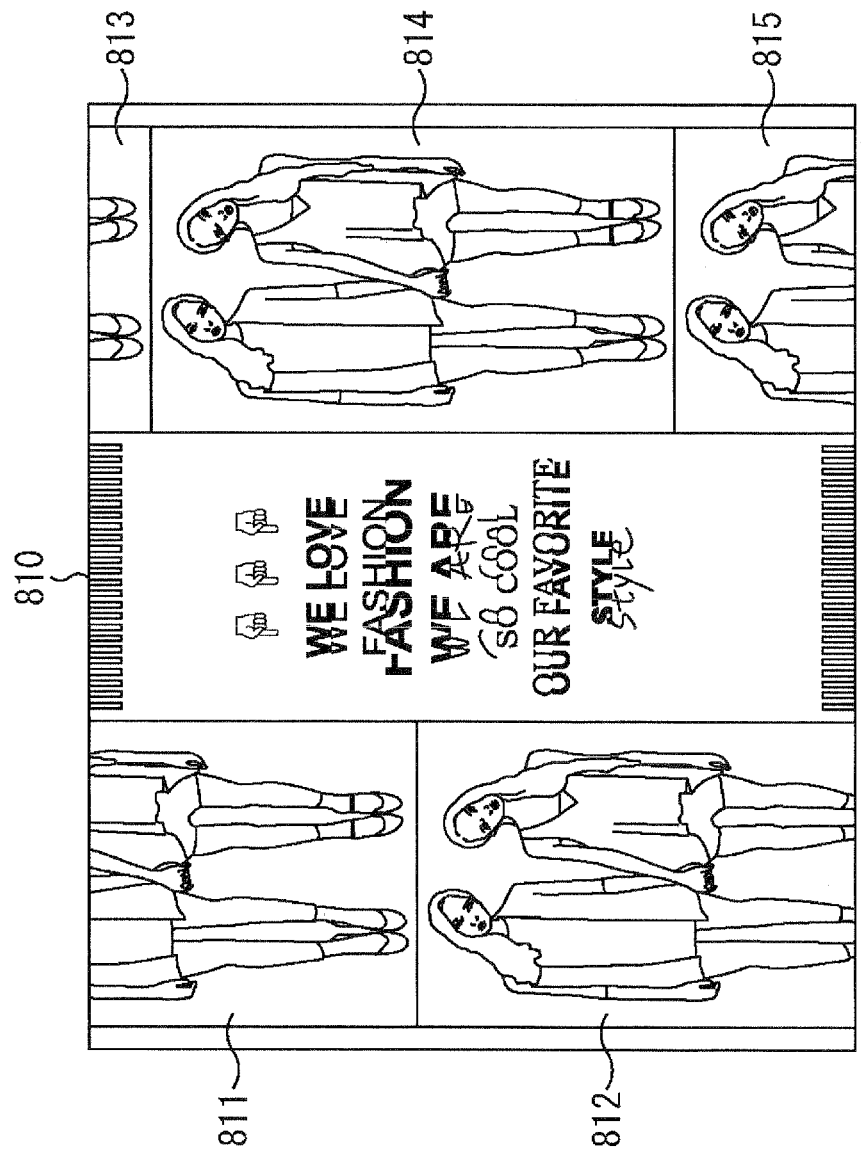
FIG. 42 is a diagram of an example of a collage photographed image.

In an example of FIG. 42, photographed images 811 and 812 are vertically arranged adjacently to each other in a region on the left side of a collage photographed image 810. Photographed images 813, 814, and 815 are also vertically arranged adjacently to each other in a region on the right side of the collage photographed image 810. A design image with a predetermined design is disposed between the photographed images 811 and 812 and the photographed images 813, 814 and 815.

All the photographed images 811 to 815 are generated based on the seventh photographed image acquired from the seventh photographing, and the photographed images 811 to 813 and 815 are generated from a portion of the seventh photographed image while the photographed image 814 is generated from the entire image. The photographed image 811 and the photographed image 815 are images acquired by dividing the seventh photographed image at a certain position, and the photographed image 812 and the photographed image 813 are images acquired by dividing the seventh photographed image at another position.

Figure 43:
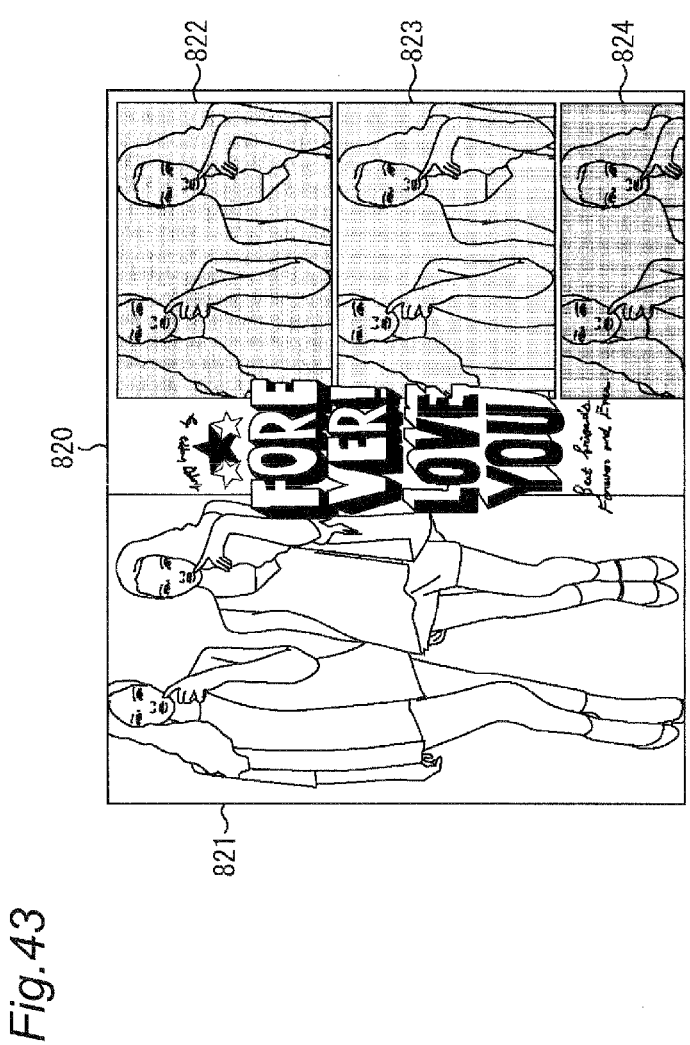
FIG. 43 is a diagram of an example of a collage photographed image.

In the example of FIG. 43, a photographed image 821 is arranged in a left side region of a collage photographed image 820. Photographed images 822 to 824 are vertically arranged adjacently to each other in a right side region of the collage photographed image 820. A design image with a predetermined design is disposed between the photographed image 821 and the photographed images 822 to 824.

All the photographed images 821 to 824 are also generated from the seventh photographed image acquired from the seventh photographing. The photographed images 822 to 824 are generated from a portion of the seventh photographed image and the photographed image 821 is generated from the entire image. The photographed images 822 to 824 are all generated from the same portion of the seventh photographed image and are subjected to respective different image processes (filtering for changing brightness, transparency, and a color tone of the image).

As described above, the collage photographing in the photo sticker creating apparatus 1 of this embodiment can provide an image finished in an unconventional manner to a user.

Although the photographed images arranged in the collage photographed image are based on one photographed image acquired from the seventh photographing in the examples, the seven photographed images acquired from the first photographing to the seventh photographing may be arranged in the collage photographed image.

The layout of the collage photographed image is not limited to the examples described above. Although the multiple photographed images arranged in the collage photographed image are vertically arranged adjacently to each other, the photographed images may horizontally be arranged or may be arranged in a matrix shape.

Even at the time of the seventh photographing (the collage photographing), a predetermined sticking mischief (a stamp image corresponding to a part of the face) may be composited. In this case, a photographed image reflecting the composition of the sticking mischief and a photographed image not reflecting the composition of the sticking mischief may be arranged in the collage photographed image.

After the background images (a background set) are selected by the user in the initial service process performed before the photographing process as described above, background images (a background set) may be selected again by the user so as to change the background image to be composited with the photographed image in the edit process performed after the photographing process.

Alternatively, instead of user's selecting background images (a background set) in the initial service process performed before the photographing process, background images (a background set) may be selected in the edit process performed after the photographing process.

In this case, for example, the respective photographed images acquired from the photographing process may be composited with the respective background images composing the background set displayed in the background set selection screen.

Although the initial service process is performed in the initial service section 208 in the photo sticker creating apparatus in the present embodiment described above, the initial service section 208 may not be provided and the initial service process may not be performed. In this case, the coin insert/return slot 74 is provided in the shooting section 21 and the coin processor 221 is provided in the photographing section 209.

In this case, specifically, in the process of the photo sticker creating apparatus 1 described with reference to the flowchart of FIG. 12, the photographing processing unit 302 determines at step S1 whether a predetermined amount of coins are inserted in the photographing space based on a signal supplied from the coin processor 221. When it is determined that the coins are inserted, steps S2 to S4 are skipped and the subsequent photographing and edit processes are performed.

Flow of Photographing Process

Figure 44:
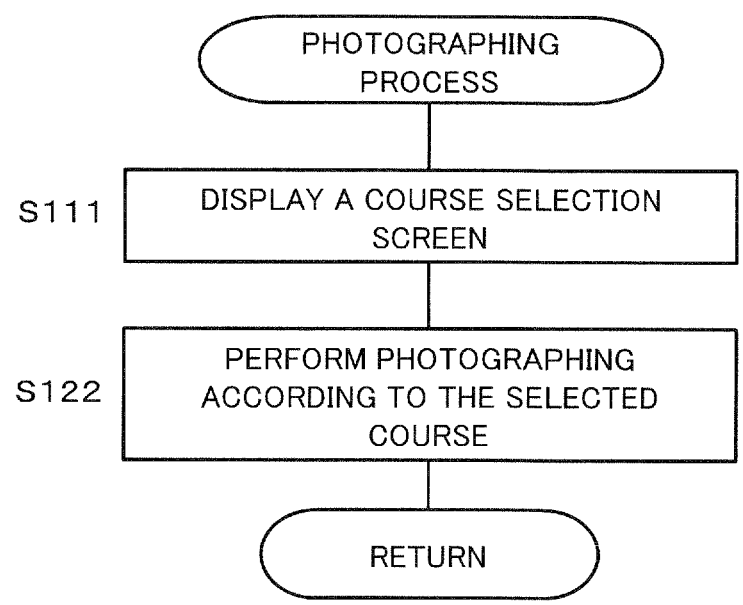
FIG. 44 is a flowchart of an example of a photographing process in the second embodiment.

A flow of the photographing process in this embodiment will be described with reference to a flowchart of FIG. 44.

The photographing processing unit 302 causes the touch panel monitor 92 to display a course selection screen (S111). The course selection screen is a screen used for selecting a photographing course corresponding to the number of users and the users select a desired course on the course selection screen.

Figure 45:
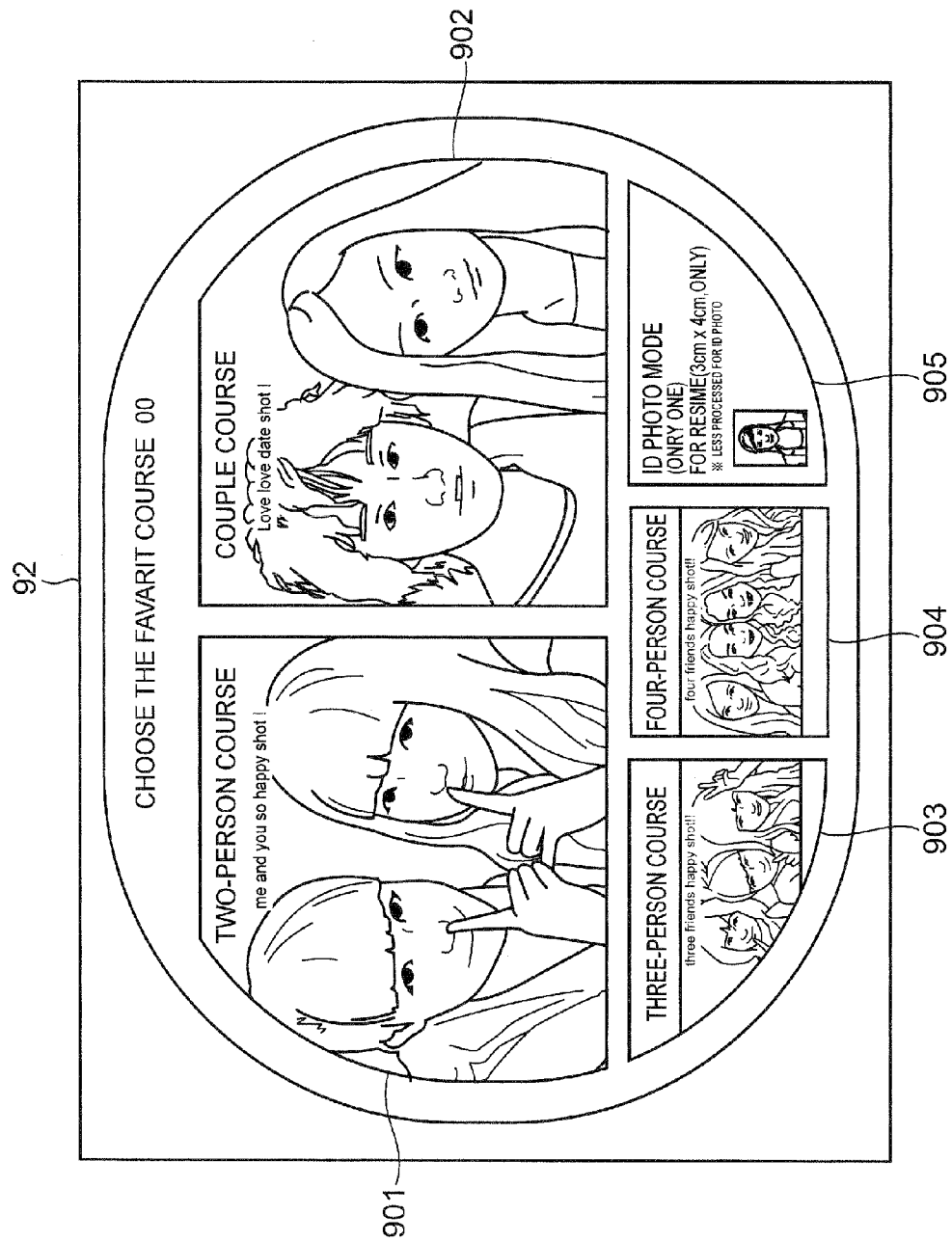
FIG. 45 is a diagram of an example of a course selection screen.

FIG. 45 is a diagram of an example of the course selection screen. A message "CHOOSE TIE FAVORITE COURSE" is displayed on the upper center of the course selection screen, and a selection button 901 to be operated (selected) for selecting a two-person course is disposed on the lower left side. On the selection button 901, a sample of an image to be acquired when the photographing is performed in the two-person course is displayed. A selection button 902 to be operated for selecting a couple course is disposed on the right side of the selection button 901. On the selection button 902, a sample of an image to be acquired when the photographing is performed in the couple course is displayed.

A selection button 903 to be operated for selecting a three-person course, a selection button 904 to be operated for selecting a four-person course, and a selection button 905 to be operated for selecting an identification photograph course are horizontally arranged at the lower side of the course selection screen. On the selection button 903, a sample of an image to be acquired when the photographing is performed in the three-person course is displayed. On the selection button 904, a sample of an image to be acquired when the photographing is performed in the four-person course is displayed. On the selection button 905, a sample of an image to be acquired when the photographing is performed in the identification photograph course is displayed.

Although not described in detail, the identification photograph course is a course for providing an identification photograph image that can be used for an identification photograph. The identification photograph course includes a photographing process for shooting an image of a user (subject) with a predetermined pose for an identification photograph, an adjustment process for adjusting an identification photograph image selected from photographed images acquired from the photographing, and a printing process of printing the adjusted identification photograph image.

In the following description, a process in the case of selecting a photographing course other than the identification photograph course will be described.

After the course selection by users, the photographing processing unit 302 performs the photographing process corresponding to the course selected on the course selection screen (S112).

For example, if the two-person course, the couple course, or the three-person course are selected, the photographing is performed seven times in total. If the four-person course is selected, the photographing is performed six times in total. The photographed images acquired in the respective courses of the two-person and couple courses, the three-person course, and the four-person course have respective different aspect ratios. Specifically, as the number of persons increases, an acquired photographed image is horizontally elongated.

A photographed image acquired from the first photographing in each of the courses is used as a target image to be subjected to a retouching process performed in an edit process as described later. The retouching process is a process for processing a predetermined portion of a subject (user) in the photographed image based on user's operation.

The last photographing in each of the courses (i.e., the seventh photographing in the case where the two-person course, the couple course, or the three-person course is selected, or the sixth photographing in the case where the four-person course is selected) is defined as the photographing for acquiring an image to be transmitted to a mobile terminal.

If a certain time elapses before the first photographing after insertion of the coins, the photographing immediately before the last photographing (i.e., the sixth photographing in the case where the two-person course, the couple course, or the three-person course is selected, or the fifth photographing in the case where the four-person course is selected) is skipped.

The photographing process is performed as described above, and then the edit process is performed.

Flow of Edit Process

A flow of the edit process in this embodiment will be described with reference to a flowchart of FIG. 46.

When the edit process is started, the edit processing unit 303 causes the tablet built-in monitor 131 to display a name entry screen (S131). The name entry screen is a screen used for the entering the user's names.

Then the edit processing unit 303 causes the tablet built-in monitor 131 to display a sex selection screen (S132). The sex selection screen is a screen used for selecting the sex of the users. The sex selection screen is displayed only when the couple course is selected in the photographing process, and the sex selection screen is not displayed when the two-person course, the three-person course, or the four-person course is selected in the photographing process.

Figure 47:
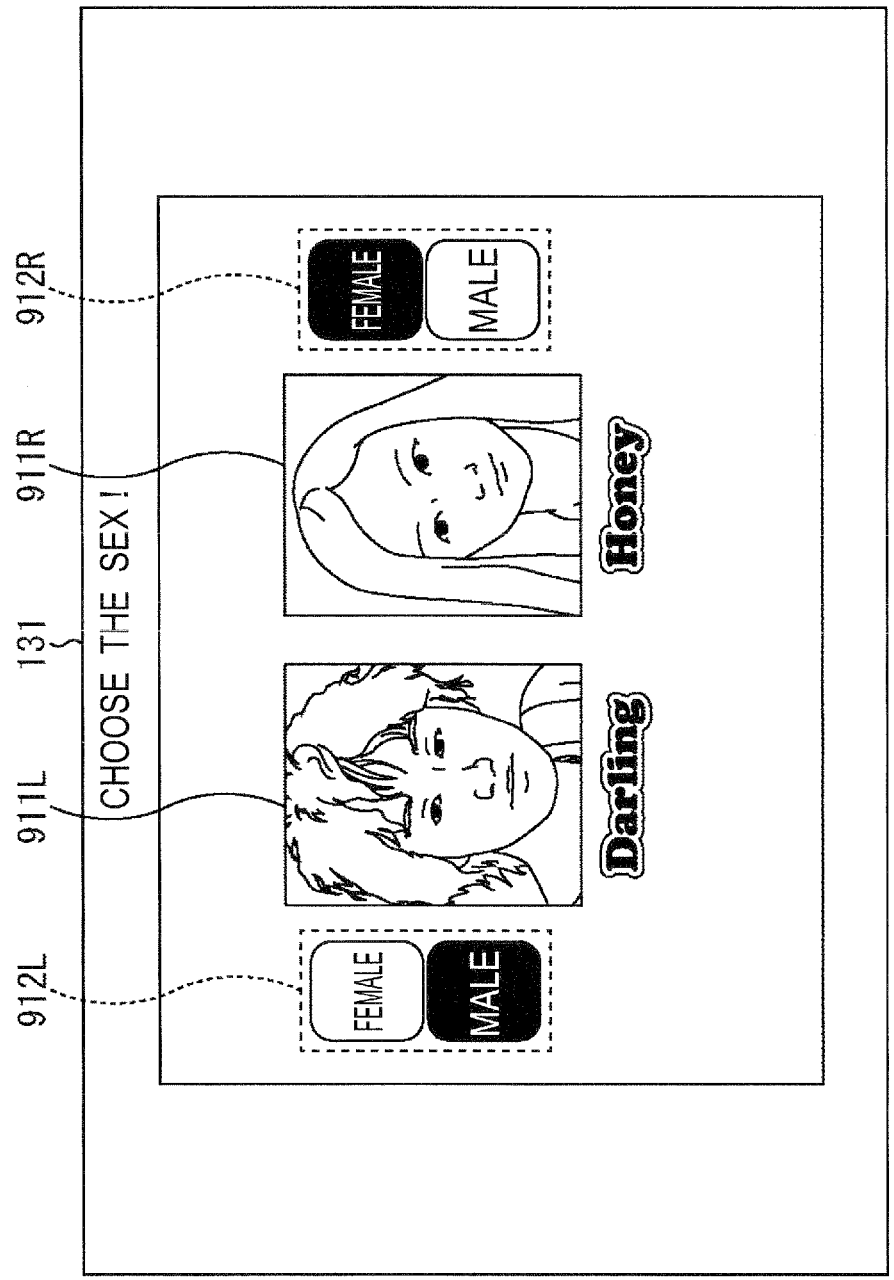
FIG. 47 is a diagram of an example of a sex selection screen.

FIG. 47 is a diagram of an example of the sex selection screen. A message "CHOOSE THE SEX" is displayed on the upper center of the sex selection screen, and a face image display region 911L and a face image display region 911R are disposed on the lower side. The face image display regions 911L, 911R display images generated by trimming the photographed images of the two users acquired from the first photographing of the photographing process. In the face image display region 911L, the face of a person appearing on the left side is enlarged and displayed. In the face image display region 911L, the face of a person appearing on the right side is enlarged and displayed.

Sex selection buttons 912L and 912R are disposed on the left side of the face image display region 911L and the right side of the face image display region 911R, respectively. The sex selection buttons 912L and 912R are buttons for selecting the sex of the person displayed in the respective corresponding face image display regions 911L and 911R. When one of "FEMALE" and "MALE" is selected with one of the sex selection buttons 912L and 912R, the sex which is not selected with the one of the sex selection buttons 912L and 912R is automatically selected for the other of the sex selection buttons 912L and 912R.

In the example of FIG. 47, a male face is displayed in the face image display region 911L and "MALE" is selected in the sex selection button 912L. On the other hand, a female face is displayed in the face image display region 911R and "FEMALE" is selected in the sex selection button 912R.

Based on the selected sex, edit tools corresponding to a standing position relative to the tablet built-in monitor 131 are provided in a graffiti edit process which is described later.

Returning to FIG. 46, the edit processing unit 303 causes the tablet built-in monitor 131 to display a retouching screen (S133). The retouching screen is a screen for receiving changes in size and brightness of the eyes, size of the face, and brightness of the skin of the subject for each of the subjects (users) appearing in the photographed image. The retouching screen displays an image generated by trimming of the regions of the faces of the respective objects from the photographed image acquired from the first photographing. When the user performs a predetermined operation to the retouching screen, the retouching process is applied such as change of the size and brightness of the eyes, the size of the face, and the brightness of the skin, for the subject in each of the photographed images.

Then the edit processing unit 303 causes the tablet built-in monitor 131 to display the background set selection screen (S134).

When the background set is selected by the users on the background set selection screen, the edit processing unit 303 controls the tablet built-in monitor 131, the speaker 241, and so on to output an image and sound introducing a flow of a graffiti operation, thereby providing the guidance for the graffiti operation to the users.

Subsequently, the edit processing unit 303 causes the tablet built-in monitor 131 to display the edit screen (S135).

The edit processing unit 303 controls elements in the editing section 210A or the editing section 210B (one by which the users perform the edit operation) to perform the graffiti edit process by receiving the graffiti operation to the photographed image from the users (S136).

When the graffiti edit operation is finished by the users, the edit processing unit 303 causes the tablet built-in monitor 131 to display a division number selection screen (S137). The division number selection screen is a screen for selecting the number of division of the sticker sheet. The layout of the sticker is determined by the number of division selected by the users.

Lastly, the edit processing unit 303 causes the tablet built-in monitor 131 to display a mobile terminal transmission confirmation screen (S138). The mobile terminal transmission confirmation screen is a screen allowing the users to select whether the photographed image acquired from the photographing process or the edited image acquired from the edit process is transmitted or not via an external server to the mobile terminals such as cellular phones owned by the users.

In the aforementioned manner, the edit process is performed.

Example of Background Set Selection Screen

Details of the background set selection screen displayed at step S134 of the edit process of FIG. 46 will be described below.

Figure 48:
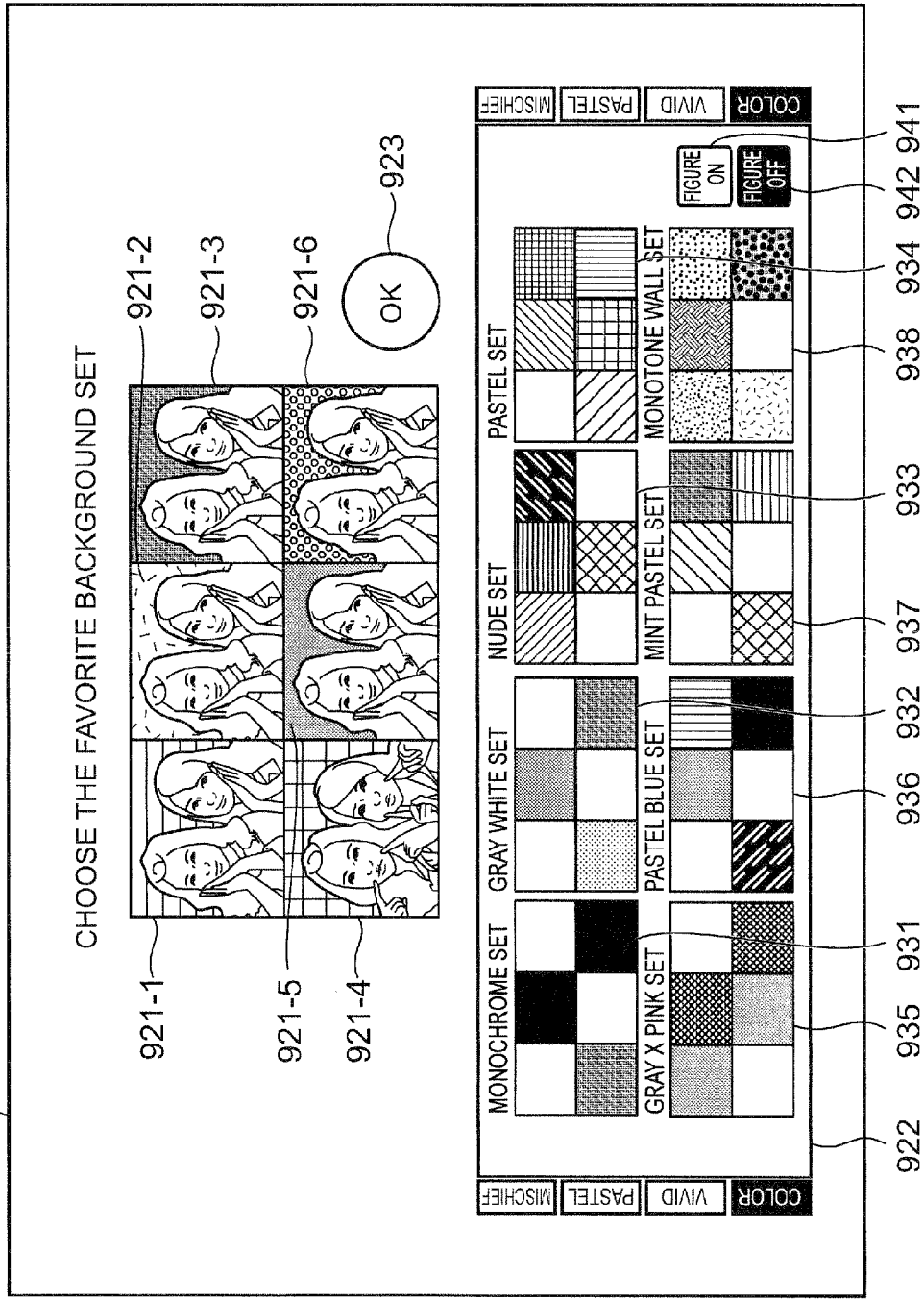
FIG. 48 is a diagram of an example of the background set selection screen.

(1) Example of Background Set Selection Screen of Two-Person Course, Three-Person Course, or Four-Person Course FIG. 48 shows an example of the background set selection screen displayed when the two-person course, the three-person course, or the four-person course is selected in the photographing process.

A message "CHOOSE THE FAVORITE BACKGROUND SET" is displayed on the upper center of the background set selection screen, and six photographed images are arranged and displayed in 2 rows×3 columns under the message. As described above, the background set is a set of preset background images and is composed of a plurality of background images selected under predetermined theme. When the number of the photographed images is six, one background set is composed of a combination of six background images. The user can select the background set to be composited with photographed images 921-1 to 921-6 on the background set selection screen.

The photographed images 921-1 to 921-6 are arranged in order of photographing, for example. The backgrounds of the users photographed in the photographed images 921-1 to 921-6 are changed when the background images are selected.

On the lower side of the photographed images 921-1 to 921-6, a background set pallet 922 is disposed that is a horizontally elongated region in which background sets are displayed as options. On the right side of the photographed images 921-1 to 921-6, an OK button 923 is disposed for determining the background set selected on the background set pallet 922 as the background set to be composited with the photographed images 921-1 to 921-6.

The background set pallet 922 displays the background sets which are categorized into genres such as "mischief", "pastel", "vivid", and "color". The genre of the background set can be selected by a tab. In the example of FIG. 48, the "color" tab is selected. For the "color" tab, eight background sets 931 to 938 are displayed for the respective themes, including "MONOCHROME SET", a "GRAY WHITE SET", a "NUDE SET", a "PASTEL SET", a "GRAY×PINK SET", a "PASTEL BLUE SET", a "MINT PASTEL SET", and a "MONOTONE WALL SET".

Each of the background sets 931 to 938 displayed on the "color" tab has a theme representative of a type of color. Each of the background sets 931 to 938 includes six background images matching each theme and giving a sense of uniformity.

On the lower right side of the background set pallet 922, a figure ON button 941 and a figure OFF button 942 are disposed. When the figure ON button 941 is selected, the six background images are displayed, composited with the six photographed images in each background set 931 to 938 displayed on the background set pallet 922. When the figure OFF button 942 is selected, the respective background images are displayed without the photographed images composited therewith.

In the example of FIG. 48, the figure OFF button 942 is selected and the six respective background images are displayed without the six photographed images composited in each of the background sets 931 to 938 displayed on the background set pallet 922.

Figure 49:
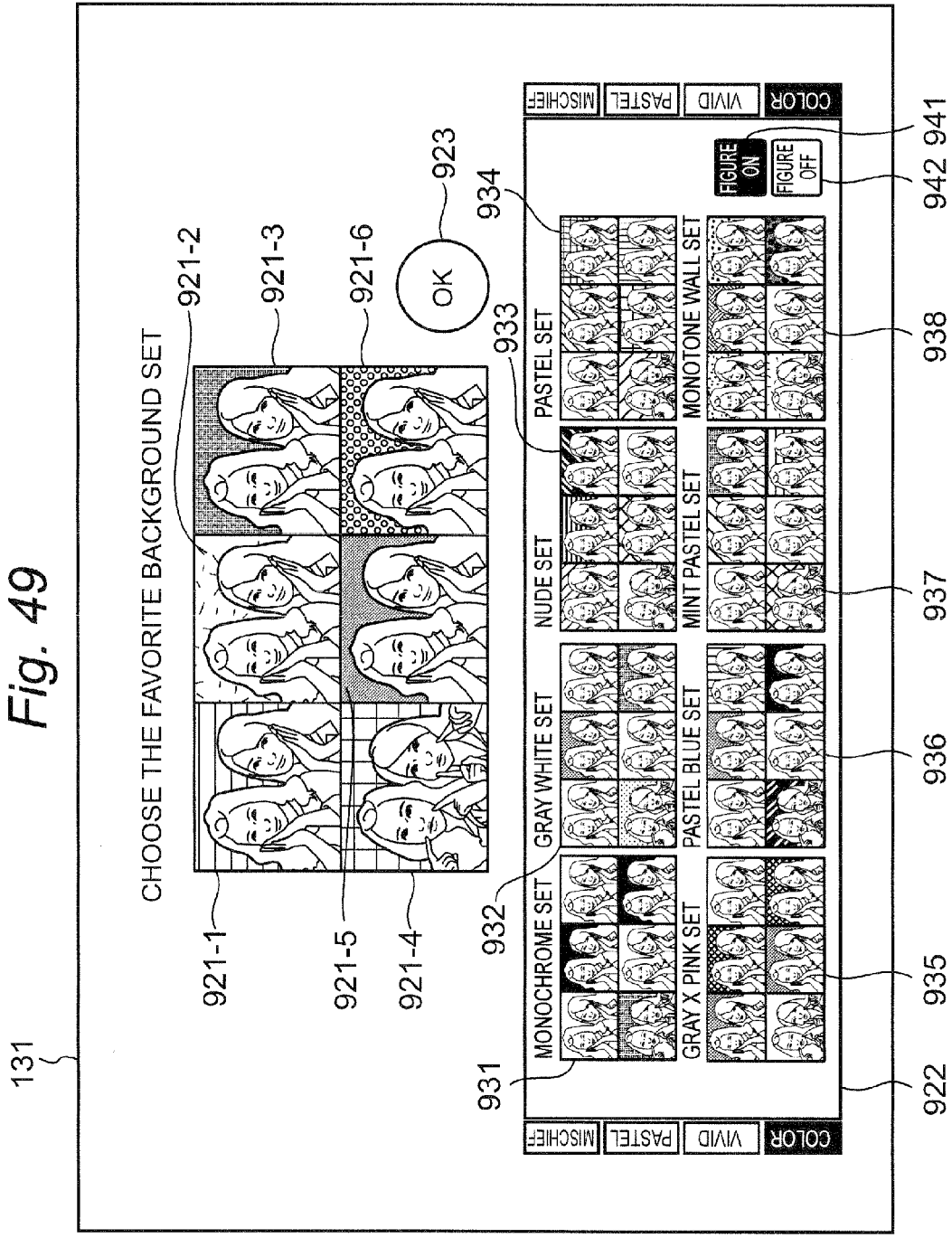
FIG. 49 is a diagram of an example of the background set selection screen.

FIG. 49 shows an example of the background set selection screen appearing when the figure ON button 941 is selected in the state as shown in FIG. 48. The six respective background images are displayed while composited with the six photographed images, in each of the background sets 931 to 938 displayed on the background set pallet 922.

As described above, the background sets displayed as options in the background set pallet 922 are displayed while composited with the photographed images, the users can select the background set while checking the finished photographed images after composition with the background images.

In the background set, the respective background images are arranged in order of photographing of the photographed images to be composited.

Figure 50:
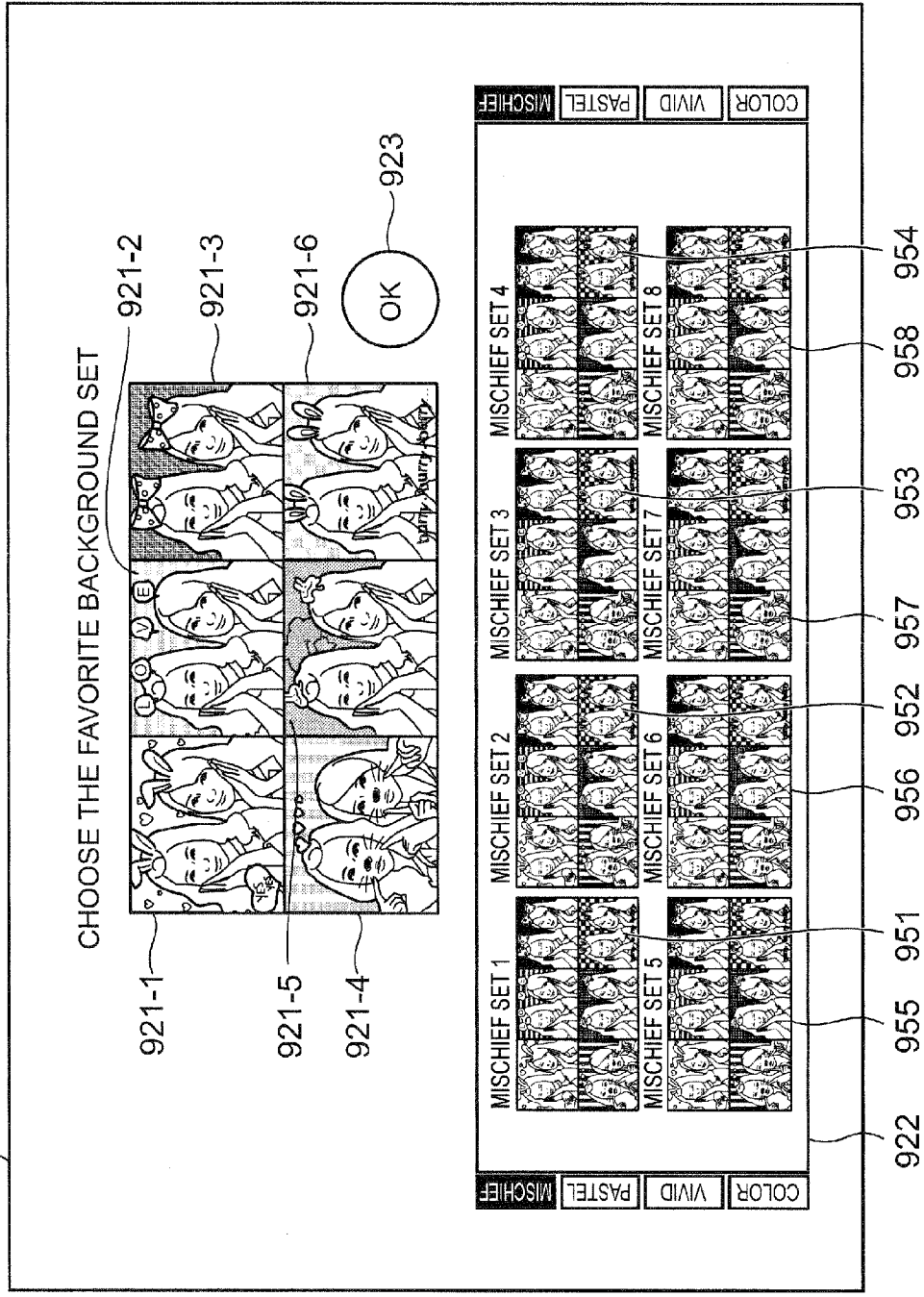
FIG. 50 is a diagram of an example of the background set selection screen.

FIG. 50 shows an example of a background set selection screen when the "mischief" tab is selected on the background set pallet 922.

For the "MISCHIEF" tab, eight background sets 951 to 958 are displayed for respective themes, including a "MISCHIEF SET 1", a "MISCHIEF SET 2", a "MISCHIEF SET 3", a "MISCHIEF SET 4", a "MISCHIEF SET 5", a "MISCHIEF SET 6", a "MISCHIEF SET 7", and a "MISCHIEF SET 8". The respective background sets 951 to 958 displayed on the "MISCHIEF" tab are provided various themes expressing humor with illustrations and designs. Each of the background sets 951 to 958 displayed on the "MISCHIEF" tab includes six background images matching each theme and giving a sense of uniformity.

If the "MISCHIEF" tab is selected on the background set pallet 922, the figure ON button 941 and the figure OFF button 942 are not displayed, and the background sets 951 to 958 are displayed with the background images composited with the photographed images. Therefore, when the "MISCHIEF" tab is selected, each of the background sets 951 to 958 is always displayed with the photographed images composited with the background images.

For the background images composing the background sets displayed in the background set pallet 922 with the "MISCHIEF" tab selected, the background images are prepared, including foreground images such as a stamp image and a frame image to be composited with the foreground of subjects in addition to the images composited with the background of the subjects in the photographed images. As the foreground images, the images matching the themes of the respective background sets are prepared. All the six background images composing the background set may be foreground images, or a predetermined number of background images out of the six background images may be foreground images.

Figure 51:
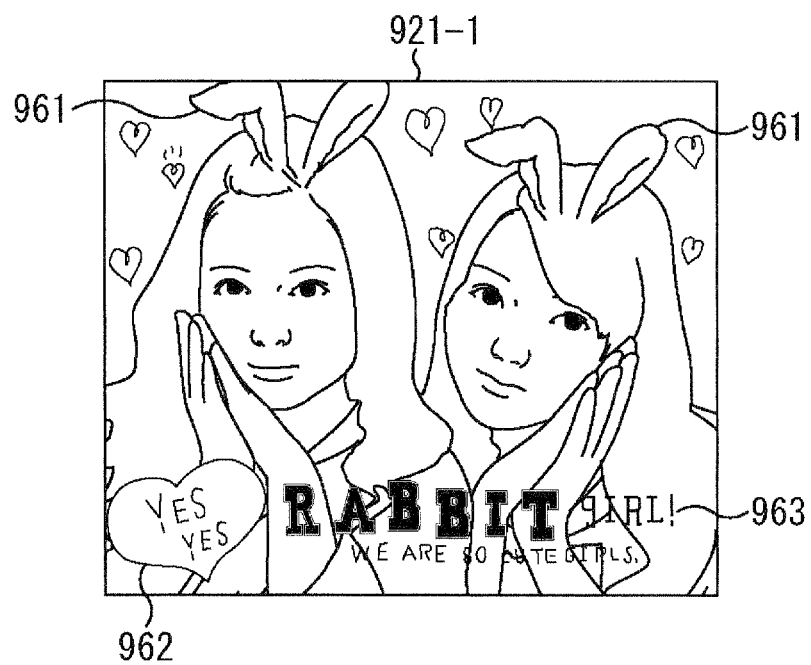
FIG. 51 is a diagram of an example of a photographed image composited with a stamp image.

For example, as shown in FIG. 51, stamp images 961 representing rabbit ears may be composited as the foreground images with the heads of two respective users appearing in the photographed image 921-1 displayed on the background set selection screen shown in FIG. 50. On the lower portion of the photographed image 921-1, a heart-shaped stamp image 962 and a stamp image 963 including a predetermined text may be composited as the foreground images.

In the photographed image 921-1, the stamp images 961 are adjusted in size and direction depending on the sizes and directions of the faces (heads) of the respective users and composited at the positions of the heads of the respective users. On the other hand, the stamp images 962 and 963 are composited at predetermined positions regardless of the positions of the two users and the sizes and directions of the faces.

Figure 52:
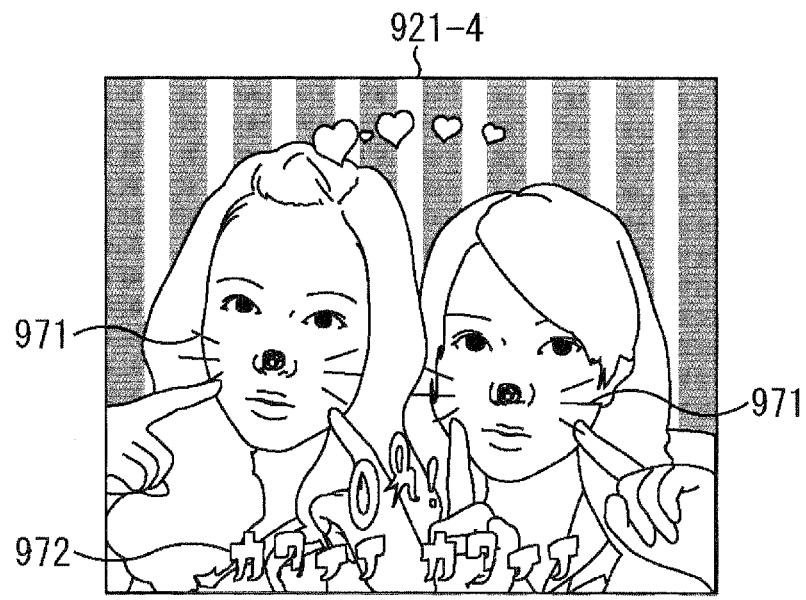
FIG. 52 is a diagram of an example of a photographed image composited with a stamp image.

As shown in FIG. 52, stamp images 971 representing a nose and whiskers of an animal such as a dog and a cat may be composited as the foreground images with the noses and both cheeks of two respective users included in the photographed image 921-4 displayed on the background set selection screen shown in FIG. 50. On the lower portion of the photographed image 921-4, a stamp image 972 including a predetermined text may be composited as the foreground image.

In the photographed image 921-4, the stamp images 971 are adjusted in size and direction depending on the sizes and directions of the faces of the respective users and composited at the positions of the noses and both cheeks of the respective users. On the other hand, the stamp image 972 is composited at a predetermined position regardless of the positions of the two users and the sizes and directions of the faces.

Any stamp images other than the stamp images shown in FIGS. 51 and 52 may be prepared. For example, stamp images related makeup may be prepared, such as a lip image representing lipsticked lips and a cheek image representing blush applied cheeks of a user. For a user who usually does not put makeup, such a stamp image enables provision of a photographed image in which the user looks as if makeup is applied to the user, so that a degree of satisfaction of the user can be increased.

Although the stamp images 962 and 963 shown in FIG. 51 and the stamp image 972 shown in FIG. 52 are composited at predetermined positions, the composition position may be changed depending on the position of the users in the photographed image. For example, the stamp image may be arranged and composited at a position at which the stamp image does not overlap with the face of the user.

Although the subjects in the photographed images 921-1 to 921-3, 921-5, and 921-6 are all photographed in the same pose and same arrangement in the example of FIG. 50, actually the subjects are photographed in respective different poses and different arrangements. Therefore, the stamp image used as the foreground image is adjusted in size, direction, and position depending on the pose and arrangement of the subject (user) for each photographed image and composited with the photographed image.

The display function of the "MISCHIEF" tab can be implemented by the same method as the process described with reference to FIG. 34.

If the "PASTEL" tab or the "VIVID" tab is selected on the background set pallet 922 in the examples of FIGS. 48 to 50, the figure ON button 941 and the figure OFF button 942 are displayed on the lower right side of the background set pallet 922 same as the case when the "COLOR" tab is selected.

Figure 46:
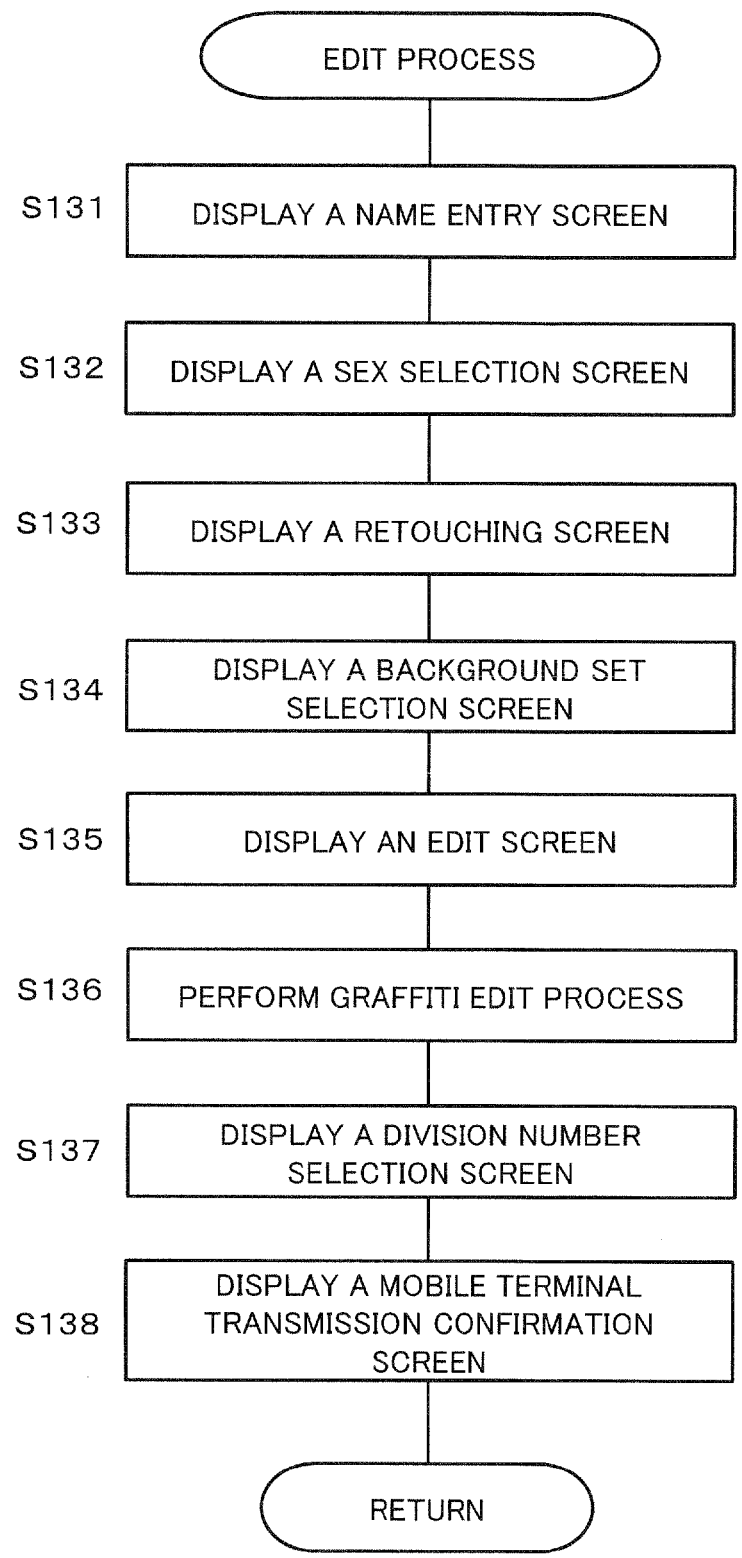
FIG. 46 is a flowchart of an example of an edit process in the second embodiment.

It is noted that at step S134 of the edit process shown in FIG. 46, the "MISCHIEF" tab is selected on the background set pallet 922 in a state (an initial state) that the background set selection screen is first displayed.

The description has been made of the example of the background set selection screen displayed when the "TWO-PERSON COURSE", the "THREE-PERSON COURSE", or the "FOUR-PERSON COURSE" is selected in the photographing process. Description will hereinafter be made of an example of the background set selection screen displayed when the "COUPLE COURSE" is selected in the photographing process.

(2) Example of Background Set Selection Screen of Couple Course

Figure 53:
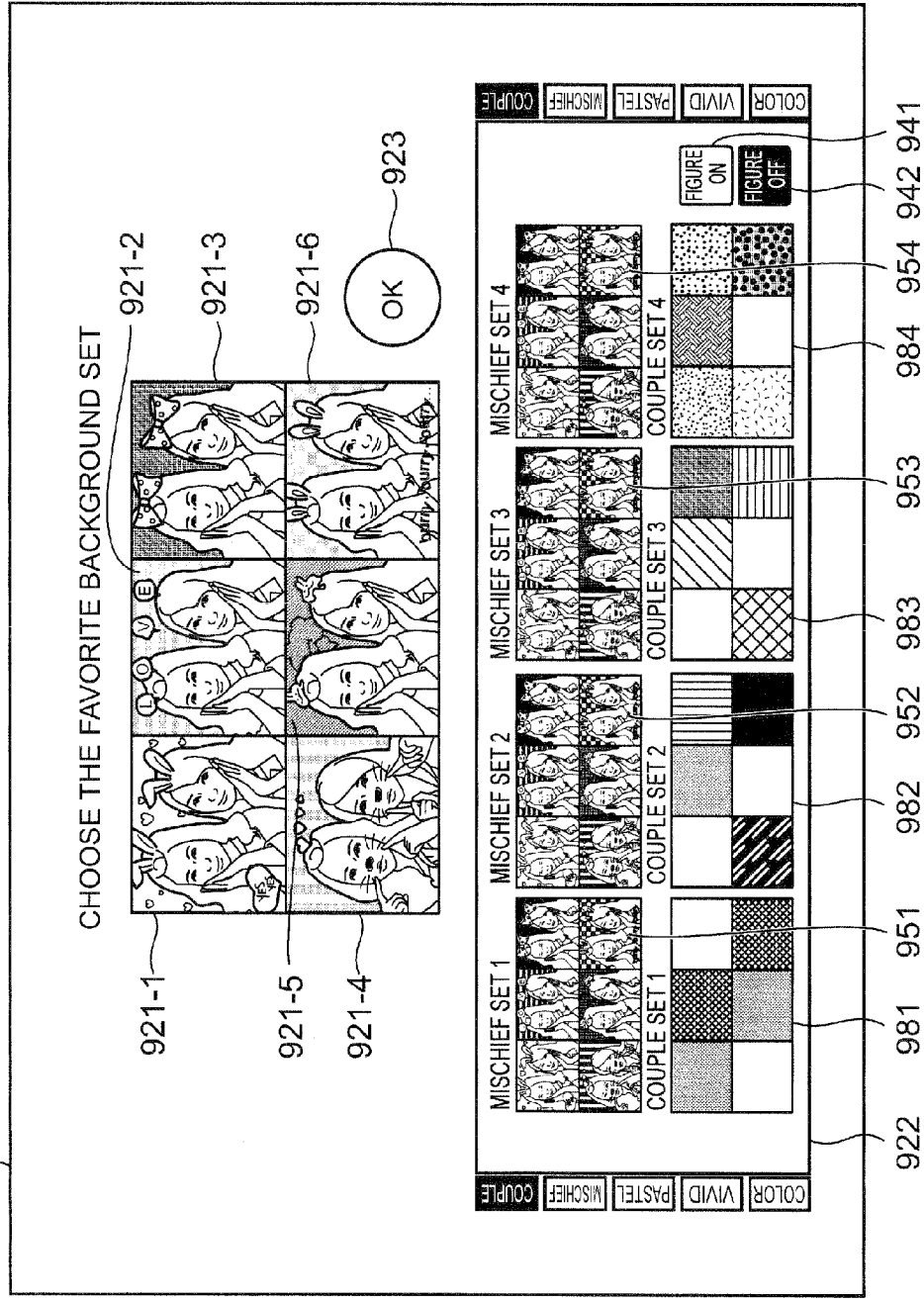
FIG. 53 is a diagram of an example of the background set selection screen.

FIG. 53 shows an example of the background set selection screen displayed when the couple course is selected in the photographing process.

The background set selection screen shown in FIG. 53 has basically the same configuration as the background set selection screen shown in FIG. 48 and so on, but it is different in that a "COUPLE" tab is additionally disposed on the background set pallet 922.

In the example of FIG. 53, the "COUPLE" tab is selected. The "COUPLE" tab displays the four background sets 951 to 954 including the "MISCHIEF SET 1", the "MISCHIEF SET 2", the "MISCHIEF SET 3", and the "MISCHIEF SET 4", which are displayed also on the "MISCHIEF" tab as described above, as well as four background sets 981 to 984 including a "COUPLE SET 1", a "COUPLE SET 2", a "COUPLE SET 3", and a "COUPLE SET 4", which are specific to the "COUPLE" tab.

Each of the background sets 981 to 984 (COUPLE SET 1 to 4) displayed upon selection of the "COUPLE" tab is provided a theme expressing intimacy of a couple, for example. Each of the background sets 981 to 984 displayed on the "COUPLE" tab is configured by six background images matching each theme and having a sense of uniformity.

The figure ON button 941 and the figure OFF button 942 are displayed on the lower right side of the background set pallet 922. The background images can be displayed, composited with the photographed images, or they can be displayed with not composited with the photographed images.

Among the background sets displayed on the background set pallet 922, each of the background sets 951 to 954 is displayed, always composited with six photographed images regardless of states of the figure ON button 941 and the figure OFF button 942.

As described above, when the "COUPLE," tab is selected on the background set pallet 922, the background set pallet 922 has the background sets according to the theme related to a couple with the background sets according to the theme of the "MISCHIEF" tab.

The display function of the "COUPLE" tab can be implemented in the same method as the display process described with reference to FIG. 34, similarly to the case with the display function of the "MISCHIEF" tab.

In the couple course, when a background image composing a background set displayed on the "MISCHIEF" tab or the like includes a foreground image and is composited with a photographed image, the foreground image is different depending on the sex of the subject (user) of the photographed image. For example, if the background image including the lip image described above is composited with the photographed image, a lip image representing a lip with lipstick thickly applied is composited with a lip portion of a female user while a lip image representing a lip with lipstick lightly applied is composited with a lip portion of a male user.

It is noted that in the couple course, at step S134 of the flowchart of FIG. 46, the "COUPLE" tab is selected on the background set pallet 922 in a state (an initial state) when the background set selection screen is first displayed.

On the background set selection screen in this embodiment, by operating the OK button 923 in a state that a predetermined background set displayed on the background set pallet 922 is selected, the selected background set is determined as the background set to be composited with the photographed images. If the OK button 923 is not operated within a predetermined time after the background set selection screen is displayed, the background set being selected at that time point is selected as the background set to be composited with the photographed images.

In the above description, the figure ON button 941 and the figure OFF button 942 are not displayed on the background set pallet 922 when the "MISCHIEF" tab is selected. However the figure ON button 941 and the figure OFF button 942 may be displayed. In this case, when the figure OFF button 942 is selected, the display of the stamp images (foreground images) included in the background images may be disappeared along with the subjects (users) composited with the background images.

In the above description, the stamp image corresponding to the predetermined part of the face is composited with each of the subjects (users) appearing in the photographed image. However, if the number of users is larger than a predetermined number, the stamp image may not be composited with the photographed image or the "MISCHIEF" tab itself may not be displayed.

In the above description, the background set is selected on the background set selection screen so that a plurality of background images corresponding to a plurality of photographed images can be selected at one time. However the background images corresponding to a plurality of photographed images may individually be selected.

Although the background image and the foreground image are correlate one-to-one with each other in the background images including the foreground images described above, one background image may be correlated with a plurality of foreground images matching the taste of the background image. In this case, for the background image, it may be configured to allow the users to select the foreground image to be composited with the photographed image out of a plurality of the foreground images.

When the background images (the background set) are selected by the users in the initial service process, model images obtained by photographing models may be displayed on the background set selection screen shown in FIG. 48 or the like, instead of the photographed images 921-1 to 921-6 including the users. In this case, if the background image including the stamp image as the foreground image is composited with the model image, the stamp image is adjusted in size and direction depending on the size and direction of each of faces of the respective models in the model images, and is composited at a predetermined position of the face of the model. The live-view image during photographing is displayed in the same manner as that of the case described with reference to FIG. 33, for example.

In the above description, the example of displaying the photographed images in the case of performing the close-up photographing has been described. In the case of performing the whole body photographing, the stamp images corresponding to predetermined parts of the body of a user other than the face such as the hands, the feet, and the waist (e.g., stamp images representing gloves, boots, and a tail) may be composited with the photographed images. In this case, the parts of the body of the user are detected on the photographed image based on a result of recognition of a skin color region and a person by a predetermined detection process, and the stamp images is composited with the detected parts.

Further the aspect ratio of the photographed image varies depending on the photographing course as described above. Thus, the stamp images included in the background images composing the background set displayed on the "MISCHIEF" tab may be changed depending on the aspect ratio. For example, if the aspect ratio of the photographed image indicates a vertically elongated ratio, the stamp image included in the background images composing the background set displayed on the "MISCHIEF" tab may be changed to vertically-long stamp image.

The stamp images corresponding to the predetermined parts of the faces of the users are located on an upper layer than the photographed images due to layer structure. Thus, the stamp images can be displayed to be selectable by user's operation on the edit screen displayed at the graffiti edit process and can then be scaled up/down, moved, rotated, and so on, as is the case with the other images for composition (such as stamp images).

When a stamp image corresponding to a predetermined part of the face of a user is composited with a photographed image and is transmitted to a mobile terminal, the stamp image may be formed as an animation image. The stamp image may be animated on the photographed image being displayed on the mobile terminal.

Other Embodiments

The first and second embodiments have been described as examples of the present disclosure. However, the technique in the present disclosure is not limited thereto and the ideas described in the first and second embodiments can appropriately be modified, replaced, added, omitted, etc. The constituent elements described in the first and second embodiments can appropriately be combined. Variations of the embodiments will hereinafter be described.

In the first embodiment, when the random button in each of the stamp image groups is pressed, any stamp image displayed as a stamp image in the stamp image group is randomly selected on the edit pallet 415. However, the stamp images to be composited at the time of pressing of the random button 437 in a certain stamp image group may include a stamp image that is not displayed as a stamp image of the certain stamp image group on the edit pallet 415. This stamp image is a stamp image which appears only when the random button 437 is pressed and thus it has a rarity value for the users.

For example, when the random button is pressed, a stamp image of a stamp image group having a specific category (hereinafter referred to as a "random button category") is randomly selected and composited with the image to be edited.

Figure 54:
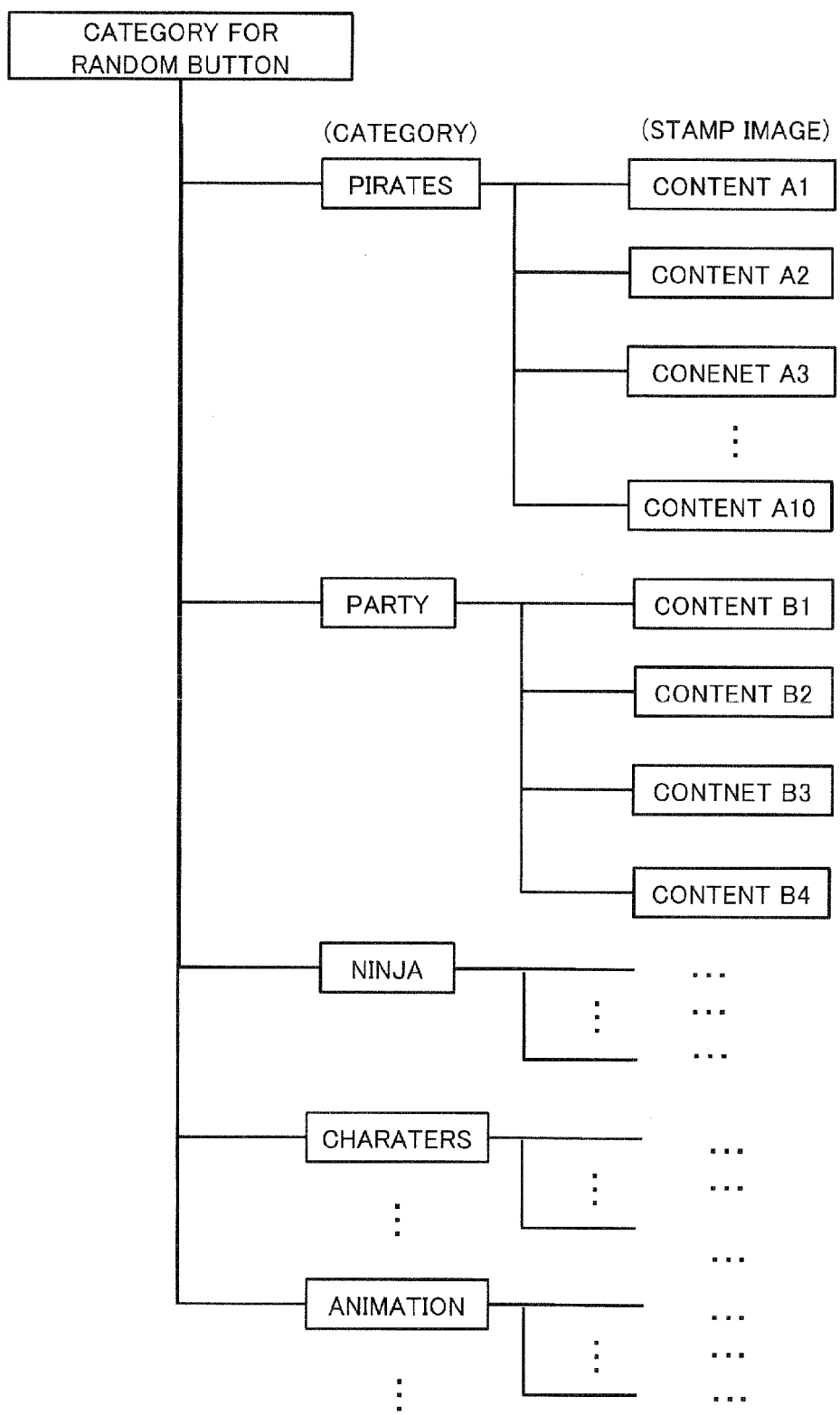
FIG. 54 is a diagram for explaining a configuration of categories for a random button.

FIG. 54 is a diagram for explaining a configuration of the random button categories selected when the random button is pressed. In this embodiment, categories of "PIRATE", "PARTY", "NINJA", "CHARACTER", and "ANIMATION" are prepared as examples of the random button categories. Each of the categories includes a plurality of stamp images (content images) related to the category. For example, as shown in FIG. 55, for the "PIRATE" category, images of which are suggestive of pirates, such as images of hats (contents A1, A5, A9), mustaches (contents A2, A8), bandannas (contents A3, A7), and eye patches (contents A4, A6, A10), are prepared as the stamp images. For the "party" category, as shown in FIG. 56, images suggestive of a party, such as images of hats (contents B1, B3) and eyeglasses (contents 32, 34), are prepared as the stamp images.

In this case, when the random button is pressed, one category is randomly selected from the multiple random button categories, and one stamp image is further randomly selected from the multiple stamp images included in the selected category and is composited with the edit target image.

After the random button is first pressed and the image for composition is selected, when the random button is pressed for the second time, the stamp image is randomly selected from the same category as the category selected at the time of the first pressing of the random button. A world view is defined for each category. Thus, the stamp image is randomly selected from the same category, in order to prevent the once defined world view from being lost after one category is once determined.

The number of the stamp images selected at the time of pressing of the random button may be one or more. For example, in the pirate category, two stamp images are selected at the same time by pressing the random button once. Specifically, as shown in FIG. 55, the images of the contents A1 and A2, the images of the contents A3 and A4, the images of the contents A5 and A6, . . . are selected as a set. On the other hand, in the party category, as shown in FIG. 56, only one stamp image is selected by pressing the random button once.

As described above, when the random button is pressed, one category may randomly be selected from the multiple random button categories, and at least one stamp image tray randomly be selected from the multiple stamp images included in the selected category and composited with the edit target image.

A function may be provided, that can cancel the composition of a stamp image in a state that the stamp image composited with the edit target image is displayed in the edit target image display region. In this case, when a "return" button is pressed by a user, the stamp image most recently composited with the edit target image may be disappeared. As a result, the user can reset the edit of the stamp image and restart the edit of the stamp image from the beginning.

When the stamp image is touched twice in a state that a stamp image composited with the edit target image is displayed in the edit target image display region, the edit (such as rotation and scale-up/down) of the stamp image may be enabled. For example, in a case where a stamp image composited with the edit target image is displayed in the edit target image display region 411, when the stamp image is touched by a user with a finger or a stylus pen (first touch), the control device 201 specifies the touched stamp image as an edit target. Subsequently, when the user performs a predetermined touch operation (second touch) to the specified stamp image or a region therearound, the control device 201 may edit the stamp image in accordance with the operation. For example, when the touch operation for rotation or scale-up/down is performed by using two fingers, the control device 201 may rotate or scale up/down the stamp image in accordance with the operation. Regarding a touch position, even when a display region of the stamp image is not directly touched, the operation can be performed by touching a region within a predetermined range from the display region.

In the first embodiment, when a stamp image is disposed in a region near the face or a region near the body of a user in the edit target image, the function of the auto-stamp button allows the stamp image to be composited with the corresponding part of the face or the body. A function equivalent to the function of the auto-stamp button may be applied to the live-view image displayed in the photographing process and the photographed image displayed as a photographing result.

For example, the stamp images such as those composited with the faces (such as the ears and the noses) of the users are displayed as the foreground images at fixed positions on the live-view display screen displaying the live view image, and the display region of the live-view image is moved such that the corresponding parts of the faces of the users in the live-view image captured by the camera 91 are located at the fixed positions corresponding to the stamp images.

With this arrangement, the users can perform the photographing while imaging an actually acquired image, without taking any action to match the positions of their own faces to the positions of the stamp images displayed on the live-view display screen.

In the embodiments described above, the photo sticker creating apparatus 1 prints the acquired photographed image or the edited image on a sticker sheet and transmits the image to the server to provide the mobile terminals of the users with the image. However, the photo sticker creating apparatus 1 may be configured not to print the photographed image or the edited image on a sticker sheet, but only transmit the photographed image or the edited image to the server, thereby providing the mobile terminals of the users with the image. Contrarily, the photo sticker creating apparatus 1 can be configured to only print the photographed image or the edited image on a sticker sheet without transmitting the image to the server.

A series of the processes by the control device 201 of the photo sticker creating apparatus 1 described in the first and second embodiments can be achieved by hardware or software. Therefore, for example, the control device 201 can be made up of one or more CPUs, MPUs, DSPs, ASICs, FPGAs, etc. If a series of the processes described above is executed by software, programs composing the software is installed from a network or a recording medium.

For example, the recording medium is made up of the removable medium 205 such as a magnetic disk (including a flexible disk), an optical disk (including CD-ROM and DVD), a magneto-optical disk (including MD), or a semiconductor memory, which can be distributed for delivering the program to an administrator of the photo sticker creating apparatus 1 separately from the apparatus main body. Further, the recoding medium is also made up of the ROM 206 recording the program which is preliminarily incorporated into the apparatus main body and delivered to the administrator, or a hard disk included in the storage device 202.

A print medium in the above description is not limited to a sticker sheet or a photographic paper sheet. For example, the image may be printed on paper or film of a predetermined size, paper for a poster, a card such as a telephone card, or fabric such as a T-shirt.

The embodiments of the present invention are not limited to the embodiments described above and may variously be modified without departing from the spirit of the present invention.

The present disclosure discloses an image generating apparatus having the following configuration.

(1) A first image generating apparatus include:

a photographing unit that photographs a user as a subject to acquire a photographed image;

a display unit that displays, as well as the photographed image, an edit pallet on which multiple images for composition which are used as edit tools for editing the photographed image are displayed and categorized into predetermined groups (categories); and a compositing unit that composites the image for composition with the photographed image in accordance with an operation to the edit pallet by the user.

The compositing unit randomly selects and composites any of the images for composition included in a predetermined group with the photographed image in accordance with user's operation to the edit pallet corresponding to the predetermined group.

(2) In the apparatus of (1), the compositing unit may randomly select and composite any one of images for composition included in the predetermined group with the user in the photographed image in accordance with user's operation to the edit pallet corresponding to the predetermined group.

(3) In the apparatus of (1) or (2), the photographing unit may photograph multiple users as subjects and the compositing unit may randomly select and composite any one of images for composition included in the predetermined group with each of the multiple users in the photographed image in accordance with user's operation to the edit pallet corresponding to the predetermined group.

(4) In the apparatus of (3), the compositing unit may randomly select and composite multiple stamp images, including at least one pair of stamp images each different from each other, included in the predetermined group with the respective multiple users in the photographed image in accordance with user's operation to the edit pallet corresponding to the predetermined group.

(5) In any one of the apparatuses of (1) to (4), the display unit may display the images for composition and a predetermined button for each of the groups on the edit pallet. When any of the images for composition is selected, the compositing unit may composite the selected image for composition with the photographed image. When the button is selected, any of the images for composition included in the corresponding group may randomly be selected and composited with the photographed image.

(6) In the apparatus of (3), the display unit may display images for composition categorized in accordance with predetermined parts of the user in the photographed image, as the image for composition included in the respective groups. The compositing unit may recognize a predetermined part of the user in the photographed image and composite any of the images for composition included in a group with the predetermined part of the user corresponding to the group in the photographed image.

(7) In the apparatus of (5) or (6), the display unit may display images for composition categorized in accordance with the part of the face of the user in the photographed image as the images for composition included in the respective groups. When the button is selected, the compositing unit may composite any of the images for composition included in the corresponding group with the predetermined part of the face of the user corresponding to the group in the photographed image.

(8) In the apparatus of (5) or (6), the display unit may display respective images for composition to be composited with parts of the face of the user in the photographed image, as the images for composition included in one group. When the button is selected, the compositing unit may combine and composite a combination of some of images for composition included in the corresponding group with the parts of the face of the user in the photographed image.

(9) In the apparatus of any one of (5) to (8), each time the button is selected, the compositing unit may randomly select and composite any of the images for composition included in the corresponding group with the user in the photographed image.

(10) A first image generating method includes a photographing step of photographing a user as a subject to acquire a photographed image, a displaying step of displaying, as well as the photographed image, an edit pallet on which multiple images for composition used as edit tools for editing the photographed image are displayed and categorized into groups, and a compositing step of compositing the image for composition with the photographed image in accordance with user's operation to the edit pallet. In the process of the compositing step, any image for composition included in a predetermined group is randomly selected and composited with the photographed image in accordance with user's operation to the edit pallet corresponding to the predetermined group.

(11) A second image generating apparatus is an image creating apparatus (e.g., a photo sticker creating apparatus) that photographs a user as a subject, edits an acquired photographed image in accordance with input from the user, and prints the edited photographed image on a sticker sheet. The second image generating apparatus includes a camera that photographs a user as a subject, a composition processing unit that recognizes the face of the user in a captured image captured by the camera, adjusts an image for composition corresponding to a predetermined part of the face of the user in size and direction depending on the size and direction of the recognized face of the user, and composites the image for composition with the predetermined part of the face of the user in the captured image, and a display control device that controls display of the captured image with which the image for composition is composited at the predetermined part of the face of the user.

(12) In the apparatus of (11), when the captured image is a live-view image displayed in real time before acquisition of the photographed image, the composition processing unit may recognize the face of the user in the captured image, and composite the image for composition with a predetermined part of the face of the user in the captured image in accordance with a motion of the user in the captured image.

(13) In the apparatus of (11) or (12), the composite processing unit may composite an image for composition which is different for each user with a predetermined part of the face of each user in the captured image.

(14) In the apparatus of any of (11) to (13), when a course related to photographing, which is selected by a user before photographing, is a predetermined course, the composite processing unit may composite the image for composition with the predetermined part of the face of the user in the captured image.

(15) In the apparatus of any of (11) to (14), the composite processing unit may composite the image for composition corresponding to a background image which is selected by the user and is used as a background of the user in the captured image, with the predetermined part of the face of the user in the captured image.

(16) In the apparatus of any of (11) to (15), when the number of users is less than a predetermined number, the composite processing unit may composite the images for composition with the predetermined part of the faces of the users in the captured image.

(17) The apparatus of (1) may further comprise an editing unit that edits a captured image in accordance with input from the user when the captured image is a photographed image acquired as a result of photographing. The editing unit may apply predetermined editing to the image for composition to be composited with the captured image, in accordance with input from the user.

(18) A displaying method of an image is a displaying method of an image generating apparatus. The displaying method includes photographing a user as a subject, editing an acquired photographed image in accordance with input from the user, and printing the edited photographed image on a sticker sheet. The displaying method includes the steps of recognizing the face of the user in an image captured by the camera which photographs the user as a subject, adjusting an image for composition corresponding to a predetermined part of the face of the user in size and direction depending on the size and direction of the recognized face of the user, compositing the image for composition with the predetermined part of the face of the user in the captured image, and displaying the captured image including the image for composition composited with the predetermined part of the face of the user.

Although the present invention has been described by using the specific embodiments, various other variations and modifications and other usage of the specific embodiments are apparent to those skilled in the art. Therefore, the present invention is not limited to the specific disclosure and may be limited only by the appended claims.

This application relates to Japanese Patent Application Nos. 2013-264572 (filed on Dec. 20, 2013), 2014-142739 (filed on Jul. 10, 2014), 2014-152603 (filed on Jul. 28, 2014), and 2014-232157 (filed on Nov. 14, 2014), of which contents are incorporated herein by reference.

That is claimed is:

1. An image generating apparatus comprising:
   an imaging device that photographs a user to generate a photographed image; and
   a control device that performs a process of compositing an image for composition with the photographed image, wherein the control device
      detects a plurality of parts of a body of the user from the photographed image,
      adjusts the image for composition in size, position, and direction depending on a size, a position, and a direction of each of the plurality of the detected parts, and
      composites the image for composition with the photographed image with the adjusted size, at the adjusted position, and in the adjusted direction:
   wherein a plurality of images for composition are categorized by predetermined groups;
   wherein the images for composition are displayed in units of groups on an edit screen; and
   wherein, when a plurality of users are included in the photographed image and one of the images for composition is selected by the user on the edit screen, the control device composites the selected image for composition with each of the users included in the photographed image.

2. The image generating apparatus according to claim 1, wherein each of the plurality of parts includes a plurality of reference points for identifying the part.

3. The image generating apparatus according to claim 2, wherein the plurality of the parts includes facial organs; and wherein the control device detects the part based on a plurality of reference points provided for the facial organ.

4. The image generating apparatus according to claim 1, wherein the control device detects the plurality of the parts for each user.

5. The image generating apparatus according to claim 1, further comprising a display unit that displays a moving image photographed by the imaging device in real time;

wherein the control device composites the image for composition with the moving image displayed by the display unit in real time.

6. An image generating method comprising:

photographing a user to generate a photographed image;

detecting a plurality of parts of a body of the user from the photographed image;

managing images for composition which are categorized by predetermined groups;

adjusting the image for composition in size, position, and direction depending on a size, a position, and a direction of a plurality of the detected parts;

displaying a plurality of images for composition in units of groups on an edit screen; and compositing the image for composition selected by the user on the edit screen with the photographed image with the adjusted size, at the adjusted position, and in the adjusted direction;

wherein, when a plurality of users are included in the photographed image and one of the images for composition is selected by the user on the edit screen, the selected image for composition is composited with each of the users included in the photographed image.

* * * * *

UNITED STATES PATENT AND TRADEMARK OFFICE
CERTIFICATE OF CORRECTION

PATENT NO. : 9,519,950 B2  Page 1 of 1
APPLICATION NO. : 14/574731
DATED : December 13, 2016
INVENTOR(S) : Tsuneo Okada et al.

It is certified that error appears in the above-identified patent and that said Letters Patent is hereby corrected as shown below:

On the Title Page

At item (30), please add the following Foreign Application Priority Data:

--Nov. 14, 2014   (JP) .................. 2014-232157--

Signed and Sealed this
Twenty-third Day of May, 2017

Michelle K. Lee
*Director of the United States Patent and Trademark Office*